United States Patent
Sung et al.

(10) Patent No.: US 7,149,199 B2
(45) Date of Patent: Dec. 12, 2006

(54) MULTI-DIMENSIONAL ORTHOGONAL RESOURCE HOPPING MULTIPLEXING COMMUNICATIONS METHOD AND APPARATUS

(75) Inventors: Dan-Keun Sung, Taejon (KR); Su Won Park, Taejon (KR)

(73) Assignees: Korea Advanced Institute of Science and Technology, Taejon (KR); Electronics and Telecommunications Research Institute, Daejeon (KR)

(*) Notice: Subject to any disclaimer, the term of this patent is extended or adjusted under 35 U.S.C. 154(b) by 939 days.

(21) Appl. No.: 10/089,051

(22) PCT Filed: Feb. 6, 2001

(86) PCT No.: PCT/KR01/00166

§ 371 (c)(1),
(2), (4) Date: Mar. 25, 2002

(87) PCT Pub. No.: WO01/93479

PCT Pub. Date: Dec. 6, 2001

(65) Prior Publication Data

US 2002/0191569 A1    Dec. 19, 2002

(30) Foreign Application Priority Data

May 30, 2000    (KR)    .............................. 2000-29400

(51) Int. Cl.
*H04Q 7/00*    (2006.01)
*H04B 7/00*    (2006.01)
*H04B 7/216*    (2006.01)
*H04J 11/00*    (2006.01)

(52) U.S. Cl. .................. 370/330; 370/310.2; 370/335; 370/208; 370/320; 370/342; 370/441

(58) Field of Classification Search ................ 370/230, 370/208, 278, 310.2, 330, 335, 320, 342, 370/441
See application file for complete search history.

(56) References Cited

U.S. PATENT DOCUMENTS

| | | | |
|---|---|---|---|
| 5,548,582 A | | 8/1996 | Brajal et al. |
| 5,896,375 A | * | 4/1999 | Dent et al. .................. 370/347 |
| 6,009,332 A | * | 12/1999 | Haartsen ..................... 455/450 |
| 6,112,094 A | * | 8/2000 | Dent ........................ 455/452.1 |
| 6,498,788 B1 | | 12/2002 | Emilsson et al. |
| 6,647,005 B1 | * | 11/2003 | Cao et al. .................... 370/342 |
| 6,657,985 B1 | | 12/2003 | Park |

FOREIGN PATENT DOCUMENTS

| | | |
|---|---|---|
| EP | 0874530 | 10/1998 |
| EP | 0902549 | 3/1999 |
| GB | 2331207 | 5/1999 |

OTHER PUBLICATIONS

Chen et al., "Multicarrier CDMA with Adaptive Frequency Hopping for Mobile Radio Systems", IEEE Journal on Selected Areas in Communications, vol. 14, No. 9, pp. 1852-1858 (1996).
U.S. Appl. No. 10/030,190, to Sung et al., filed Feb. 4, 2002.

* cited by examiner

*Primary Examiner*—Chi Pham
*Assistant Examiner*—Ronald Abelson
(74) *Attorney, Agent, or Firm*—Greenblum & Bernstein, P.L.C.

(57) ABSTRACT

The present invention is related to a statistical multiplexing method and apparatus using a multi-dimensional orthogonal resource hopping multiplexing method in a wired/wireless communication systems where a plurality of communication channels, which are synchronized through a single medium, coexist. The present invention, in order to implement a generalized statistical multiplexing communication system using a multi-dimensional orthogonal resource hopping multiplexing method, comprises a multi-dimensional hopping pattern generator which is located in the primary communication station, a data symbol modulator that modulates data symbols based on the corresponding orthogonal resource hopping pattern generated by said multi-dimensional hopping pattern generator, a collision detector and controller that detects whether a collision occurs or not between the multi-dimensional hopping patterns and compares the consistency of the data symbols toward the secondary communication stations between said collision interval, a transmission power controller that controls the transmission power of the remaining parts excluding the parts where the multi-dimensional hopping patterns collide and the transmission is stopped due to transmitting data symbol inconsistency and compensates for the loss in the average reception energy due to a transmission stoppage.

55 Claims, 44 Drawing Sheets

PP=1   #PP=2   #PP=4        #PP=8              #PP=16

*PP = Probable Position

1 = ON
0 = OFF
                                10000000 — 1000000000000000
                        1000 <            0000000010000000
                                00001000 — 0000100000000000
                                          0000000000001000
        10 <
                                00100000 — 0010000000000000
                        0010 <            0000000001000000
                                00000010 — 0000001000000000
                                          0000000000000010
1 <
                                01000000 — 0100000000000000
                        0100 <            0000000001000000
                                00000100 — 0000010000000000
                                          0000000000000100
        01 <
                                00010000 — 0001000000000000
                        0001 <            0000000000010000
                                00000001 — 0000000100000000
                                          0000000000000001

FIG. 12c

MULTI-DIMENSIONAL ORTHOGONAL RESOURCE HOPPING MULTIPLEXING COMMUNICATIONS METHOD AND APPARATUS

TECHNICAL FIELD

The present invention is related to a statistical multiplexing method and apparatus for the channels using a multi-dimensional orthogonal resource hopping multiplexing method when the data transmission rate for each channel has an average transmission rate which is lower than the basic transmission rate (R) in digital communication systems where a plurality of communication channels synchronized through a single medium with a low degree of activity co-exist.

More specifically, the present invention is related to a statistical multiplexing method and apparatus wherein the primary communication station identifies each channel of the secondary communication station by the multi-dimensional orthogonal resource hopping pattern in which the system comprises a primary communication station that synchronizes a plurality of channels to secondary communication stations; the multi-dimensional orthogonal resource hopping pattern corresponding to a secondary communication station comprises a designated hopping pattern assigned at the time of a call establishment or a pseudo-random hopping pattern unique to the secondary communication station; when the multi-dimensional orthogonal resource coordinates within the hopping patterns of more than two channels at any moment are the same (herein referred to as "collision of multi-dimensional orthogonal resource hopping patterns"), all the transmitting channels from the primary communication station involved with the collision are compared and if at least one channel transmits data symbol different from other channels, then the corresponding symbol interval is switched off (punctured or not transmitted) and in order to supplement the symbol energy of the lost data belonging to all the channels involved, the transmission power of all the channels whose data symbol transmission have been switched off can be increased at the corresponding interval in such an amount that is stipulated in the Communication Protocol.

As an example of multiplexing communication system, a mobile communication system IS-95 which is a prior art which has been laid open.

The digital and analog frequency division multiplexing (FDM) communication systems according to a prior art, communicate through allocation of an empty frequency allocation to a secondary communication station by the primary communication station at the time of a call establishment irrespective of the degree of channel activity and other secondary communication stations are allowed to utilize the available frequency channels released at the time of call termination.

The Time Division Multiplexing (TDM) communication systems according to a prior art, communicate through allocation of an time slot amongst a multitude of time slots which has not been allocated to a secondary communication station by the primary communication station at the time of a call establishment irrespective of the degree of channel activity and other secondary communication stations are allowed to utilize the available time slots released at the time of call termination.

The Frequency Hopping Multiplexing (FHM) communication system according to a prior art, communicates between the primary and secondary communication stations through a prearranged frequency hopping pattern.

The Orthogonal Code Division Multiplexing (OCDM) communication system according to a prior art, communicates through allocation of an orthogonal code symbol within the orthogonal code which has not been allocated to a secondary communication station by the primary communication station at the time of a call establishment irrespective of the degree of channel activity, and other secondary communication stations are allowed to utilize the available orthogonal code symbol released at the time of call termination.

BACKGROUND ART

The embodiments of prior arts pertaining to multiplexing method which have been laid open are described as below.

FIG. 1 illustrates the system according to the embodiments of the prior arts and present invention, all communication channels from the primary communication station 101 to the secondary communication stations 111, 112, 113 are synchronized and also orthogonal to each other.

FIG. 2a is a block diagram of the transmitter of the primary communication station which corresponds to the common constituent parts in the embodiments of the prior arts and present invention, FIG. 2b is a block diagram of the transmitter of the primary communication station on traffic channel in the embodiments of the prior arts. The pilot channel 200 should exist per each Sub-Carrier (SC) because it is used as a channel estimation signal for the purpose of initial synchronization acquisition, tracking and coherent demodulation by the secondary communication station, as shown in FIG. 1, and shared by all the secondary communication stations in the area covered by the primary communication station. As illustrated in FIG. 2a, it also provides a phase reference for coherent demodulation by sending the known symbols. The synchronization channel 210 along with the pilot channel 200 is a one-way broadcasting channel that is broadcast to all the secondary communication stations in the area covered by the primary communication station, and the commonly required information by all the secondary communication stations are transmitted from the primary communication station (i.e., time information and the identifier of the primary communication station).

The data from the synchronization channel pass through a convolution encoder 214, a symbol repeater for adjusting a symbol rate 216, a block interleaver 218 for converting bursty errors to random errors and a symbol repeater 219 for matching a transmitting data symbol rate and are then transmitted to a spreading and modulation block, shown in FIGS. 3a–3f. A paging channel 220 shown in FIG. 2a is a common channel used in case of an incoming message to the secondary communication station or for responding to a request of the secondary communication station. Multiple paging channels 220 can exist.

The data transmitted through the paging channel pass through a convolutional encoder 224, a symbol repeater 226 and a block interleaver 228 and passes through an exclusive OR gate 236 together with an output of a long code generator 232 generated by a long code mask 230. The data through the exclusive OR gate 236 is then transmitted to the spreading and modulation block of FIG. 3.

A traffic channel 240 in FIG. 2b is a channel dedicatedly allocated to each secondary communication station for use until the call is completed. When there are data to be transmitted to each secondary communication station, the primary communication station transmits the data through the traffic channel 240. The data from the traffic channel 240 passes through a cyclic redundancy check (CRC) bit attachment block 241 for detecting errors in a specific time unit, or frame, (e.g. 20 ms in IS-95). Tail bit attachment block 242 are inserted into the traffic channel, all of which are "0", and the data through the CRC 241 pass through a convolutional encoder 244 for ensuring to independently encoding the channel in a frame unit. The data then pass through a symbol repeater 246 for matching its transmitting symbol rate according to a transmitting data rate. After passing through the symbol repeater 246, the data pass through a block interleaver 248 for changing an error burst into a random error. The data passing through the block interleaver 248 are scrambled in a scrambler 256 with use of a pseudo-noise (PN) sequence, generated by passing an output of a long code generator 232 decimated in a decimator 234 with use of a long code mask 250 generated by an electronic serial number (ESN) allocated to each secondary communication station.

A PCB (Power Control Bit) position extractor 258 extracts a position where a command for controlling transmission power from the secondary communication station is inserted in the PN sequence decimated in the decimator 234. A puncturing and inserting block 260 punctures an encoded data symbol corresponding to the inserting position of the power control command extracted by the PCB position extractor 258 among the data symbols scrambled in the scrambler 256 and inserts the power control command, then transmitting the power control command to the spreading and modulation block in FIG. 3.

According to the present invention, the location of the data symbol for multiplexing transmission hopping time can also be determined by using the PN sequence decimated as shown above.

FIGS. 3a, 3b and 3c show an embodiment of a spreading and modulation block according to the prior art.

FIG. 3a corresponds to the commonly used IS-95 system employing BPSK (Binary Phase Shift Keying) as a data modulation method.

FIG. 3b shows the case for spreading I/Q channel transmitting data by employing a different orthogonal code symbol in FIG. 3a.

FIG. 3c shows the spreading and modulation block employing QPSK (Quadrature Phase Shift Keying) as a data modulation method for transmitting double data rate in comparison to the method in FIG. 3a. FIG. 3c is adapted in the cdma2000® system, which is one of candidate techniques for the IMT-2000 system.

FIG. 3d shows the spreading and modulation block employing QPSK (Quadrature Phase Shift Keying) as a data 20 modulation method for transmitting double data rate in comparison to the method in FIG. 3b.

FIG. 3e shows a spreading and modulation block, which employs QOC (Quasi-Orthogonal Code) used in cdma2000® system, which is one of candidate techniques for the IMT-2000 system.

FIG. 3f shows the case for spreading I/Q channel transmitting data by employing a different orthogonal code symbol in FIG. 3e.

In FIG. 3a, signal converters 310, 330, 326, 346, 364 convert logical values "0" and "1" to physical signal "+1", and "−1" to be really transmitted. Each channel of FIG. 2 passes through the signal converters and is then spread in spreaders 312, 332 by an output of a Walsh code generator 362. Transmission power of each channel is adjusted in gain controllers 314, 334.

All channels from the primary communication station are spread in spreaders 312, 332 by an orthogonal Walsh function from the Walsh code generator 362 allocated to each channel fixedly. The channels are then gain-controlled in the gain controllers 314, 334 and then multiplexed 316, 336 based on orthogonal code division scheme. The multiplexed signals are scrambled at QPSK spreading and modulation blocks 318, 338 by a short PN sequence 324, 344 for the primary communication station identification. Low-pass filters (LPF) 320, 340 filter the spread and scrambled signals. The signal modulated by the carrier passes through a radio frequency (RF) processing block and is then transmitted through an antenna.

In FIG. 3b, signal converters 310, 330, 326, 346, 364, 365 convert logical values "0" and "1" into physical signal "+1" and "−1" to be really transmitted. Each channel of FIG. 2 passes through the signal converters and is then spread in spreaders 312, 332 by each output of two Walsh code generators 362, 363. Transmission power of each channel is adjusted in gain controllers 314, 334.

All channels from the primary communication station are spread in spreaders 312, 332 by an orthogonal Walsh function of the Walsh code generators 362, 363 allocated to each channel fixedly. The channels are then gain-controlled in the gain controllers 314, 334 and then are multiplexed 316, 336 based on the orthogonal code division scheme. The multiplexed signals are scrambled at QPSK scrambling blocks 318, 338 by a short PN sequence 324, 344 for the primary communication station identification. Signals spread and scrambled are filtered by low-pass filters (LPF) 320, 340. The signal modulated by the carrier passes through a radio frequency (RF) processing block and is then transmitted through an antenna.

FIG. 3c is identical to FIG. 3a except the fact that, in order to transmit the signal generated in FIG. 2 to QPSK instead of BPSK, different information data are carried in an in-phase channel and a quadrature phase channel through a demultiplexer 390. Using the demultiplexer 390 and the signal converters 310, 330 enables QAM (Quadrature Amplitude Modulation) as well as QPSK.

FIG. 3d is identical to FIG. 3b except the fact that, in order to transmit the signal generated in FIG. 2 to QPSK instead of BPSK, different information data are carried in an in-phase channel and a quadrature phase channel through a demultiplexer 390.

FIG. 3e shows the case that a QOC mask is used for distinguishing a channel from the primary communication station to the secondary communication stations in FIG. 3c. Orthogonality is not maintained in a code symbol group using different QOC masks but maintained in a code symbol group using same QOC mask. Therefore, the present invention is applied to the orthogonal code symbol group using the same QOC mask, which may maintain the orthogonality.

FIG. 3f like FIGS. 3b and 3d, is identical to FIG. 3e except the fact that, an independent Walsh code generator exists at I and Q channels in order to be able to spread I/Q channel transmitting data through a different orthogonal code symbol.

FIGS. 4a, 4b and 4c is an example of signal diagram in order to explain the multiplexing method which transmits the signals by allocating orthogonal resource at each channel.

When a primary communication station communicates with its secondary communication stations, the transmission data rate transmitted to each secondary communication station can vary with respect to time. For instance, if the highest transmission rate per channel allocated to the secondary communication station by the primary communication station is a basic transmission rate (R), then the average transmission rate can be a variety of forms such as R, R/2, R/4, . . . , and 0, according to the amount of data transmitted from the primary communication station to the secondary communication station at each frame.

FIG. 4a shows the case for matching an instant transmission rate at each frame with the average transmission rate and this method is used in orthogonal code division multiplexing communication system for a forward link such as IS-95.

FIG. 4b illustrates the method for matching an instant transmission rate with the basic transmission rate at each frame by filling up the empty parts with dummy information when the transmitting data at each frame is less than the basic transmission rate.

FIG. 4c shows the method for adjusting the average transmission rate at the corresponding frame according to a rate between the intervals which possess R and 0 as the transmission rates where the instant transmission rate is either a basic transmission rate (R) or 0 (No transmission). The method used in FIG. 4c is not the transmission symbol based ON/OFF like the present invention, but time slot based ON/OFF. The time slot which is a power control period, is used for controlling the average transmission rate at each frame and at the same time maintaining a reference signal amplitude for closed loop power control of a reverse link in IS-95 system. In the IS-95 reverse link, unlike the present invention, the orthogonality between the channels is not guaranteed.

In FIGS. 4a, 4b and 4c, a primary communication station transmits a common pilot channel to the secondary communication stations in parallel, however, since the pilot channel is used as a reference for synchronization, channel tracking, phase estimation and power control, can be transmitted using the time division multiplexing method similar to the Wideband CDMA (W-CDMA) system for IMT-2000 system. In this case, the pilot channel according to the pilot symbol or location of multiplexing is called in various terms including a Preamble, Mid-amble and Post-amble.

FIG. 4d illustrates the frequency division multiplexing method according to the prior arts. A different frequency band is used as a communication channel between the primary communication station and each secondary communication station. The frequency division multiplexing method according to the present invention includes the Orthogonal Frequency Division Multiplexing (OFDM) method of which has been extensively studied for the purpose of a satellite broadcasting. For the case of OFDM, the frequency band for each subcarrier channel is in an overlapped state which has not been completely separated. However, it can be included in the orthogonal resource of the present invention since the orthogonality between the subcarriers is guaranteed.

FIG. 4e illustrates the conventional time division multiplexing method such as the GSM system. The same frequency band is used as a communication channel between the primary communication station and each secondary communication station. However, each time slot within the frame is wholly allocated to the corresponding secondary communication station.

FIGS. 4f, 4g and 4h show an implementation of the frequency hopping method on the conventional frequency division multiplexing method, as shown in FIG. 4d, in order to improve the frequency diversity and security.

FIG. 4f shows the frequency hopping pattern on a time slot basis.

FIG. 4g shows the regular frequency hopping pattern based on a transmitting data symbol unit.

FIG. 4h shows the irregular frequency hopping based on a transmitting data symbol unit.

FIG. 4g illustrates a method that focuses on frequency diversity and FIG. 4h shows a method that emphasizes the security on frequency diversity and protection against the eavesdropping from any unauthorized receivers. In the frequency hopping multiplexing, there exists a fast frequency hopping multiplexing method based on a symbol and part-symbol unit as well as a slow frequency hopping multiplexing method based on a few symbol units.

The methods shown in FIGS. 4f, 4g and 4h can provide the frequency diversity by implementing the time division multiplexing method in FIG. 4e. In reality, the use of the time slot and frequency hopping based on a frame unit for strengthening of the frequency diversity instead of security enhancement in the second generation mobile communication system such as Global System for Mobile (GSM) is optional.

FIG. 4i illustrates the conventional orthogonal code division multiplexing such as IS-95, cdma2000® and W-CDMA. The communication channels between the primary communication station and its secondary communication stations use the same frequency band and all time slots within the frame. The primary communication station allocates a fixed orthogonal code symbol on each channel at the time of a call establishment, and at the time of a call completion, reallocates the released orthogonal code symbol to one of other secondary communication stations where a new call is being requested. Hence, all data symbols within a frame are spread by the same orthogonal code symbol. The configuration of the transmitter of the primary communication station which corresponds to FIG. 4i is given in FIGS. 3a, 3b, 3c, 3d, 3e and FIG. 3f.

The configuration of a receiver of the secondary communication station, corresponding to the transmitter of the primary communication station according to an embodiment of the prior art given in FIG. 4i, is similar except the despreading parts for FIGS. 3a, 3b, 3c, 3d, 3e and FIG. 3f. Hence, FIG. 5 briefly describes the configuration of a receiver corresponding to the configuration of the transmitter in FIG. 3a.

The signal received through the antenna passes through multipliers 510, 530 for demodulating the signal with a carrier, low pass filters (LPFs) 512, 532 for extracting, baseband signal and short code generators 520, 540 for descrambling the signal with a sequence same as the PN sequence used in the transmitter. The signal then passes through multipliers 514, 534 for descrambling the received signal and then despreaders 516, 536 for accumulating the signals during a transmission data symbol area. A channel estimator 550 estimates a transmission channel by extracting only pilot channel components from the received signal. A phase recovery 560 compensates for phase distortion of the received signal using an estimated phase. If the pilot channel is time division multiplexed instead of code division multiplexed, then only pilot channel components are extracted by a demultiplexer and the phase changes between intermittent pilot signals can be estimated by interpolation.

FIG. 6 shows a configuration of a receiver for a channel such as paging channel in which a control command for controlling transmission power from the secondary communication station to the primary communication station is not included. Referring to the figure, maximum ratio combiners 610, 612 combine signals passing through the phase compensation to a maximum ratio. If the transmitter performs QPSK data modulation as shown in FIG. 3b, the receiver performs descrambling by multiplexing the signal in a multiplexer 614, performing soft decision in a soft decision unit 616, then decimating an output of a long code generator 622 generated by a long code mask 620 in a decimator 624, and then multiplying the signal through the soft decision unit with a decimated result of the decimator 624. In the present invention, a configuration of a receiver in the secondary communication station for the orthogonal code hopping multiplexing is similar to the configuration in FIG. 6. For the synchronization channel, the descrambling processes 620, 622, 624, 626, 628 using the long code may be skipped.

FIG. 7 shows a configuration of a receiver for a traffic channel in which a control command for controlling transmission power of the secondary communication station is included. As shown in the figure, the phase-compensated signal passes through maximum ratio combiners 710, 712. In case that a receiver performs QPSK data demodulation as shown in FIG. 5, a multiplexer 714 multiplexes an in-phase component and a quadrature phase component in the signal. An extractor 740 extracts a signal component corresponding to the power control command transmitted from the primary communication station among the received signal. The signal from the extractor 740 then passes through a hard decision unit 744 and is then transmitted to a transmission power controller of the secondary communication station. Data symbols except the power control command in the received signal from the multiplexer 714 pass through a soft decision unit 742. A decimator 724 decimates an output of a long code generator 722 generated by a long code mask 720 generated by an identifier of the secondary communication station. The data symbols from the soft decision unit 742 is then multiplied in a multiplier 718 by a result of the decimator 724, so to perform descrambling.

FIG. 8 shows a function of recovering the received signal through the signal processing of FIGS. 6 and 7 from the primary communication station, through block deinterleavers 818, 828, 838 and convolutional decoders 814, 824, 834. In a synchronizaton channel 810, in order to lower a symbol rate, a sampler 819 performs symbol compression for the signals through the soft decision unit by accumulating the signals, which is an inverse process to the symbol repeater 219. The signal through the sampler 819 passes through a block deinterleaver 818. Then, a sampler 816 performs symbol compression again for the signal, which is an inverse process to the symbol repeater 216, before the signal passes to a convolutional decoder 814. The signal after the symbol compression then passes through the convolutional decoder 814, then the data of synchronization channel transmitted from the primary communication station are recovered. In case of a paging channel 820, the signal after the soft decision passes through a block deinterleaver 828 for channel deinterleaving. The channel-deinterleaved signal passes through a sampler 826 for symbol compression according to the transmitting data rate, which is an inverse process of the symbol repeater 226. The signal after the symbol compression passes through a convolution decoder 824 for channel decoding, so the paging channel transmitted from the primary communication station is recovered.

In case of a traffic channel 830, the signal after the soft decision passes through a block deinterleaver 838 for performing channel deinterleaving regardless of a transmitting data rate. The channel-deinterleaved signal passes through a sampler 836 for performing symbol compression according to the transmitting data rate, which is an inverse process to the symbol repeater 246. A convolutional decoder 834 performs channel decoding for the signal after the symbol compression. A tail bit remover 832 removes tail bits of the signal used for independent transmission signal generation in a frame unit. A CRC 831 generates a CRC bit for the transmitting data portion like the transmitter and checks errors by comparison with a recovered CRC after channel decoding. If the two CRC bits coincide, the CRC 831 determines that there is no error and then the traffic channel data are recovered. If the transmitter does not include information about the transmitting data rate in 20 ms frame unit, the transmitting data rate of the primary communication station may be determined by channel-decoding the signals after the independent channel deinterleaving and comparing the CRC bits. A system, which transmits a transmitting data rate independently, just further requires a channel decoding process corresponding to the data rate.

As shown in FIG. 1, the conventional methods used for maintaining the orthogonality between the channels from the primary communication station to the secondary communication station can be classified into four different types.

First, as shown in FIG. 4d, using a frequency division multiplexing method which fixedly allocates an available frequency band of the primary communication station to a secondary communication station at the time of a call establishment.

Second, as shown in FIG. 4e, using a frequency division multiplexing method which fixedly allocates a time slot of the primary communication station to a secondary communication station at the time of a call establishment.

Third, as shown in FIGS. 4f, 4g and FIG. 4h, allocating a controlled frequency hopping pattern to the secondary communication station in order to avoid a frequency selective fading at the time of a call establishment or using a total bandwidth consisted of several sub-carriers in a single secondary communication station at a given time and place like in a military use.

Fourth, as shown in FIG. 4i, spreading the channel to the secondary communication station by allocating an available orthogonal code symbol to the secondary communication station at the time of a call establishment.

Among the four methods described, the common point for the rest of three methods excluding the frequency hopping multiplexing is fixedly allocating orthogonal resources (frequency, time, orthogonal code) to the secondary communication station by the primary communication station. The frequency hopping multiplexing is also used in applications with a sufficient amount of resources mainly for the purpose of security. Therefore, it is not subjected to an efficient use of the resources. Hence, in a case where this method is used, a fixed allocation of a limited orthogonal resources to a channel with a relatively low activity or a variable channel with a transmitting data rate which is lower than the basic transmission rate, makes an efficient use of the resources very difficult.

Therefore, while the prior art allocates the orthogonal resources such as frequency, time and orthogonal code in a fixed manner so as to have a one-to-one relationship between the orthogonal resource and the channel, the present invention, with a little modification of the prior art, performs statistical multiplexing for traffic channels having low activities in consideration of activity of the transmitting data in order to increase the number of channels from the primary communication station to the secondary communication station and the activities of the orthogonal codes, which are limited resources, and eliminates unnecessary channel allocation and release processes in order to decrease buffer capacity required by the primary communication station, data transmission delay and achieves a seamless handoff to the adjacent cells

DISCLOSURE OF INVENTION

As shown in the conventional method, in order to increase the utilization of orthogonal resources with fixed allocation, fast channel allocation and release scheme are required. However, if transmitting the control signal information for channel allocation and de-allocation (release) occur more frequently, a significant amount of limited frequency resources should be used for the control information of data transmission, not for data transmission itself. Moreover, fast channel allocation and de-allocation (release) are processed. Because of long round trip delay of channel allocation and de-allocation (release) command there should be a longer buffering in the primary communication station after the data to be transmitted. If more time for such processes is required, larger buffer size is required in the primary communication station. Information, which requires checking whether the information is transmitted normally, should be buffered for retransmission. However, in case of transmitting information without checking normal transmission of the information, such as, in a datagram method, delay should be minimized in an available range in order to decrease the capacity of the buffer.

The present invention is designed to overcome the above problems of the prior art. One objective of the invention is to provide a multiplexing method and apparatus, to perform statistical multiplexing for traffic channels having low activities in consideration of activity of the transmitting data in order to increase the number of channels from the primary communication station to the secondary communication station and the activities of the orthogonal codes, which are limited resources, and eliminates unnecessary channel allocation and de-allocation in order to decrease buffer capacity requested by the primary communication station, data transmission delay and achieves a seamless handoff to adjacent cells. The present invention utilizes a statistical multiplexing called as multi-dimensional orthogonal code hopping multiplexing which takes frequency, time and orthogonal code as an orthogonal axis in case when the activity of the synchronized channels which maintains orthogonality is low or when the transmitting data rate df the channels vary at the lower rate than the basic transmission rate.

In order to accomplish the above objective, the present invention provides a multiplexing method and apparatus wherein orthogonal resources are pseudo-randomly allocated to the encoded data symbols on the basis of statistical characteristics required by the service to the channels with a data channel that generates a relatively low traffic or the channels whose real transmitting data rate varies below the allocated basic transmitting data rate. As a result, the channels are multiplexed statistically by distinguishing the channels from multi-dimensional orthogonal resource hopping patterns. In order to protect from a faulty reception due to the collision of the multi-dimensional orthogonal resource coordinates which may occur from the independent and pseudo-random hopping pattern for each secondary communication station, the transmitting encoded data symbols for all channels involved in the collision are compared, and the transmission is halted unless all the transmitting data coincide. At the same time, in order to compensate for the average received bit energy, the transmission energy from the primary communication station to the secondary communication station can be increased for a specific amount and duration.

Moreover, the method proposed in the present invention can coexist with the conventional system by separately operating the collection of resources used in multi-dimensional orthogonal resource hopping multiplexing from the collection of resources used in the conventional method since all the resources maintain orthogonality.

BRIEF DESCRIPTION OF THE DRAWINGS

FIG. 12c illustrates an example data symbol position for transmission time hopping based on a symbol unit according to the embodiments of the present invention (orthogonal resource=time, "1"=ON, "0" OFF).

FIG. 13a illustrates a configuration of receiver of the secondary communication station based on the multi-dimensional orthogonal resource hopping multiplexing method according to the embodiments of the present invention in FIG. 10a.

Figure 1:
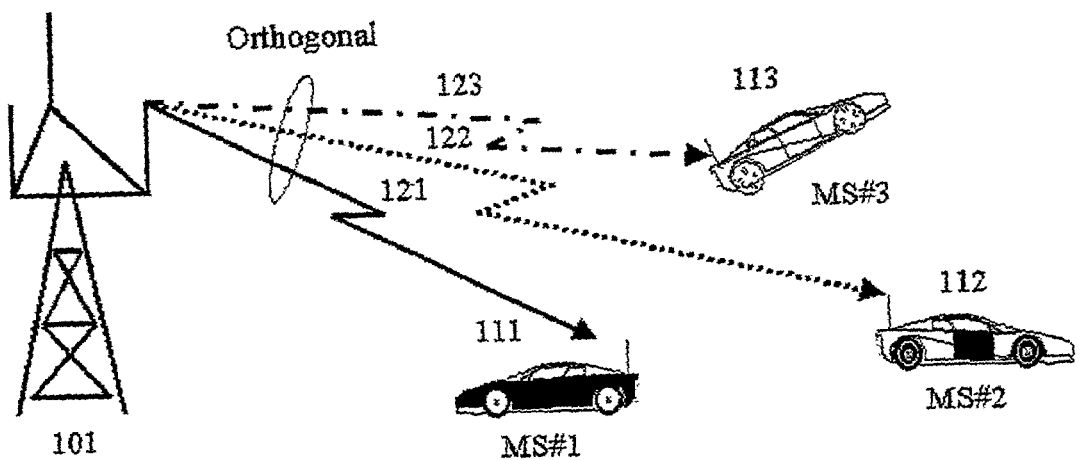
FIG. 1 shows a system concept diagram illustrating the primary communication station and the secondary communication stations according to the embodiments of the prior arts and the present invention.
Figure 2A:
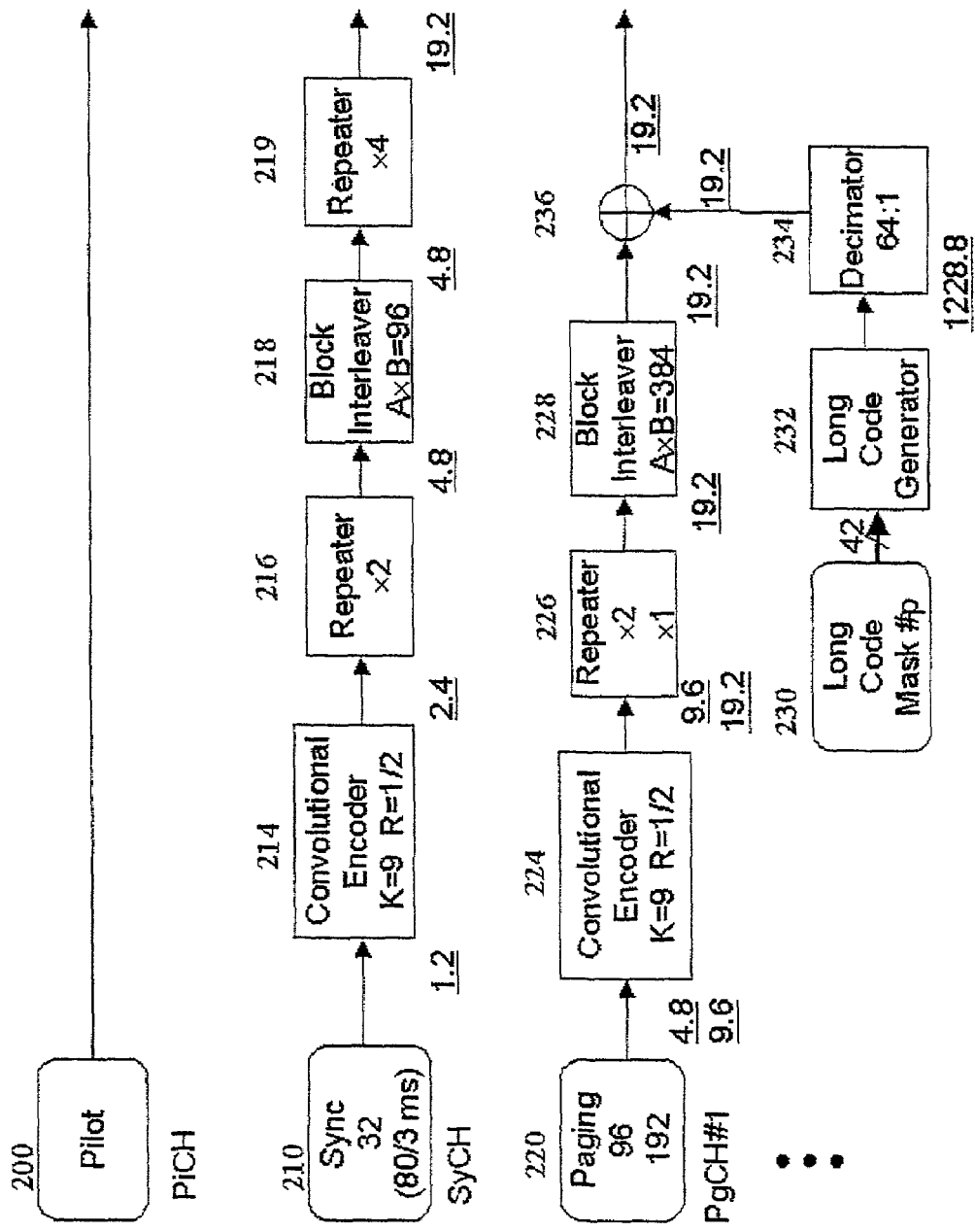
FIG. 2a illustrates a configuration of transmitter corresponding to the common configuration elements according to the embodiments of the prior arts and the present invention.
Figure 2B:
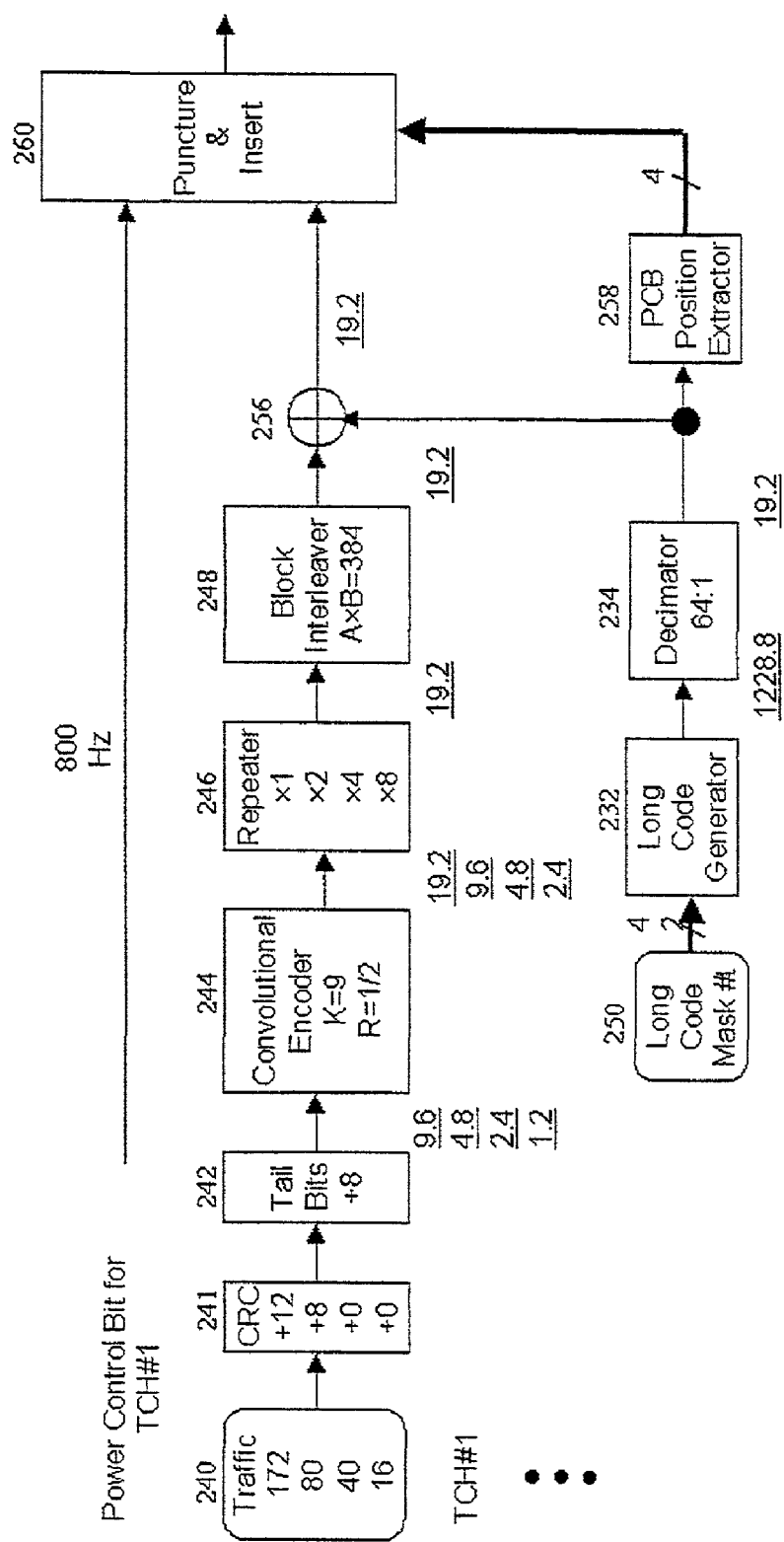
FIG. 2b shows a configuration of traffic channel transmitter of the primary communication station according to the embodiments of the prior arts.

Description of the numeric on the main parts of the Drawing

380: Multi-dimensional (orthogonal Resource) Hopping Pattern Generator
382: Orthogonal Code Generator according to multi-dimensional hopping patterns

384, 386: Hopping pattern Collision Detector, Data Symbol Comparator and Controller
388: Frequency synthesizer according to multi-dimensional hopping pattern
385, 387: Transmission Power Control Apparatus using the Controller
392, 393: Symbol position Selector (or Buffer) according to Multi-dimensional Hopping Pattern

BEST MODE FOR CARRYING OUT THE INVENTION

Hereinafter, preferred embodiments of the present invention will be described in detail with reference to the accompanying drawings.

In this application, the same reference numbers are used for components similar to the prior art and only modified or added components in comparison with the prior art are described for the present invention in detail.

The orthogonal code hopping multiplexing (OCHM) according to the present invention communicates by selecting an orthogonal code symbol agreed with respect to the one-dimensional hopping pattern agreed between the primary communication station and a secondary communication station. In case of a collision, if the agreed one-dimensional hopping pattern between the primary communication station and a second communication is independent, all the data symbols belonging to the channels related to the collision are compared and transmitted when all of them are identical data symbols. Otherwise, the corresponding symbols are not transmitted by puncturing and the punctured parts of the data symbols are recovered from the receiver using a channel decoder (Korean Patent of Application Number 10-1999-032187, "Method and apparatus for orthogonal code hopping multiplexing communications"). The present invention is a statistical multiplexing method that generalizes the orthogonal code hopping method against all the orthogonal resources.

In the embodiments of the present invention, a primary communication station and the secondary communication station correspond to a base station and a mobile station, respectively, in the existing commercialized mobile communication system. A single primary communication station communicates with a plurality of the secondary communication stations and the present invention provides a statistical multiplexing method that can be implemented in a group of synchronized channels with orthogonality from the primary communication station to the secondary communication station. Like Quasi-Orthogonal Code (QOC) that is adopted in the cdma2000® method which is one of candidate technologies for the next generation mobile communication system and Multi-Scrambling Code (MSC) adopted in the W-CDMA method, the method from the present invention can be independently implemented within the system where orthogonalilty is maintained in each channel group. Also, when the channels from the primary communication station are classified into a number of channel groups which possess the same transmission antenna beam like sectorization, switched beam or smart antenna system, the present invention can be independently implemented in each channel group.

Figure 9A:
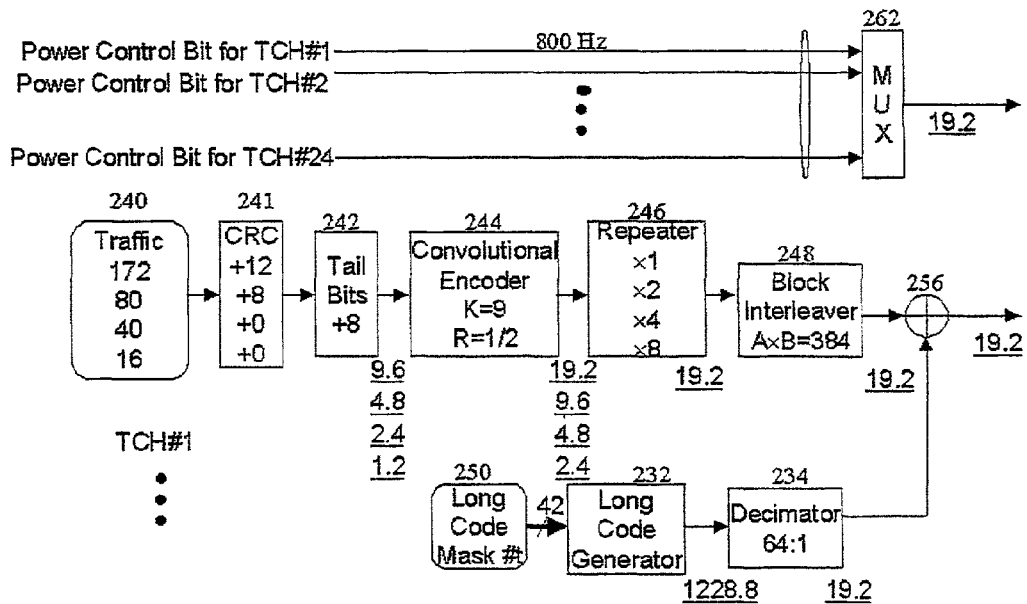
FIG. 9a shows a configuration of a transmitter of the primary communication station with the multiple traffic channels that are orthogonal resource hopping multiplexed and common physical control channels for the traffic channels according to the embodiments of the present invention.

FIG. 9a shows a configuration for multi-dimensional orthogonal resource hopping multiplexing for bursty channels and this configuration is identical except for the fact that puncturing and insertion of transmission control commands for the secondary communication station. For communication, there exist a two-way and one-way communication and for the one-way communication, there is no need for transmitting a transmission power control commands to the secondary communication station. However, for two-way communication, there is a need for transmission power control in order to maximize system capacity through efficient power control. For fast processing, power control commands are not channel-encoded generally. For a pseudorandom orthogonal code hopping pattern, a collision between two different channels is inevitable. Hence, the power control command should be transmitted through a collision-free channel. For this purpose, the concept of common power control channel, from the cdma2000® method which is one of the candidates for IMT 2000 system, can be adopted in this specification and called here as Common Physical Control CHannel (CPCCH).

The Common Physical Control Channel like the pilot channel previously mentioned, is spread through a separate orthogonal code symbol and transmits a physical class control command by the time division multiplexing for a plurality of the secondary communication stations. The location for a power control command for each secondary communication station is allocated at the establishment of a call.

FIG. 9a illustrates an embodiment of the common physical control channels for controlling 24 secondary communication stations based on IS-95 system as an example. In case when the channel varies below the basic transmission rate (R) from the primary communication station to the secondary communication station and the information is determined to be transmitted without any collision along with Rate Information (RI) for each frame, the information can be transmitted after being time division multiplexed similarly to the power control command of the secondary communication station. If the Rate Information is not transmitted, the receiver sequentially determines the rate information through the channel decoding and CRC test for all possible combinations. It is typical for all the possible combinations to be agreed between the primary communication station and secondary communication station before call establishment.

Figure 9B:
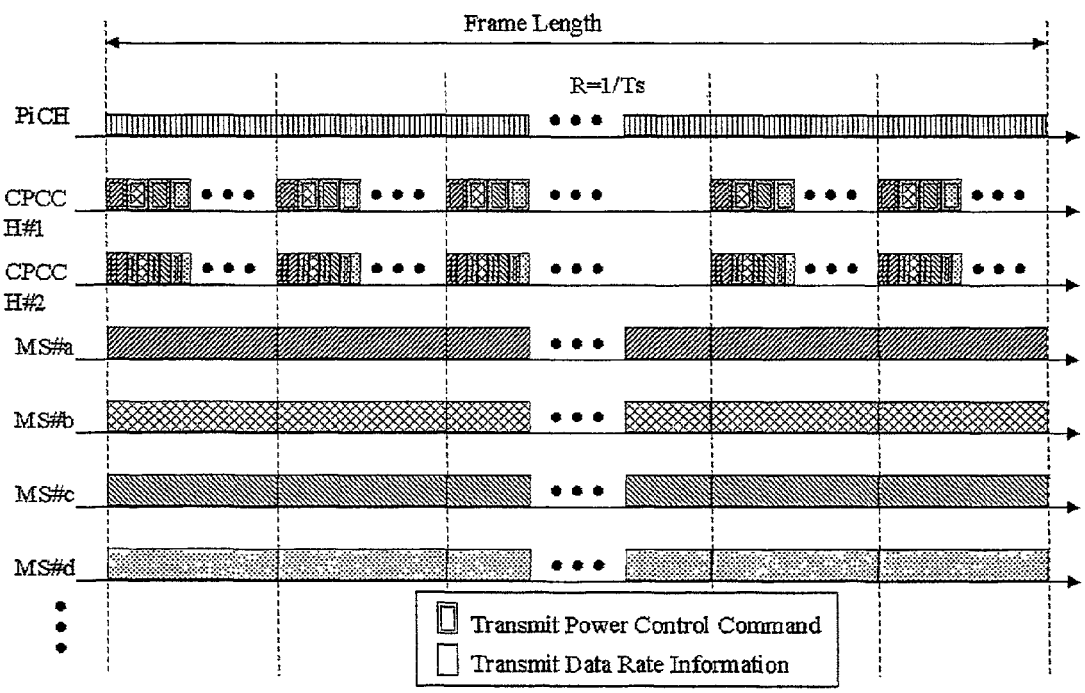
FIG. 9b illustrates a signal diagram of common physical control channel (CPCCH) according to the embodiments of the present invention.

FIG. 9b shows a signal diagram of Common Physical Control Channel according to an embodiment of the present invention. There exists two different types such as the CPCCH of type # 1 which transmits a transmission power control command only from the primary communication station to the secondary communication station and the CPCCH of type #2 which transmits the transmission data rate information of the primary communication station as well.

Figure 3A:
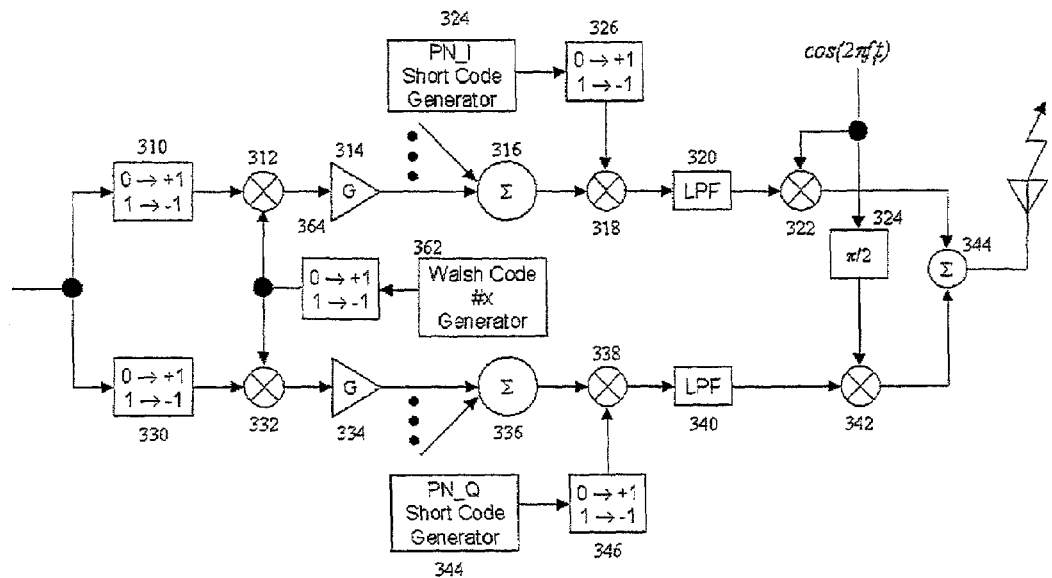
FIG. 3a illustrates a configuration of transmitter of the primary communication station based on the code division multiplexing method according to the embodiments of the prior arts (when it is BPSK modulated and uses the same orthogonal code symbol for I/Q channels).
Figure 10A:
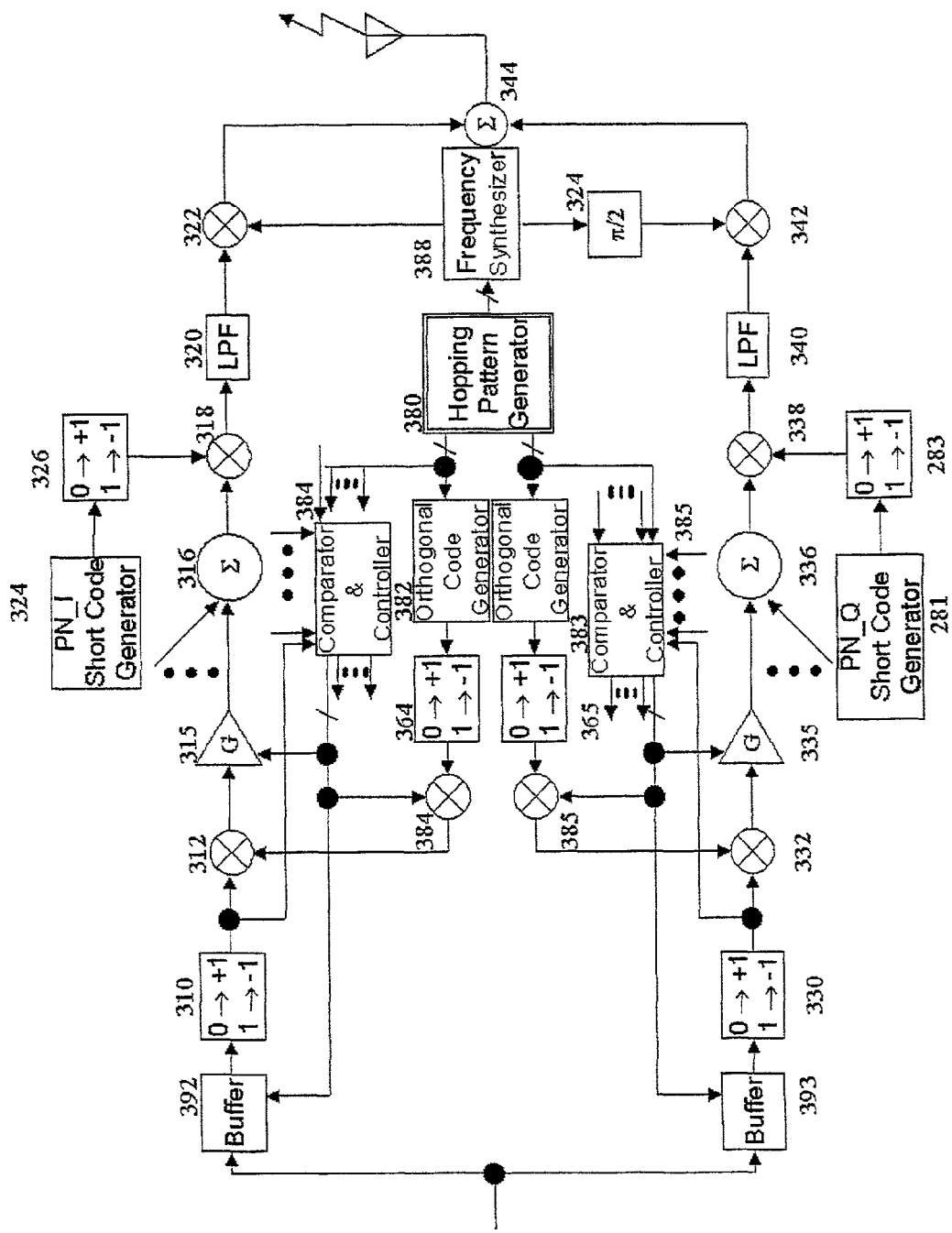
FIG. 10a shows a configuration of transmitter of the primary communication station based on the multi-dimensional orthogonal resource hopping multiplexing (MD-ORHM) according to the embodiments of the present invention (corresponding to FIG. 3a).

FIG. 10a illustrates an implementation of the present invention to the embodiment of the conventional method, as shown in FIG. 3a. For the statistical multiplexing using multi-dimensional orthogonal resource hopping multiplexing as proposed in the present invention, there is a need for a collision detector, data symbol comparator and a controller 384 that detects a collision of multi-dimensional hopping patterns which occurs due to independent hopping patterns from a multi-dimensional hopping pattern generator 380 and impose a proper control.

Figure 11:
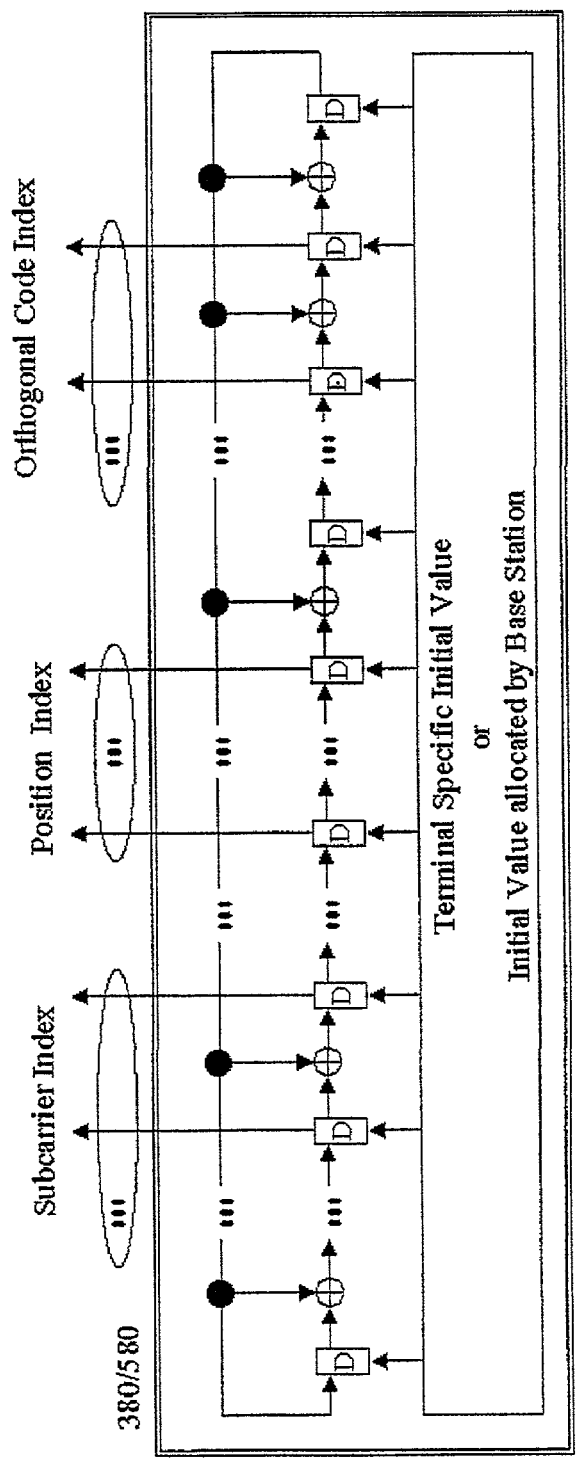
FIG. 11 shows a configuration of a multi-dimensional hopping pattern generator according to the embodiments of the present invention.

FIG. 11 shows an example of implementation for the multi-dimensional hopping pattern generator. The configuration shows a multi-dimensional hopping pattern generation scheme using a conventional PN sequence generator. The multi-dimensional hopping patterns can be generated through other methods.

The multi-dimensional hopping patterns can be one-dimensional hopping patterns such as (frequency), (transmission time (or symbol position)) and (orthogonal codes), or two-dimensional hopping patterns such as (frequency, transmission time), (frequency, orthogonal codes) and (transmission time, orthogonal codes), or three-dimensional hopping patterns (frequency, transmission time, orthogonal codes), or the like. At the system development stage, only some parts of orthogonal resources are allowed to be involved with the hopping and other orthogonal resources are implemented to be fixedly allocated based on the division method. Also, it can be implemented in such a way that all the orthogonal resources are allowed to be involved with the hopping multiplexing and then through the next control command. It can be controlled in such a way that some parts of orthogonal resources are allowed to be involved in the hopping multiplexing.

According to the multi-dimensional hopping pattern generator 380, a frequency synthesizer 388 for frequency hopping, buffers 392, 393 for transmission time hopping and an orthogonal code generator that generates orthogonal code symbols for orthogonal code hopping are required.

Figure 12A:
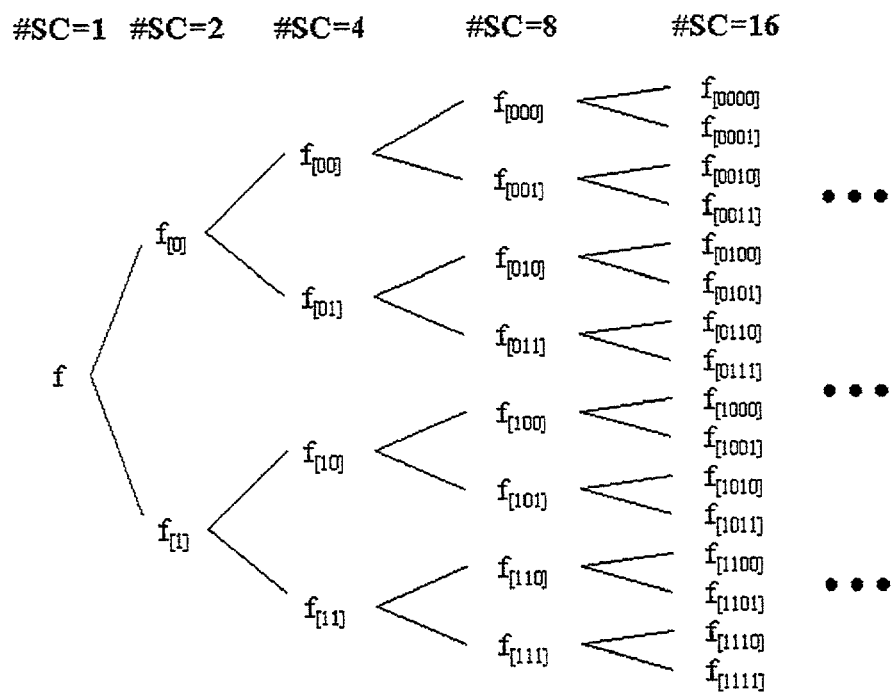
FIG. 12a illustrates an example of sub-carrier group for frequency hopping according to the embodiments of the present invention (orthogonal code=frequency).
Figure 12B:
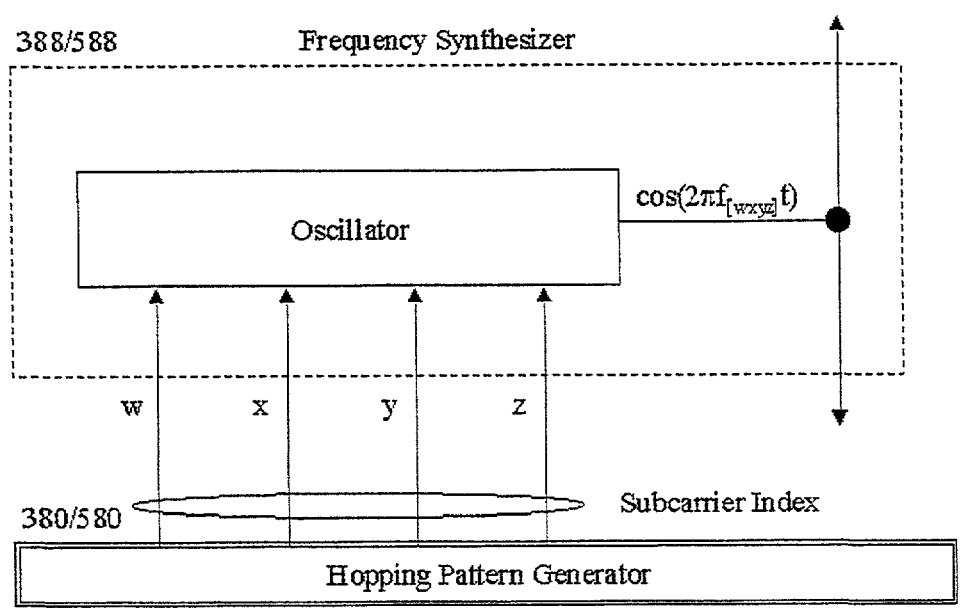
FIG. 12b shows a sub-carrier synthesizer according to the output of frequency hopping pattern generator according to the embodiments of the present invention.

The carriers or sub-carriers that are generated from the frequency synthesizer 388 differ in the number of bits that indicates a coordinate in the frequency axis of the outputs from the multi-dimensional hopping pattern generator 380 according to the number of the (sub)carriers that is used for frequency hopping, as shown in FIG. 12*a*. Among the outputs of the multi-dimensional hopping pattern generator 380, the signal corresponding to the frequency coordinate values is delivered to the frequency synthesizer 388 and according to the input values, a specified (sub-)carrier is generated.

In the multi-dimensional hopping pattern multiplexing method, since the carrier frequency for the frequency hopping changes, unlike time hopping and orthogonal code hopping where the carriers are not changed, a channel tracking and phase compensation is difficult from the receiver. Hence, like the multi-carrier type of cdma2000, it is convenient to carry out the frequency hopping multiplexing by converting the carriers involved in multi-carrier into hopping enabled carriers when basically multi-carriers are implemented and the channel tracking for each carrier is done independently in parallel.

Among the outputs of the multi-dimensional hopping pattern generator 380, the signal corresponding to the coordinate of the time axis is delivered to the buffers 392, 393 for transmission time hopping. The location of data transmission within the buffers is determined according to the input values, as shown in FIG. 12*c*.

In FIG. 12*c*, "1" indicates the existence of transmitting data and "0" indicates the absence of transmitting data.

Figure 12D:
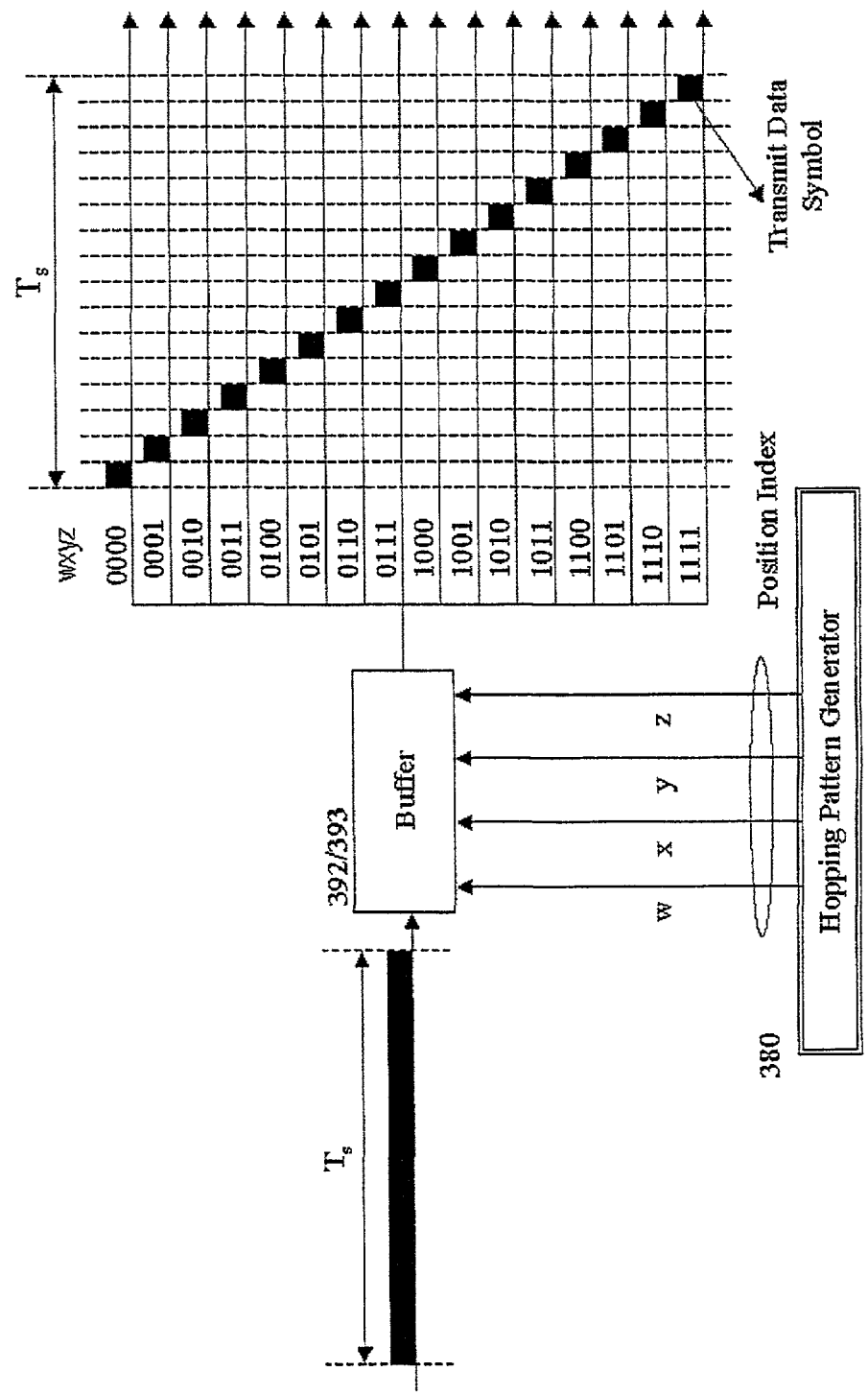
FIG. 12d shows a configuration of data symbol position selector (or buffer) according to the output of time hopping pattern generator in the transmitter of the primary communication station in the embodiments of the present invention.

FIG. 12*d* shows an example of an implementation when the number of probable positions for the existence of transmitting data is 16 in FIG. 12*c*.

The transmission time hopping as a multi-dimensional hopping multiplexing method is carried out in transmission symbol unit rather than in frame or time slot by taking an instant transmission rate as the basic transmission rate (R) in order to maximize the statistical multiplexing and to conveniently track the communication channels to the secondary communication station. The hopping is carried out in symbol unit. It is relatively convenient to track the changes of the channels in the secondary communication station since the transmission symbols are distributed evenly in probability within a frame.

Figure 12E:
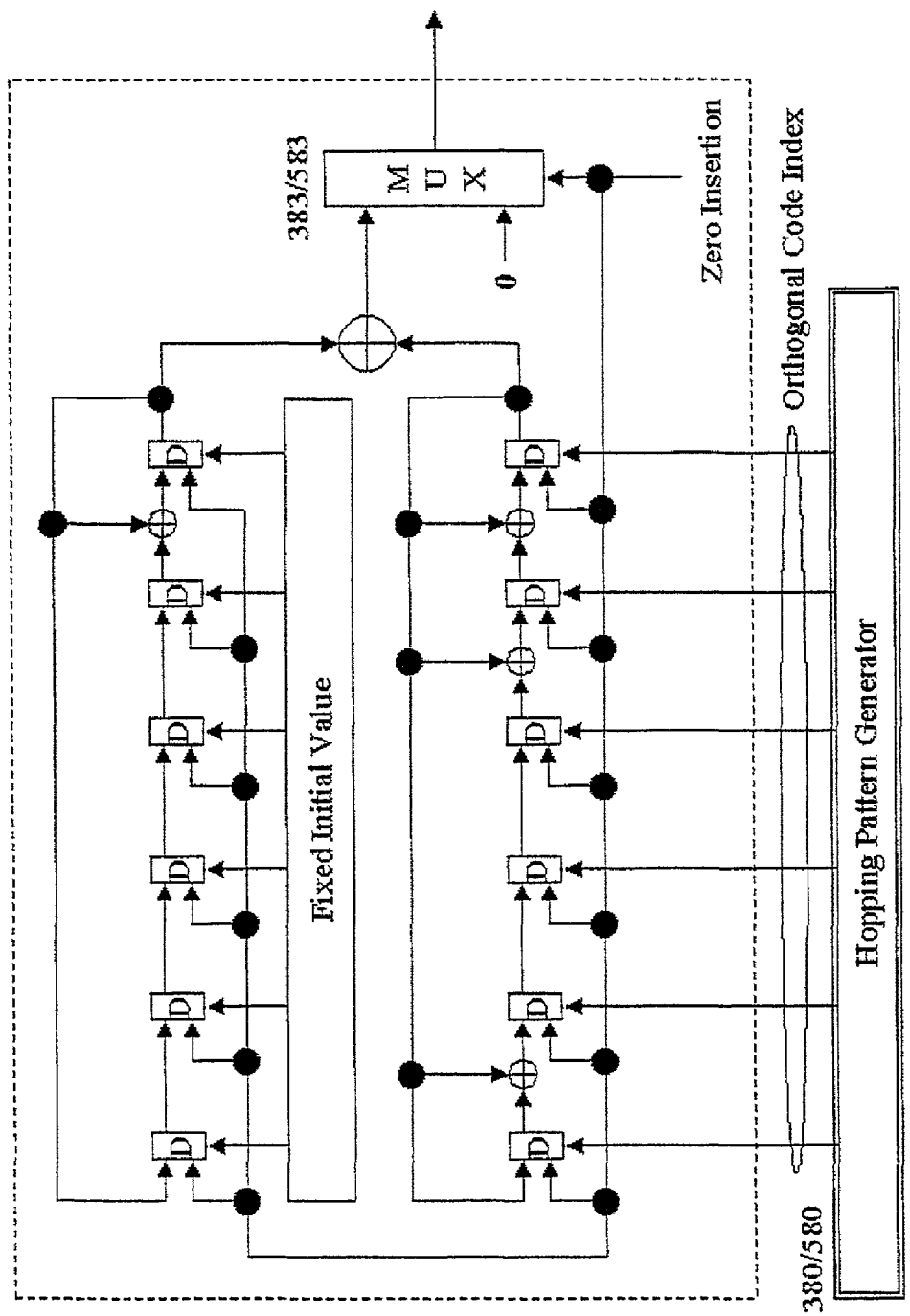
FIG. 12e illustrates a configuration of orthogonal Gold code generator according to the orthogonal code hopping patterns in the embodiments of the present invention (orthogonal resource=orthogonal Gold code).

The orthogonal codes generated from the orthogonal code generator 382 can either be orthogonal gold codes that are generated by the orthogonal gold code generator in FIG. 12*e* or any other orthogonal codes that maintain orthogonality such as the Orthogonal Variable Spreading Factor of a hierarchical configuration that becomes a Walsh code with respect to a specified spreading factor.

Among the outputs of the multi-dimensional hopping pattern generator 380, if the coordinates of the orthogonal code axis is fixed, then this is an orthogonal code division multiplexing method which is identical to the conventional method. By separating one orthogonal code into two orthogonal symbol groups, one orthogonal code symbol group is used for an orthogonal code division by a fixed allocation and the other is used for an orthogonal code hopping multiplexing by the hopping patterns. One of the two divided orthogonal symbol groups is orthogonal code hopping multiplexed using randomly selected patterns in order to avoid collisions between the hopping patterns and the other orthogonal code symbol group is orthogonal code hopping multiplexed by the statistical multiplexing using independent hopping patterns between the channels with a possibility of hopping pattern collisions.

In both cases, the former is allocated when either the transmitting data is important or the activity of channel is high, and the latter can gain a statistical advantage by allocating to a channel that generates a relatively bursty traffic.

Figure 12F:
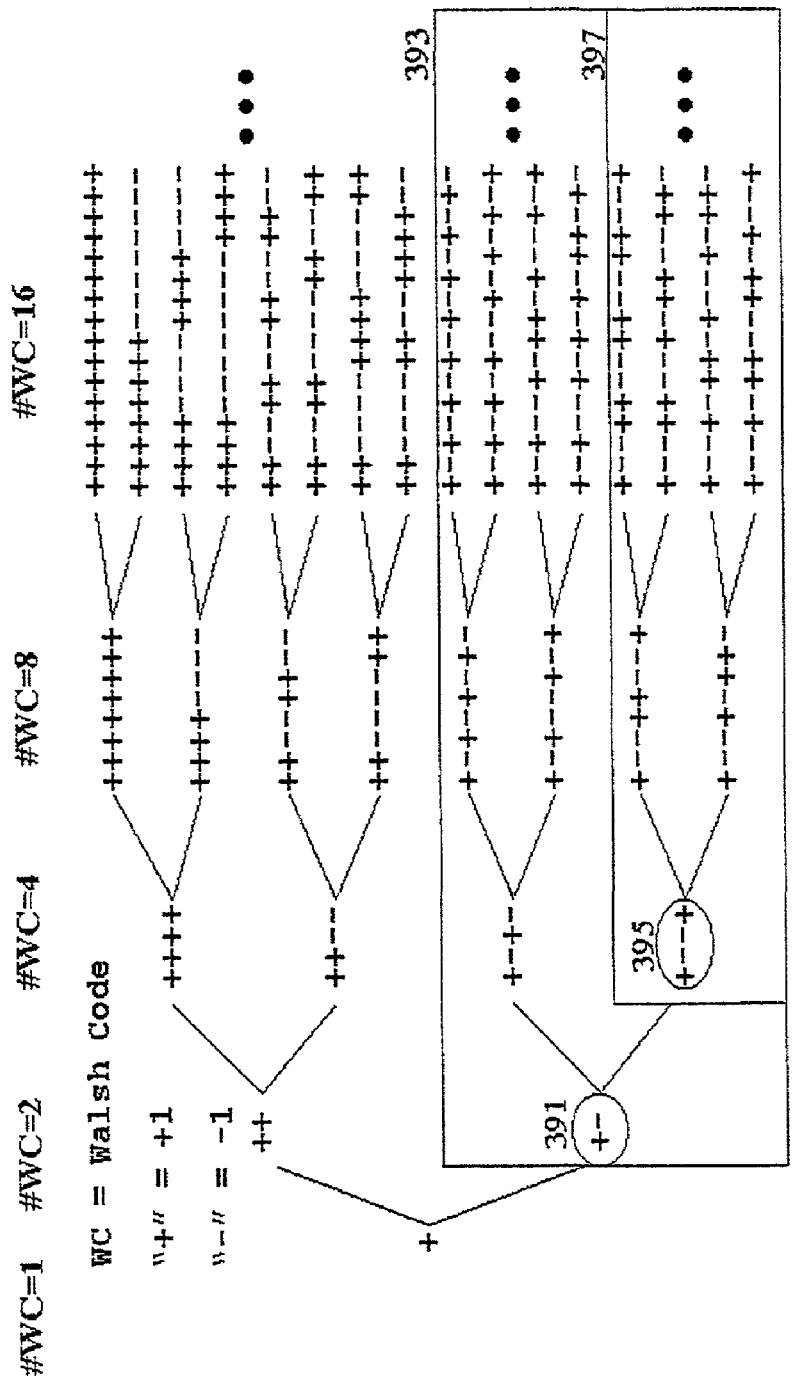
FIG. 12f shows a tree-structured orthogonal Walsh code according to several spreading factors (orthogonal resource=orthogonal Walsh code).
Figure 12G:
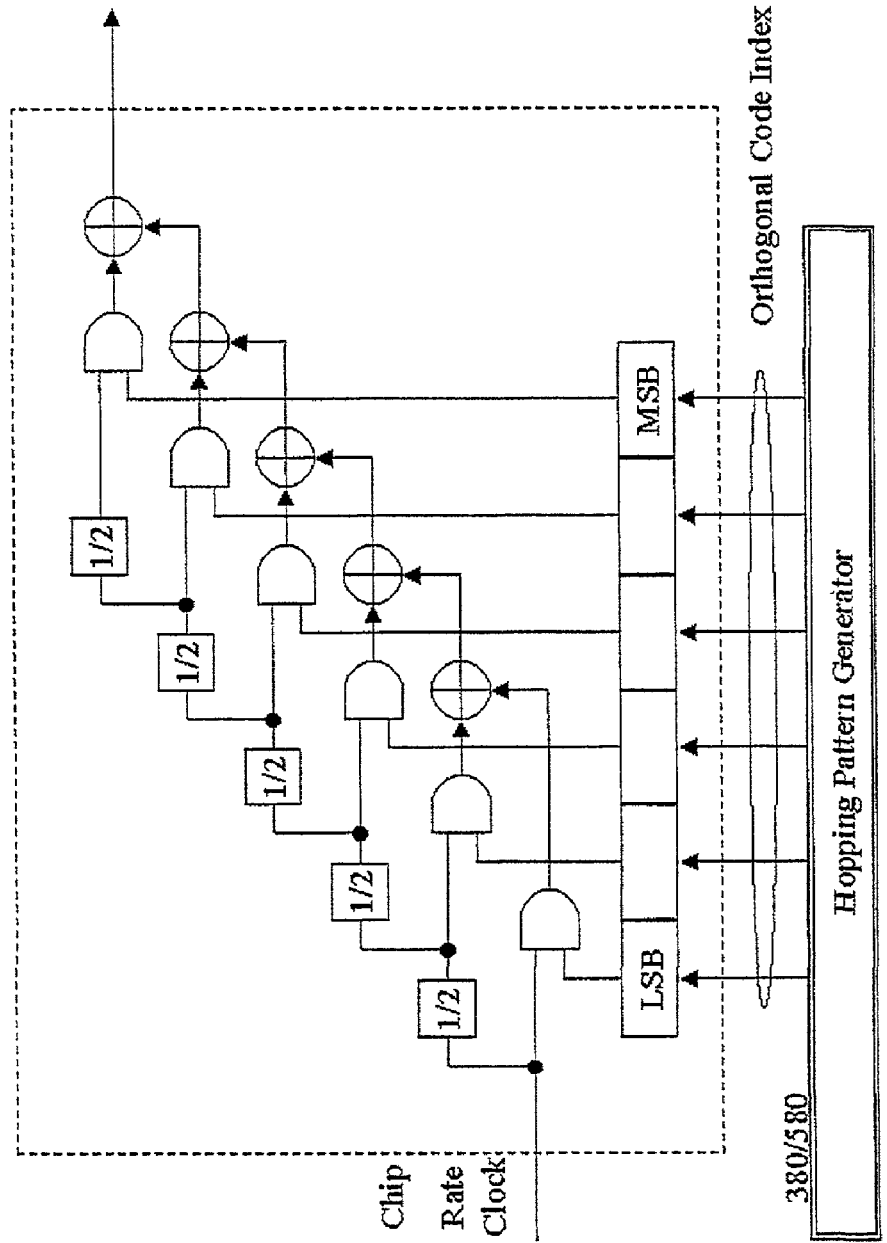
FIG. 12g illustrates a configuration of orthogonal Walsh code generator according to the orthogonal code hopping patterns in the embodiments of the present invention (orthogonal resource=orthogonal Walsh code).
Figure 12H:
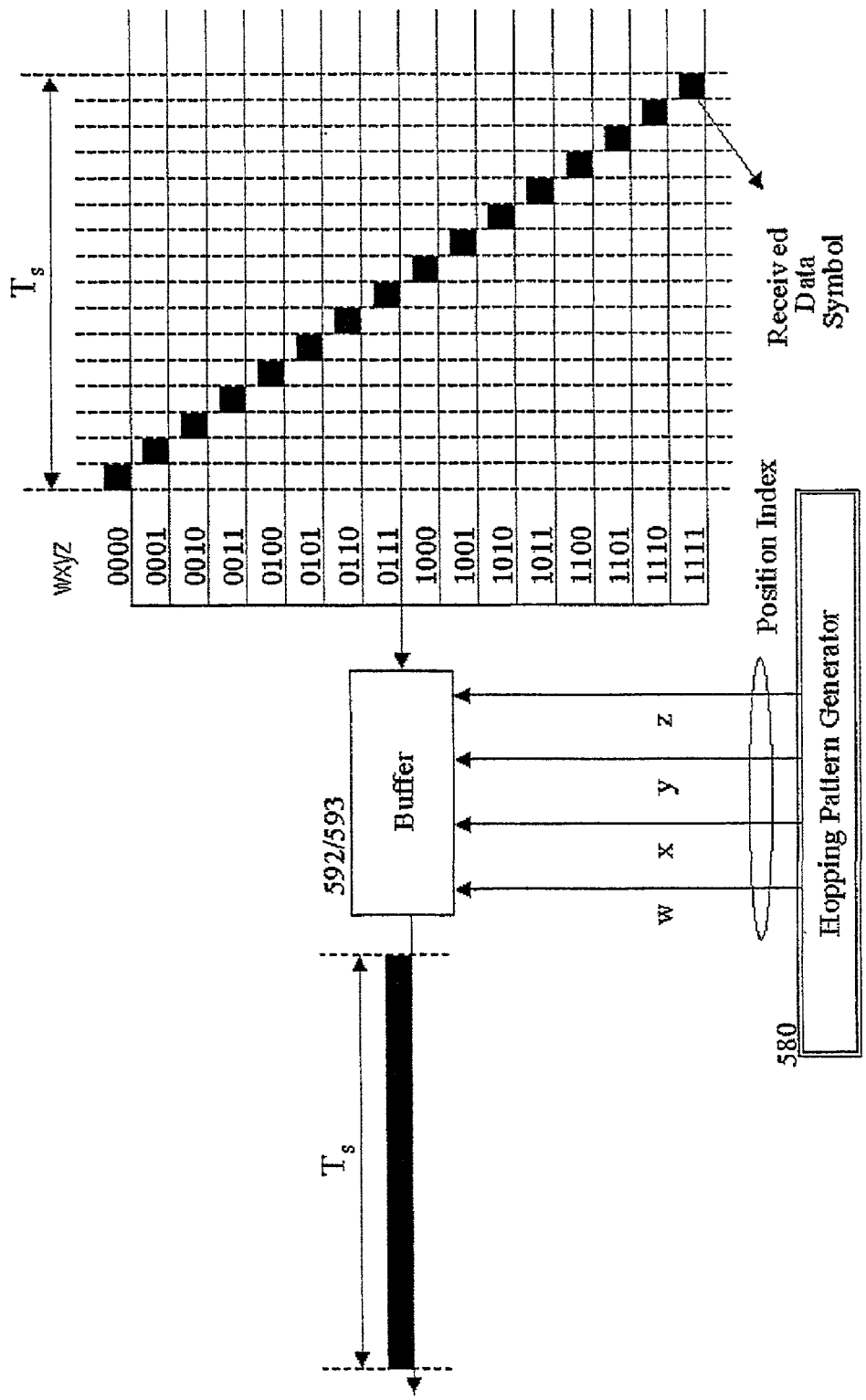
FIG. 12h shows a configuration of symbol position selector (or buffer) according to the output of time hopping pattern generator in the transmitter of the second communication in the embodiments of the present invention.

In case that hierarchical orthogonal codes which assist the variable spreading advantage are used as spreading codes shown in FIG. 12*f*, it is convenient to divide an orthogonal code into an orthogonal code symbol group that consists of child code symbols which possess the same parents symbols 391, 395 such as "01" or "0110" when dividing the orthogonal codes.

As briefly mentioned previously, for the case when the multi-dimensional hopping pattern generator 380 generates multi-dimensional hopping patterns randomly in order for two different channels not to select an identical resource at the same time for each channel, no collision occurs. However, with this method, no multi-dimensional hopping patterns can be determined by the secondary communication station and the multi-dimensional hopping patterns should be allocated at the time of a call establishment by the primary communication station. Also, the number of multi-dimensional hopping patterns that can be allocated by the primary communication station are constrained b the number of the orthogonal resources and in case when a handoff occurs at the adjacent cell, a new multi-dimensional hopping pattern should be allocated from the adjacent cell.

The purpose of allocating multi-dimensional hopping patterns between the channels toward the secondary communication station without any collisions is not for statistical multiplexing but for attaining the gain from the diversity.

If the channels toward the secondary communication station have a high activity with statistically dense or non-bursty traffic, then it is more efficient to operate without any statistical multiplexing. However, according to the service characteristics, if the channels toward the secondary communication station have a low activity with statistically coarse or bursty traffic, the resources could be wasted. Therefore, independent multi-dimensional hopping patterns are generated in order to attain the gain from statistical multiplexing and time diversity according to the data activity of each channel.

As a result, collisions between the multi-dimensional hopping patterns where two different channels select an identical multi-dimensional resource coordinate at the same time inevitably occur. Hence, in order to resolve these problem in the present invention, the occurrence of a collision between the hopping patterns is determined with a collision detector and controller 384, 386 by receiving all the hopping patters and data symbols to be transmitted for all channels.

All the multi-dimensional hopping patterns for each secondary communication station are generated within the primary communication station and all the data to be transmitted in each secondary communication station pass through the primary communication station. Therefore, whether the multi-dimensional hopping patterns collide or not and whether the transmitting data is identical or not can be ascertained.

All the data symbols from all the channels, corresponding to the case when multi-dimensional hopping patterns collide, are compared and if all the transmitting data symbols are identical, then the data symbols during the colliding interval are transmitted. This is because no errors occur during a channel decoding process for corresponding secondary communication station but even if one the symbols is not identical then the data symbols between the colliding interval of the corresponding channel are not transmitted. To be more specific, according to the results from the collision detector and comparator 384, 386, the inputs for multiplier 385 and 387 become "+1" or "0". The transmission stops for the interval where the input for the multiplier is "0". In order to compensate for the lack of the average receiving energy of the secondary communication station required by the puncturing of the spread data symbols to satisfy the quality, the transmission power of the primary communication station is increased by controlling the gain of amplifiers 315, 335 of the corresponding channel in an amount and interval which is given as a system parameter like 1072 and 1074 in FIG. 15. Separately, the transmission power control of the primary communication station by the secondary communication station according to the conventional method can also be carried out.

Figure 3B:
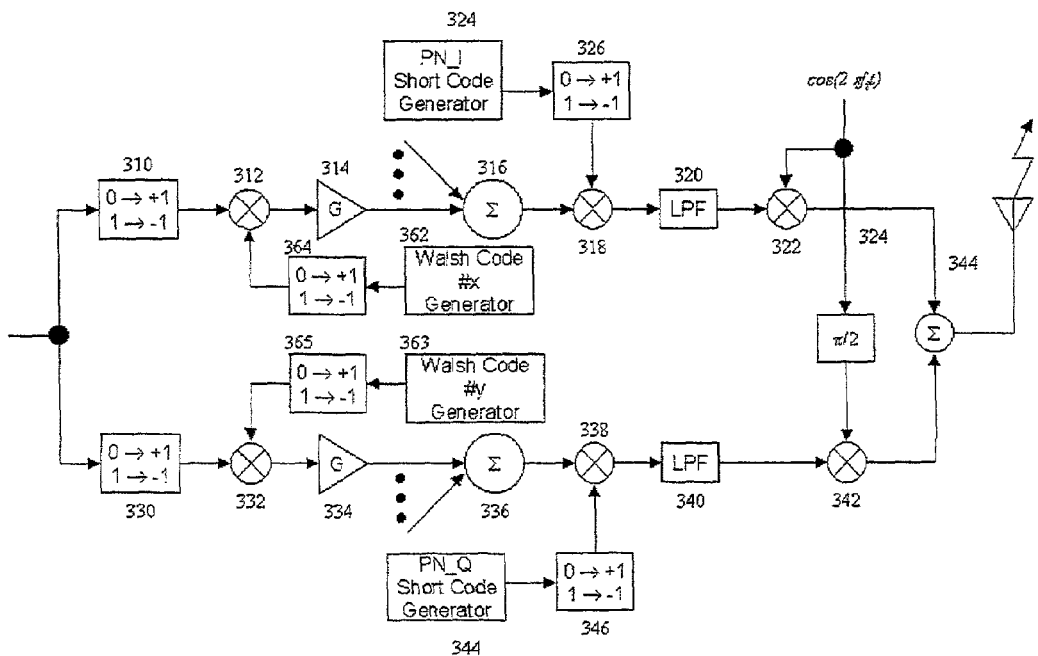
FIG. 3b shows a configuration of transmitter of the primary communication station on the code division multiplexing method according to the embodiments of the prior arts (when it is BPSK modulated and uses different orthogonal code symbols for I/Q channels).
Figure 10B:
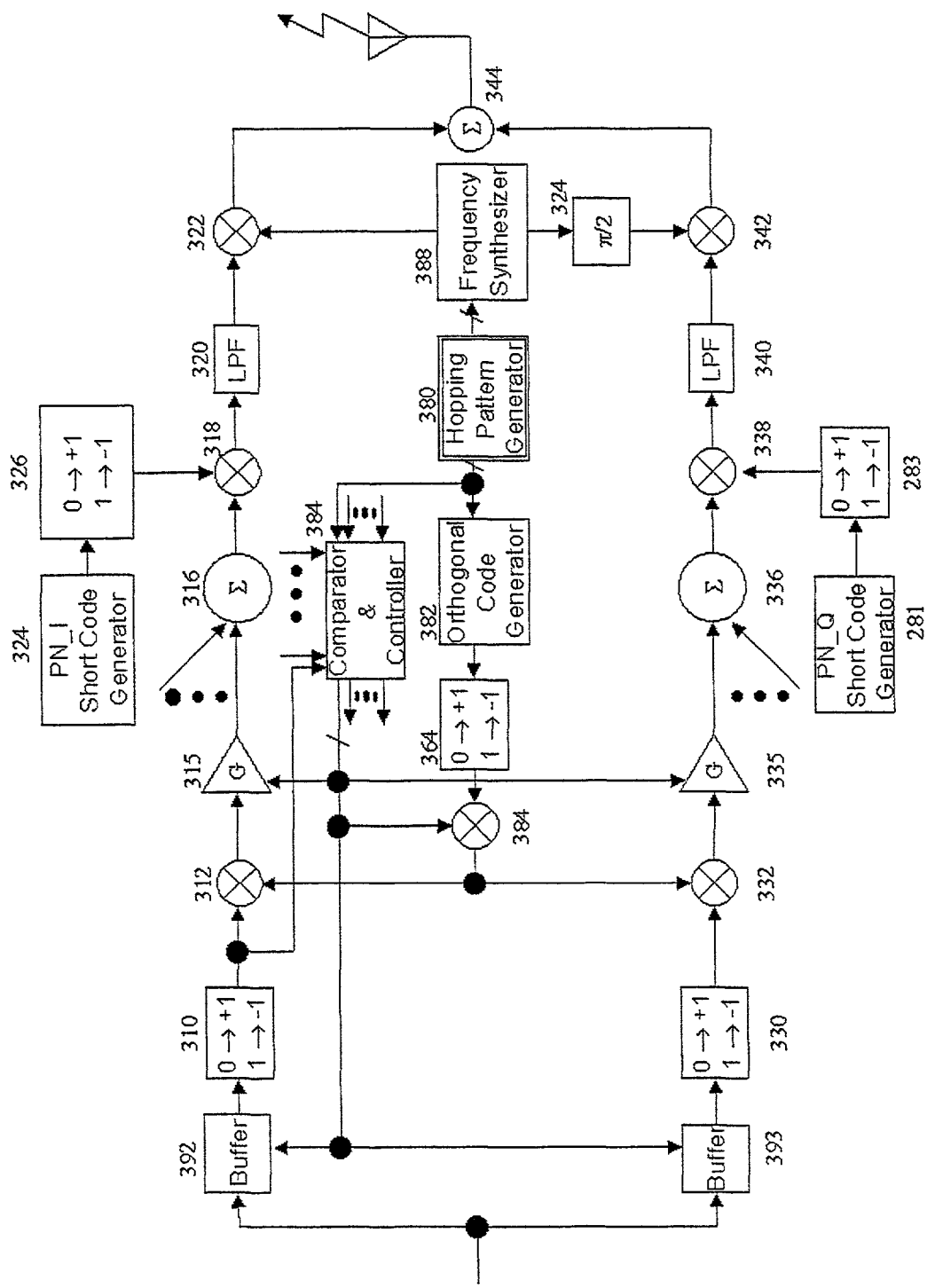
FIG. 10b illustrates a configuration of transmitter of the primary communication station based on the multi-dimensional orthogonal resource hopping multiplexing (MD-ORHM) according to the embodiments of the present invention (corresponding to FIG. 3b).

FIG. 10*b* shows an implementation method for implementing the present invention to the embodiment of the conventional method in FIG. 3*b*.

It is identical to FIG. 10*a* except that independent multi-dimensional hopping patterns are generated at Identical Phase channel (I) and Quadrature Phase channel (Q) of the multi-dimensional hopping pattern generator 380. For the statistical multiplexing using multi-dimensional orthogonal resource hopping as proposed in the present invention, a multi-dimensional hopping pattern generator 380 and a collision detector and controller 384, 385 that determines the independent collision and transmission status for the I/Q channels are required.

Figure 3C:
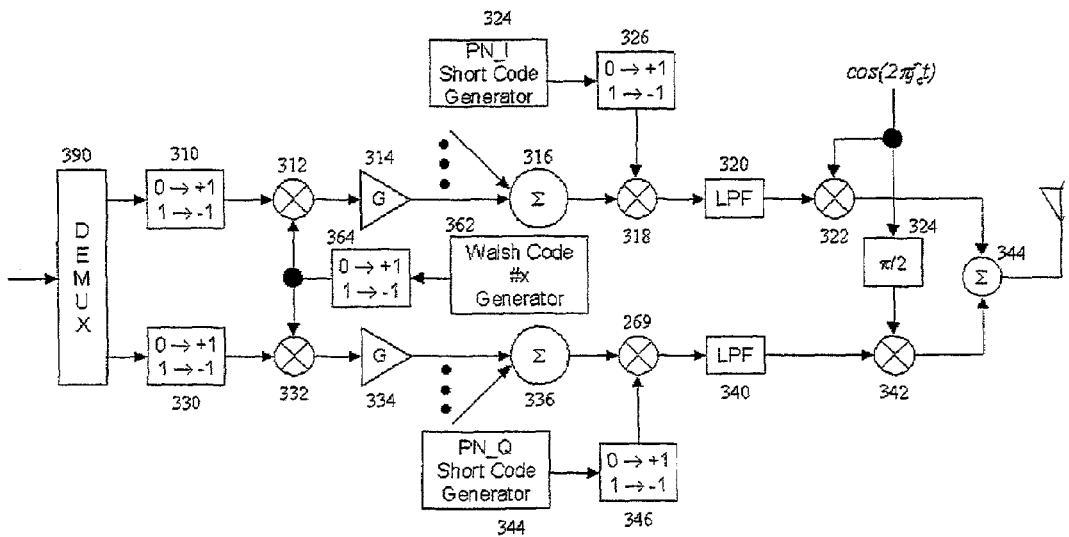
FIG. 3c illustrates a configuration of transmitter of the primary communication station on the code division multiplexing method according to the embodiments of the prior arts (when it is QPSK modulated and uses the same orthogonal code symbol for I/Q channels).
Figure 10C:
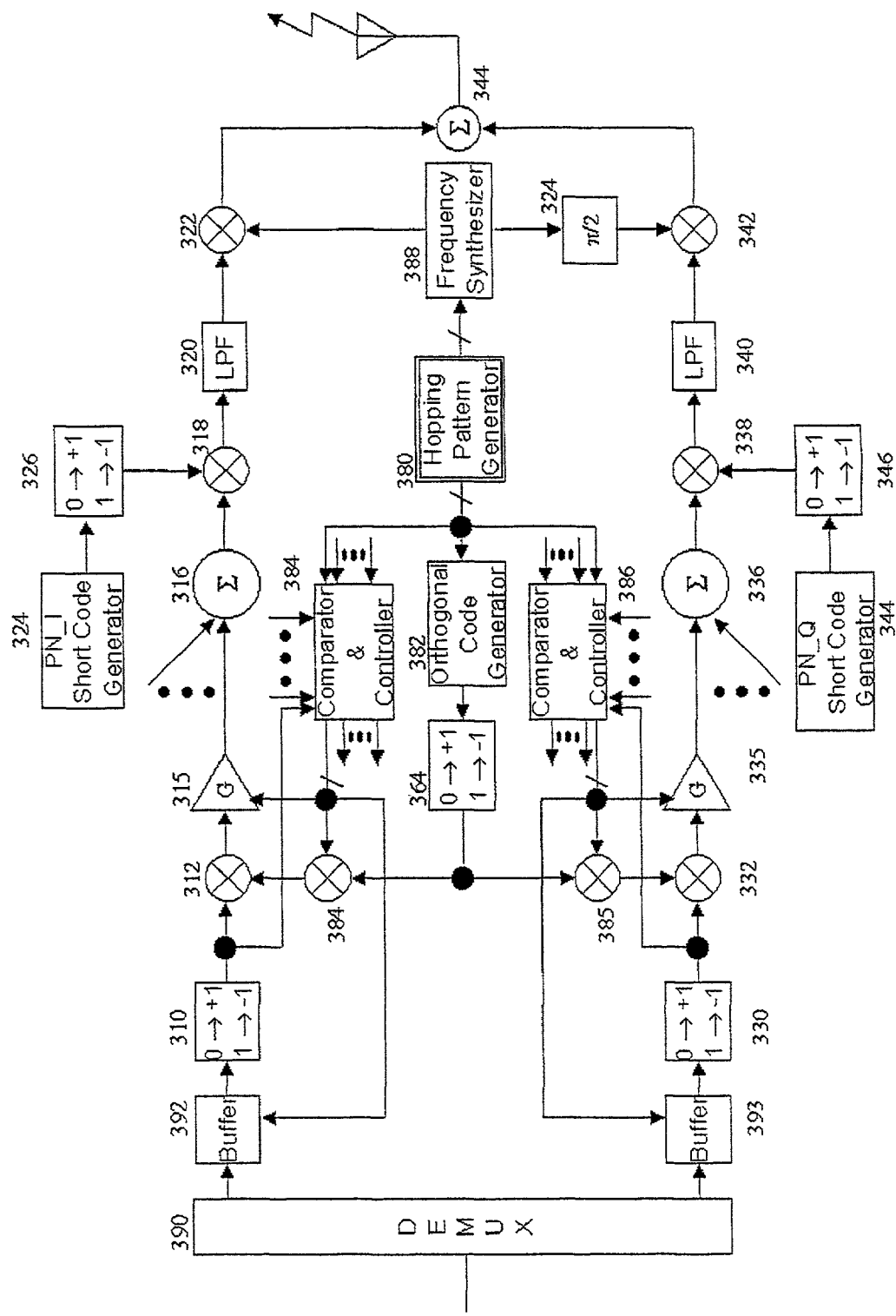
FIG. 10c shows a configuration of transmitter of the primary communication station based on the multi-dimensional orthogonal resource hopping multiplexing (MD-ORHM) according to the embodiments of the present invention (corresponding to FIG. 3c).

FIG. 10*c* shows a diagram for implementing the present invention to the embodiment of the conventional method in FIG. 3*c*.

It is identical to FIG. 10*a* except that the transmitting data to the I and Q channel is different since it modulates QPSK data unlike FIG. 10*a* which modulates BPSK data.

Figure 3D:
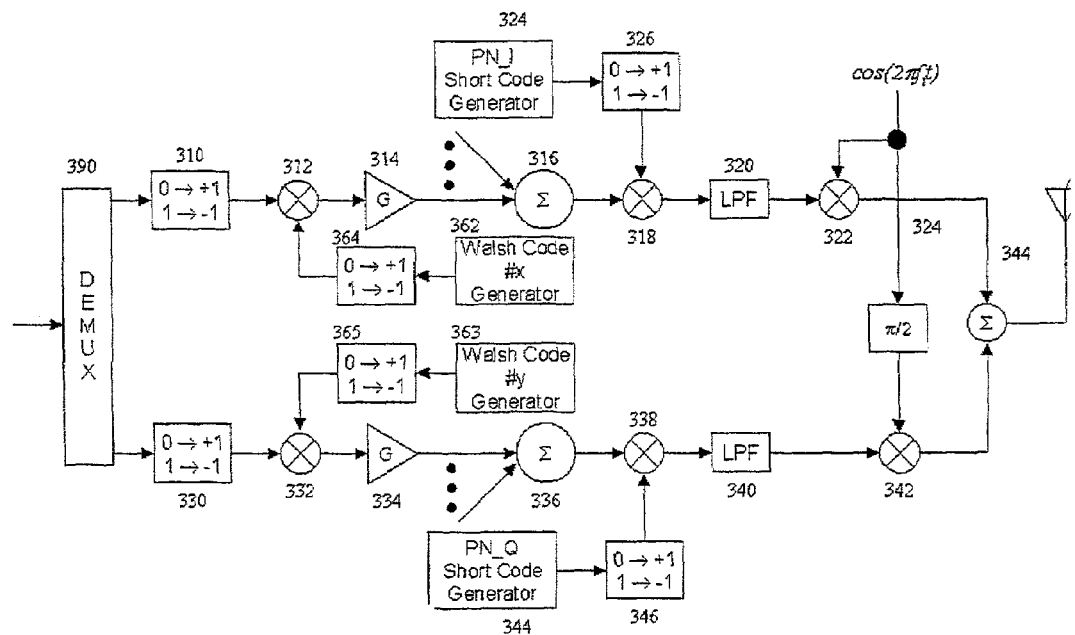
FIG. 3d shows a configuration of transmitter of the primary communication station on the code division multiplexing method according to the embodiments of the prior arts (when it is QPSK modulated and uses different orthogonal code symbols for I/Q channels).
Figure 10D:
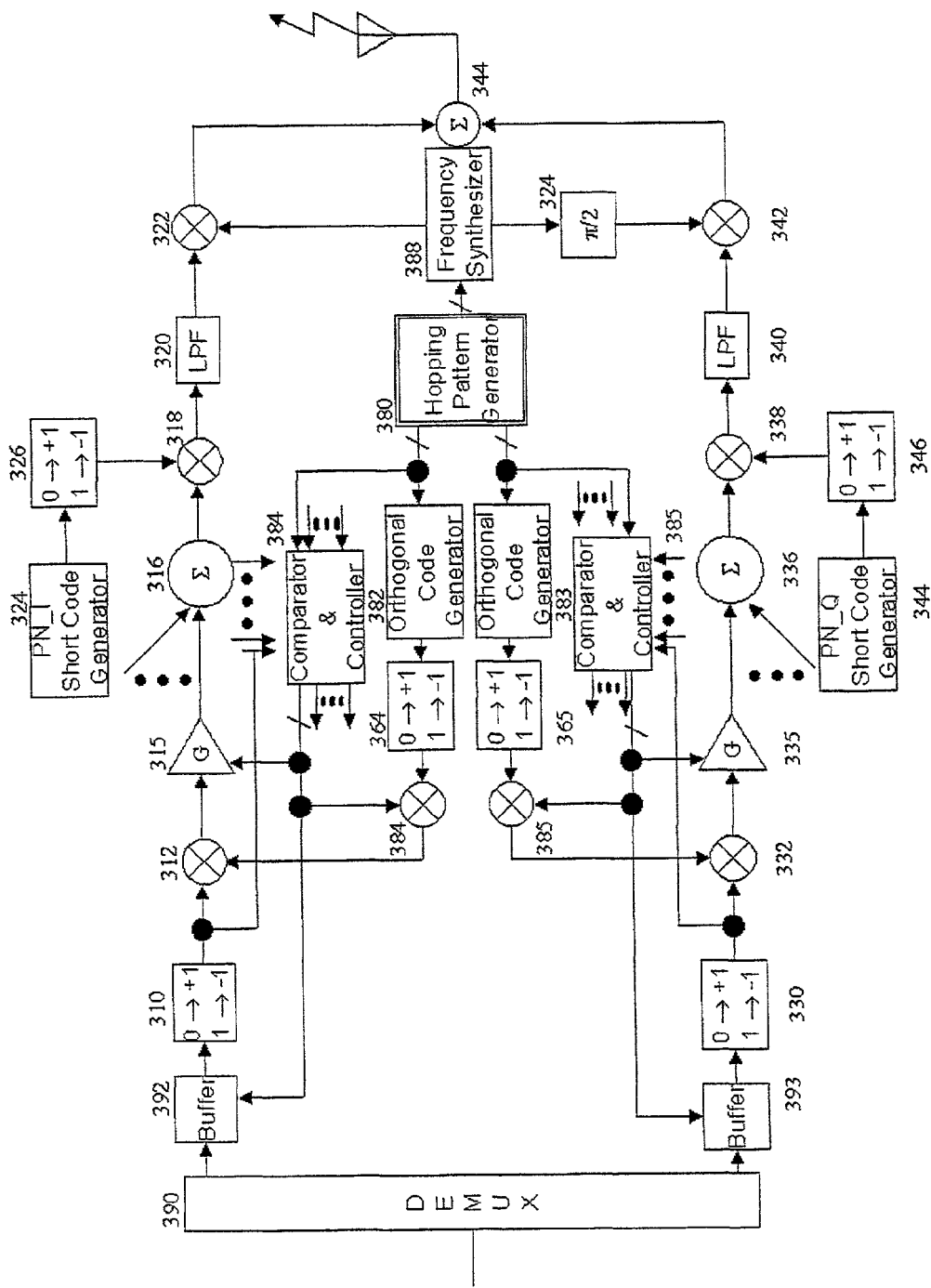
FIG. 10d illustrates a configuration of transmitter of the primary communication station based on the multi-dimensional orthogonal resource hopping multiplexing (MD-ORHM) according to the embodiments of the present invention (corresponding to FIG. 3d).

FIG. 10*d* shows a diagram for implementing the present invention to the embodiment of the conventional method in FIG. 3*d*.

It is identical to FIG. 10*c* except that independent multi-dimensional hopping patterns are generated at the Identical Phase channel (I) and Quadrature Phase channel (Q) of the multi-dimensional hopping pattern generator 380. For the statistical multiplexing using multi-dimensional orthogonal resource hopping as proposed in the present invention, a multi-dimensional hopping pattern generator 380 and a collision detector and controller 384, 385 that determines the independent collision and transmission status for the I/Q channels are required.

Figure 3E:
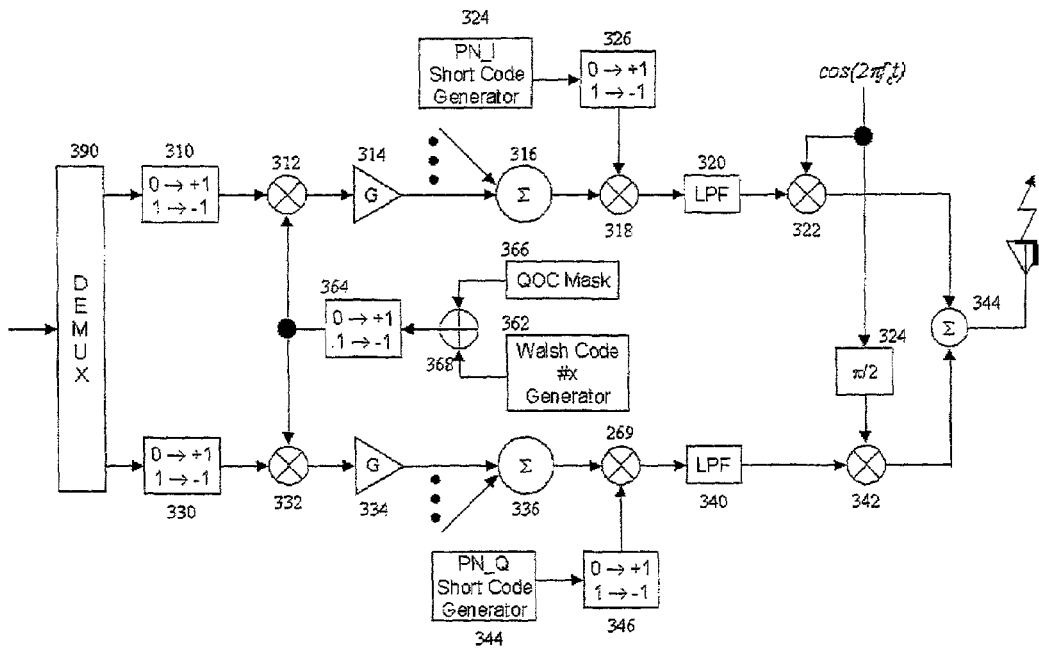
FIG. 3e illustrates a configuration of transmitter of the primary communication station that uses quasi-orthogonal codes according to the embodiments of the prior arts (when it is QPSK modulated and uses the same orthogonal code symbols for I/Q channels).
Figure 10E:
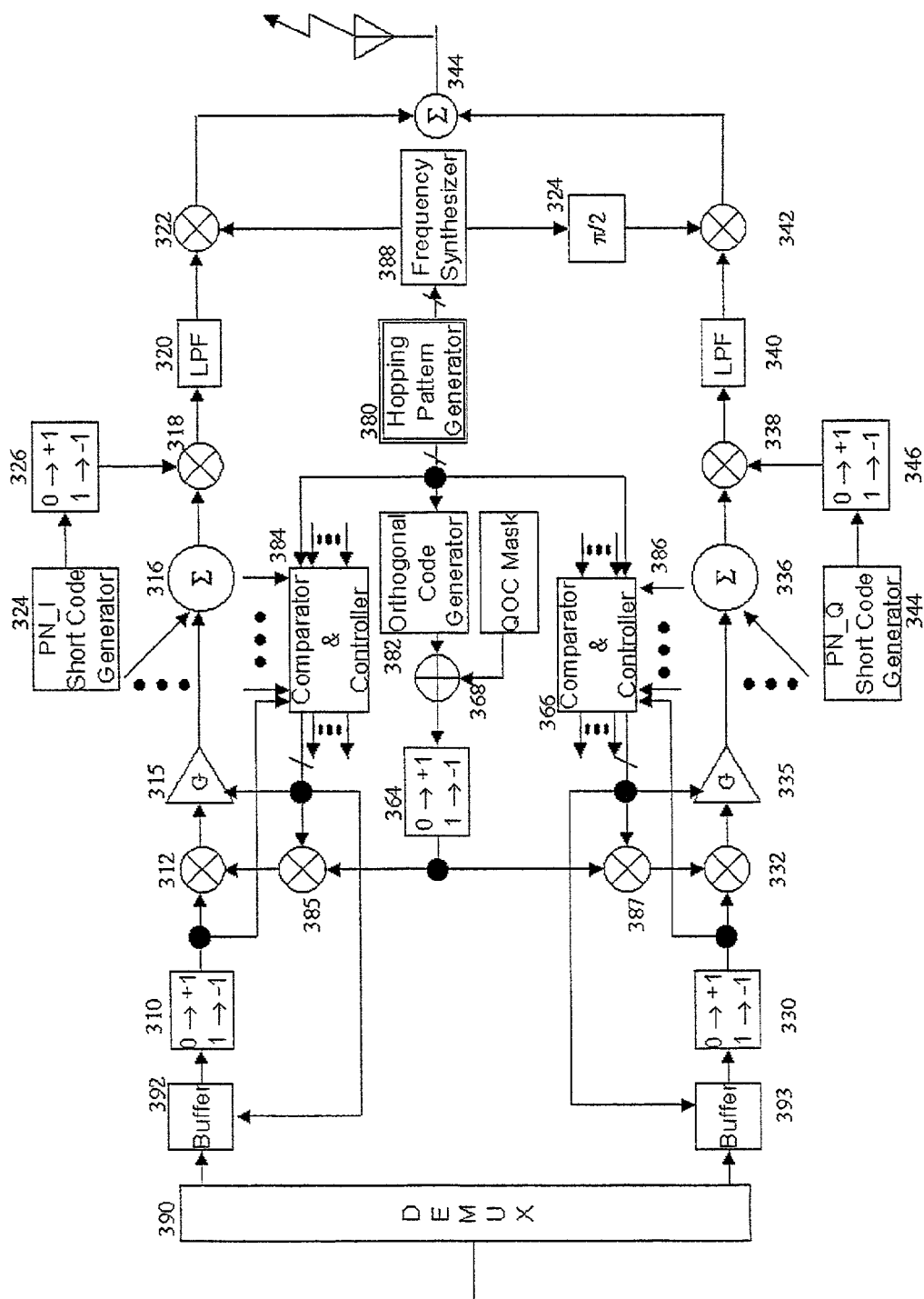
FIG. 10e shows a configuration of transmitter of the primary communication station based on the multi-dimensional orthogonal resource hopping multiplexing (MD-ORHM) according to the embodiments of the present invention (corresponding to FIG. 3e).

FIG. 10*e* illustrates a diagram for implementing the present invention to the embodiment of the conventional method in FIG. 3*e*.

It is identical to FIG. 10*c* except that it is using a Quasi-Orthogonal Code (QOC).

Figure 3F:
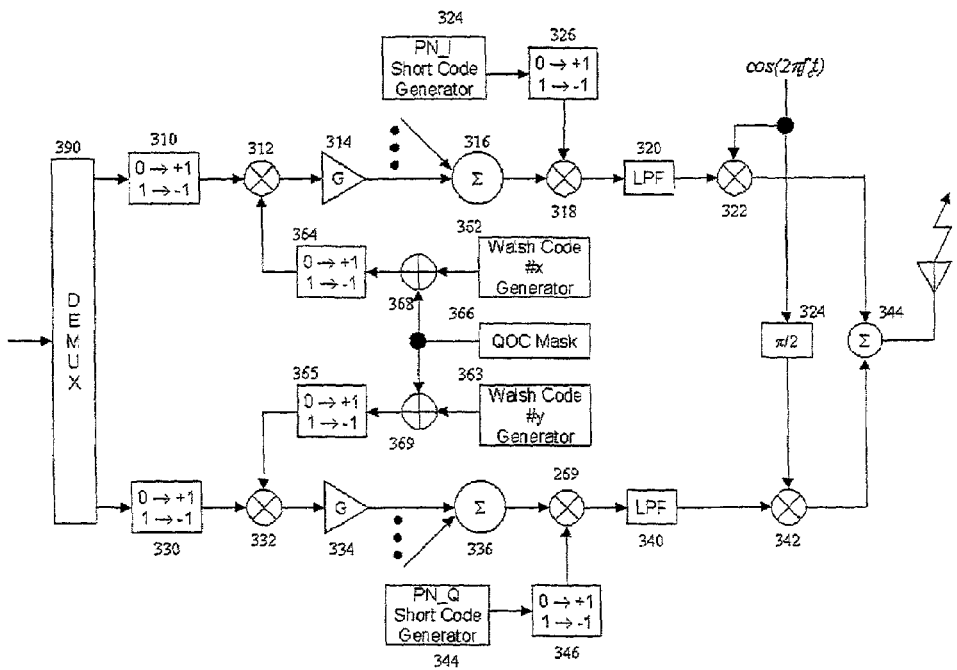
FIG. 3f shows a configuration of transmitter of the primary communication station that uses quasi-orthogonal codes according to the embodiments of the prior arts (when it is QPSK modulated and uses the same orthogonal code symbols for I/Q channels).
Figure 10F:
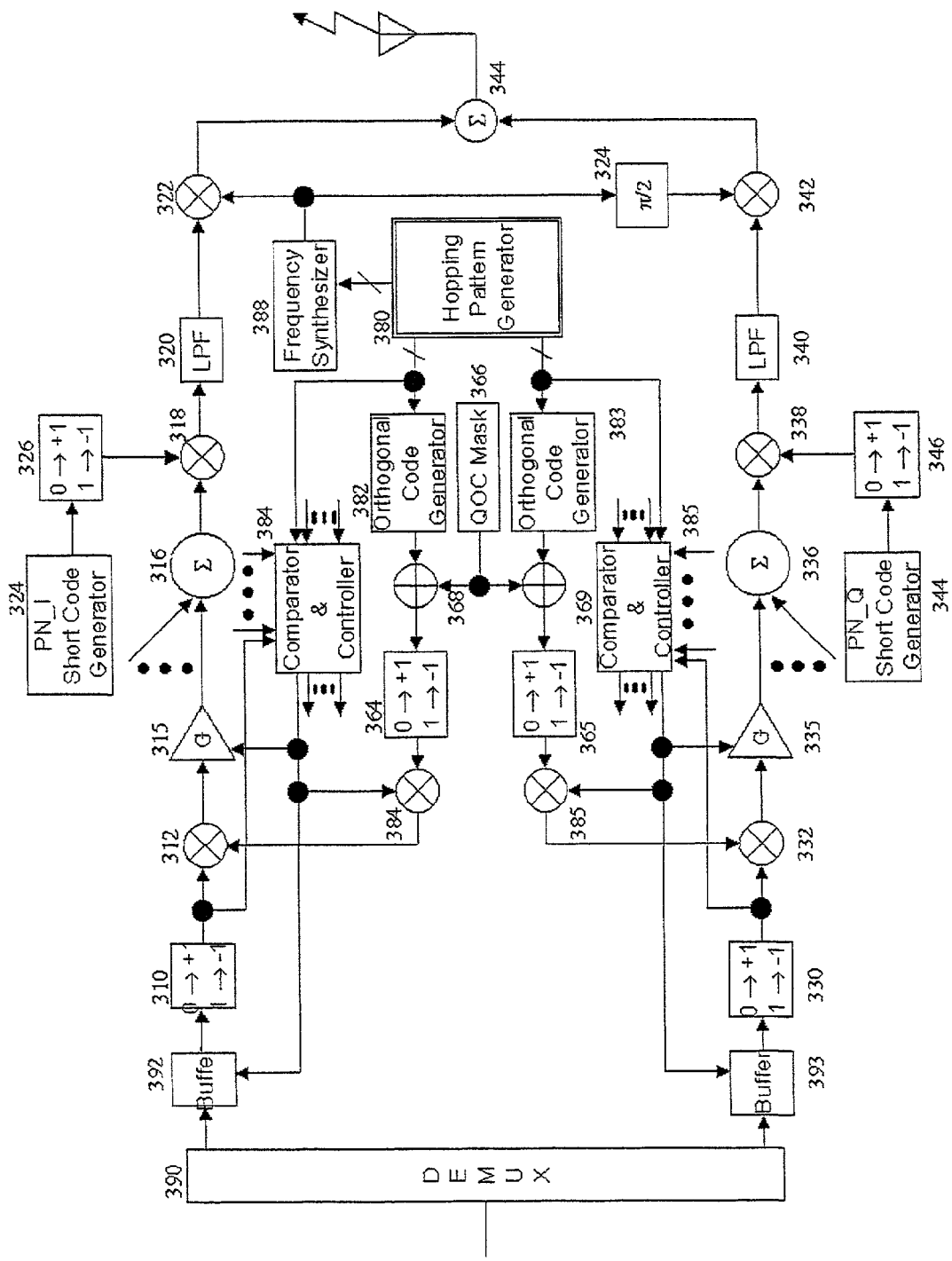
FIG. 10f illustrates a configuration of transmitter of the primary communication station based on the multi-dimensional orthogonal resource hopping multiplexing (MD-ORHM) according to the embodiments of the present invention (corresponding to FIG. 3f).

FIG. 10*f* shows a diagram for implementing the present invention to the embodiment of the conventional method in FIG. 3*f*.

It is identical to FIG. 10*d* except that it is using a Quasi-Orthogonal Code (QOC).

Figure 13A:
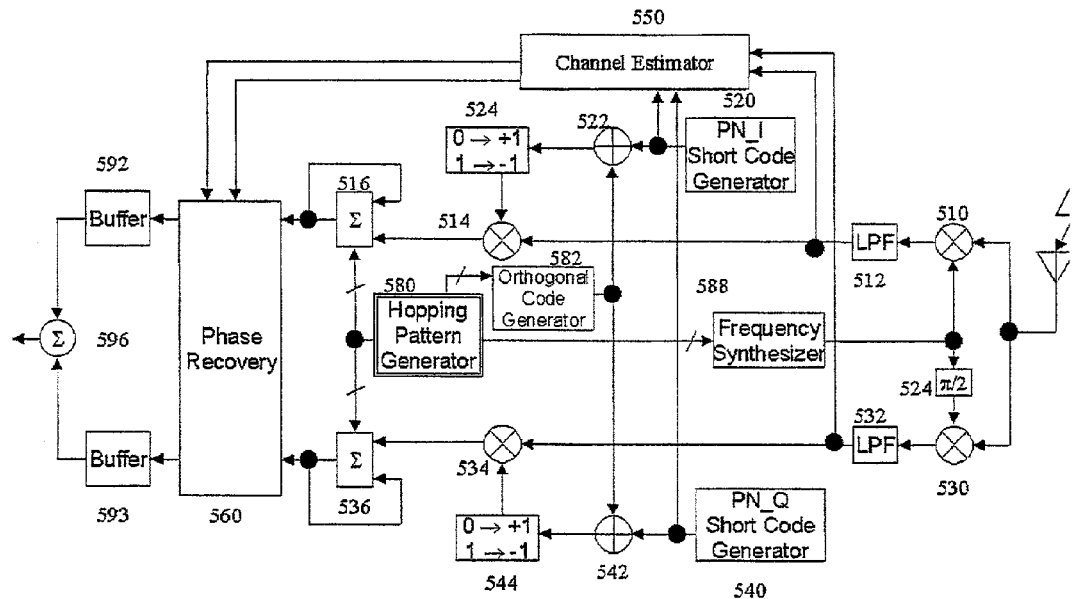

In FIG. 13*a* the signals from the primary communication station, which are received from an antenna, are demodulated 510, 530 by a frequency synthesizer 588 that is controlled by a multi-dimensional hopping pattern generator 580 and pass through a low power filter 512, 532. The low power filtered signals are descrambled 522, 542 using the scrambling codes 520, 540 which are identical to the receiver side and the orthogonal code symbols, generated 582 according to the coordinates of the orthogonal code axis which are delivered by the multi-dimensional hopping pattern generator 580 which is synchronized with the transmitter of the primary communication station, are multiplied 514, 534 and despread by integrating 516, 536 for the corresponding symbol interval. With the despread signals a non-coherent demodulation is carried out by compensating for the phase difference through a channel estimator. The compensated data symbols are delivered to the buffers 592, 593 by matching them with the coordinates of the transmission time axis of the multi-dimensional hopping pattern generator.

Since the transmitter for the primary communication station in FIG. 10*a* performs a BPSK data modulation, the corresponding transmitter for the secondary communication station in FIG. 13*a* adds the received data from the I and Q channels that possess identical information. If independent interleavers exist for each of the I and Q channels in the transmitter of the primary communication station in order to provide time diversity, then they first pass through a deinterleaver and the transmitting data from the I and Q channels are added.

Figure 13B:
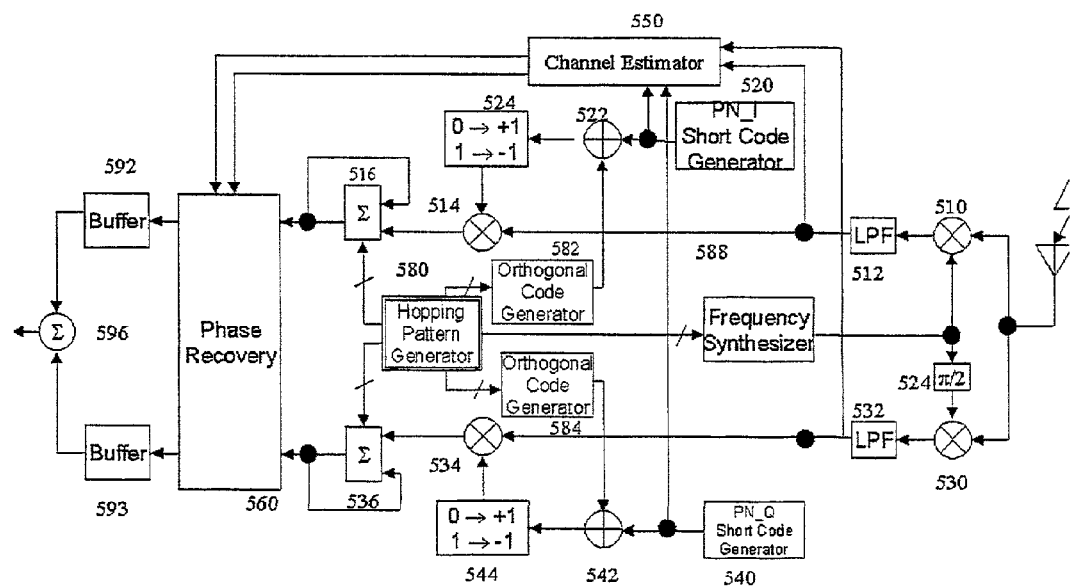
FIG. 13b shows a configuration of receiver of the secondary communication station based on the multi-dimensional orthogonal resource hopping multiplexing method according to the embodiments of the present invention in FIG. 10b.

FIG. 13*b* illustrates a configuration of the receiver in the secondary communication station for the orthogonal resource hopping multiplexing method according to the present invention in FIG. 10*b*. It is identical to FIG. 13*a* except that there exist an independent code generator 582, 584 for each of the I and Q channels.

Figure 13C:
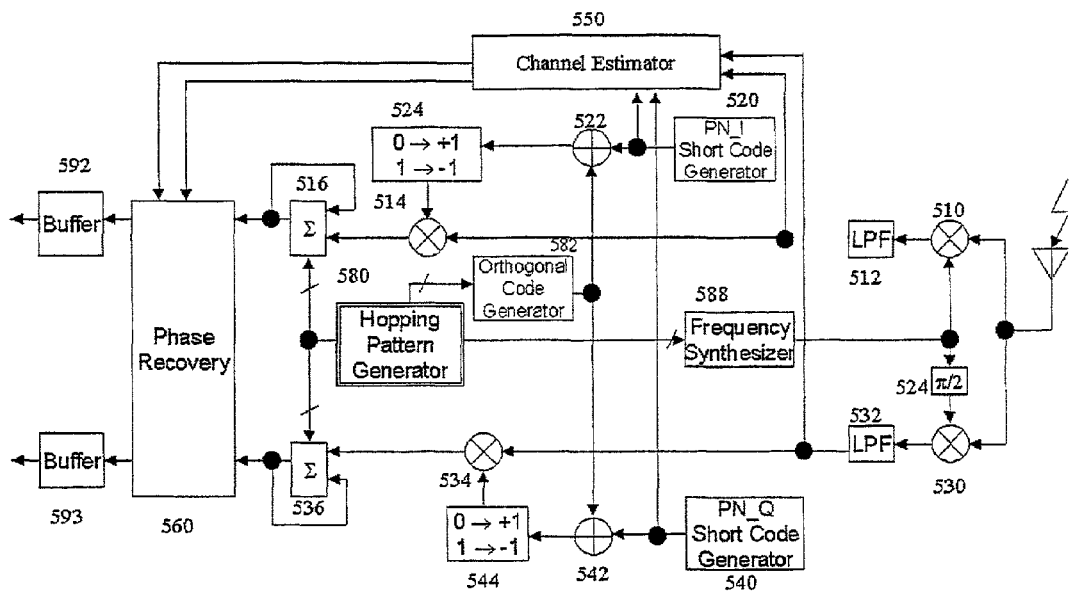
FIG. 13c illustrates a configuration of receiver of the secondary communication station based on the multi-dimensional orthogonal resource hopping multiplexing method according to the embodiments of the present invention in FIG. 10c.

FIG. 13*c* shows a configuration of the receiver in the secondary communication station for the orthogonal resource hopping multiplexing method according to the present invention in FIG. 10*c*. It is identical to FIG. 13*a* except that since the transmitter for the primary communication station in FIG. 10*c* performs a QPSK data modulation, the corresponding transmitter for the secondary communication station in FIG. 13*c* does not add the received data from the I and Q channels that possess different information.

Figure 13D:
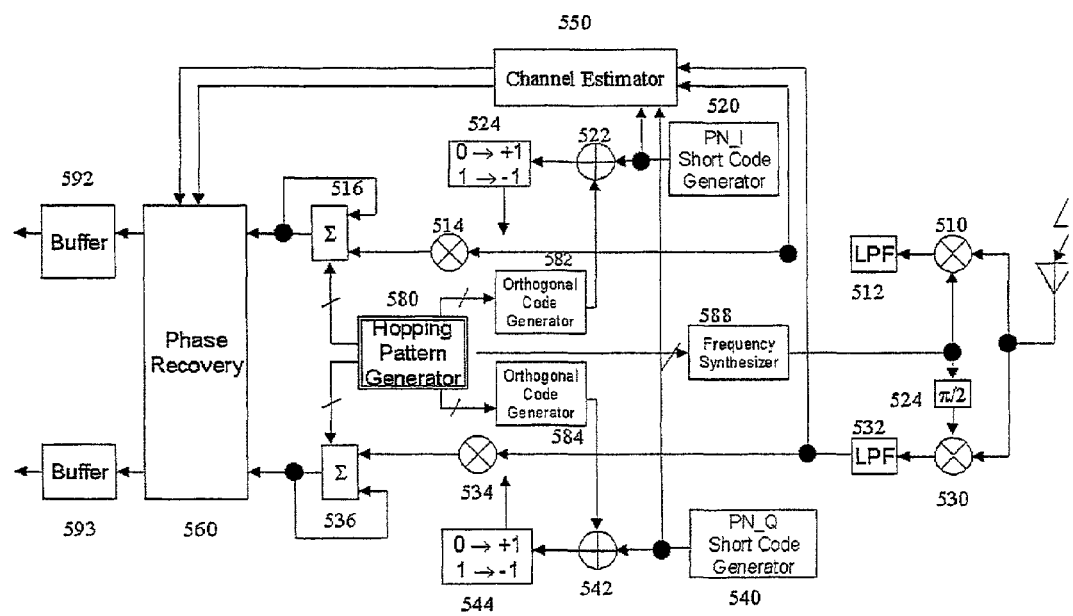
FIG. 13d shows a configuration of receiver of the secondary communication station based on the multi-dimensional orthogonal resource hopping multiplexing method according to the embodiments of the present invention in FIG. 10d.

FIG. 13*d* illustrates a configuration of the receiver in the secondary communication station for the orthogonal resource hopping multiplexing method according to the present invention in FIG. 10*d*. It is identical to FIG. 13*c* except that there exist an independent code generator 582, 584 for each of the I and Q channels.

Figure 13E:
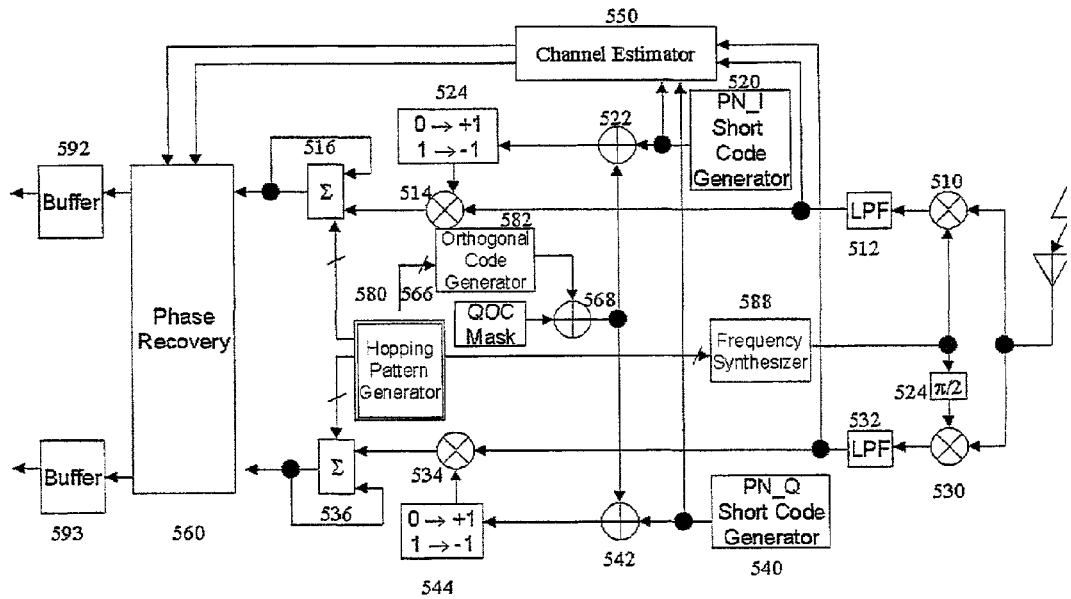
FIG. 13e illustrates a configuration of receiver of the secondary communication station based on the multi-dimensional orthogonal resource hopping multiplexing method according to the embodiments of the present invention in FIG. 10e.

FIG. 13*e* shows a configuration of the receiver in the secondary communication station for the orthogonal resource hopping multiplexing method according to the present invention in FIG. 10e. It is identical to FIG. 13e except that it despreads by using a quasi-orthogonal code 566.

Figure 13F:
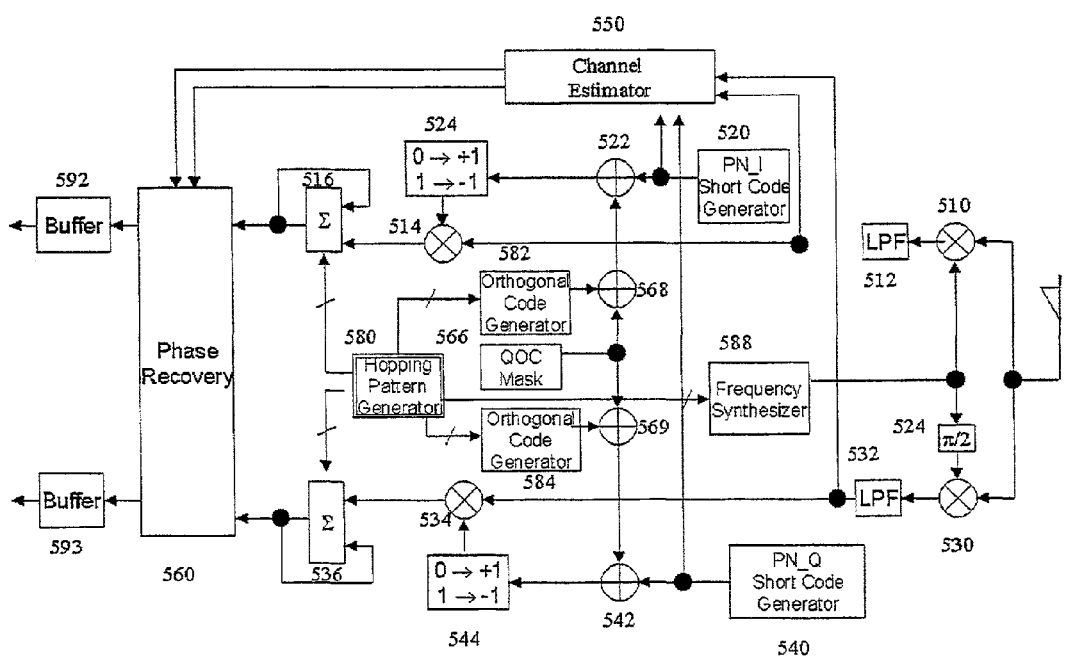
FIG. 13f shows a configuration of receiver of the secondary communication station based on the multi-dimensional orthogonal resource hopping multiplexing method according to the embodiments of the present invention in FIG. 10f.

FIG. 13f illustrates a configuration of the receiver in the secondary communication station for the orthogonal resource hopping multiplexing method according to the present invention in FIG. 10f. It is identical to FIG. 13e except that there exist an independent code generator 582, 584 for each of the I and Q channels.

FIG. 14 shows a concept diagram for a transmission signal from the primary communication station according to the embodiment of the present invention.

Figure 4A:
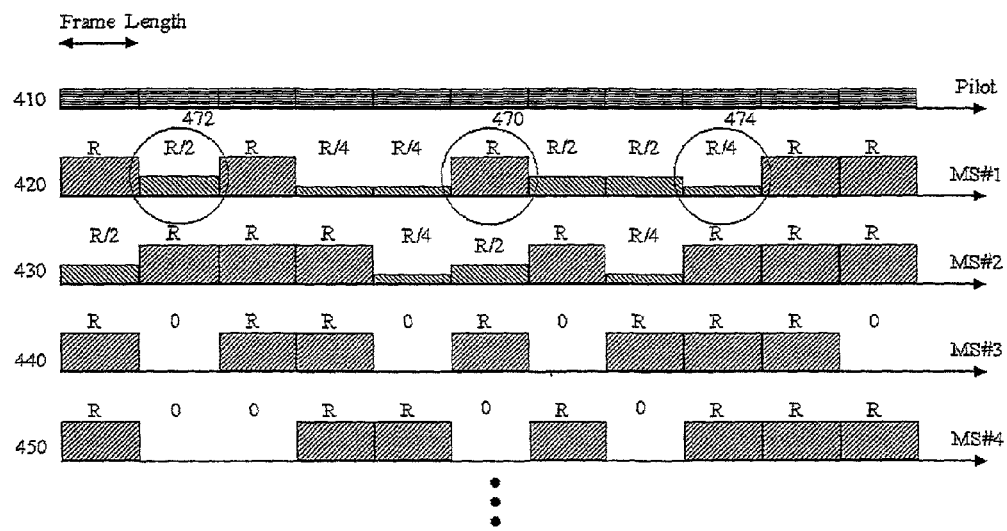
FIG. 4a illustrates a transmission signal diagram for each frame of the primary communication station according to an embodiment of the prior arts
Figure 4B:
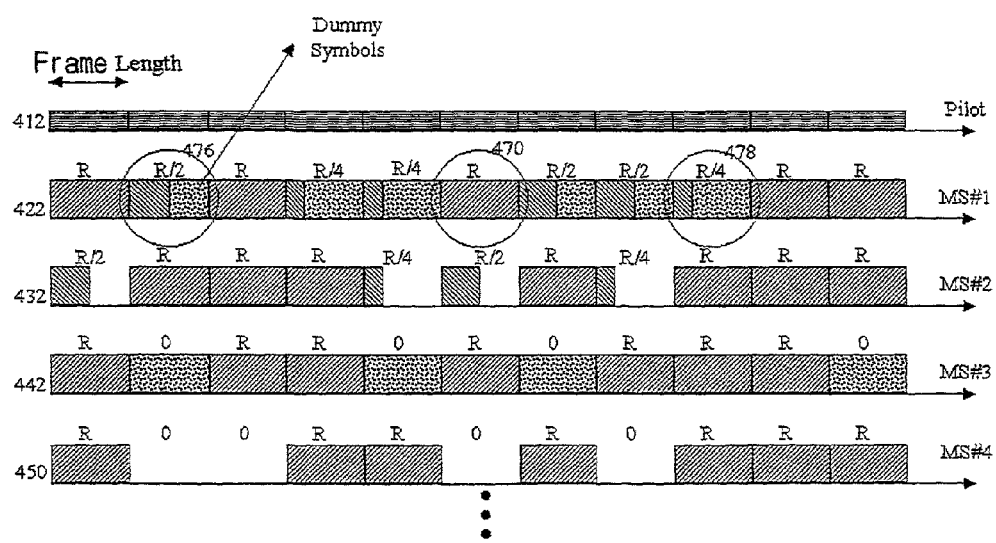
FIG. 4b shows a transmission signal diagram for each frame of the primary communication station according to other embodiment of the prior arts.
Figure 4C:
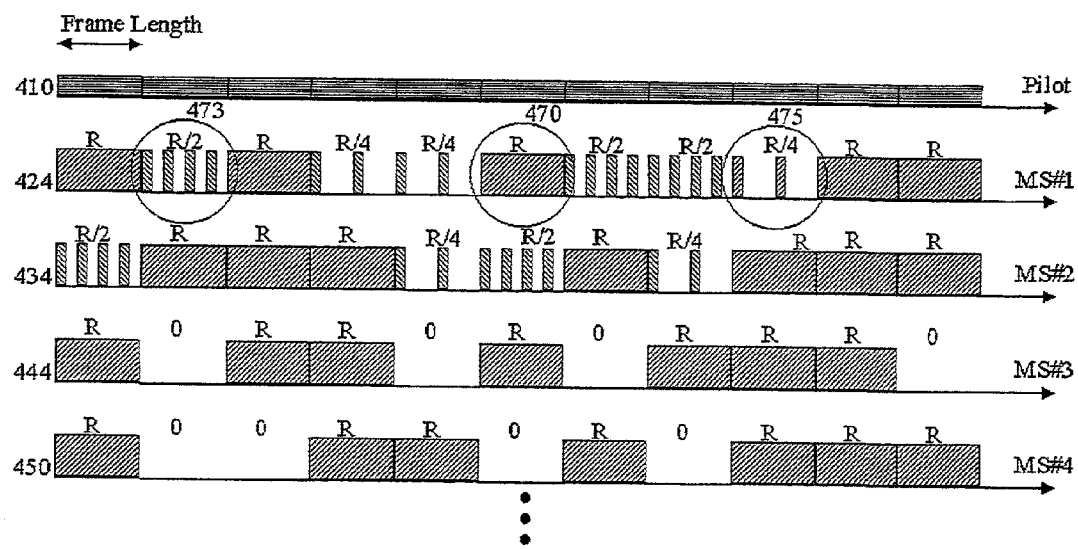
FIG. 4c illustrates a transmission signal diagram for each frame of the primary communication station according to another embodiment of the prior arts.
Figure 4D:
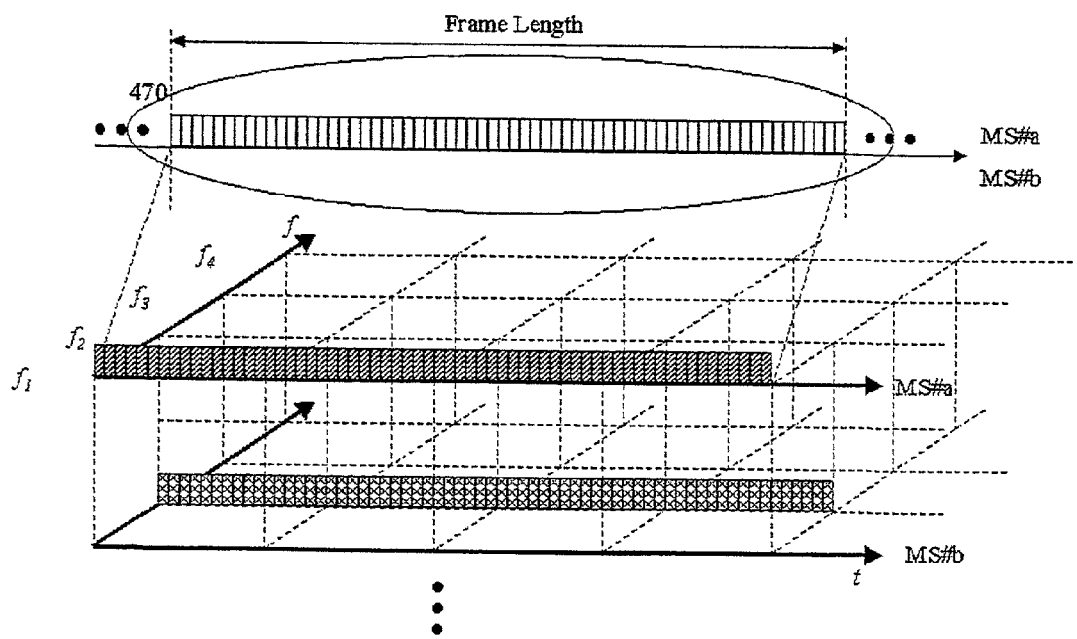
FIG. 4d shows a transmission signal diagram based on the frequency division multiplexing (FDM) according to the prior arts.
Figure 14A:
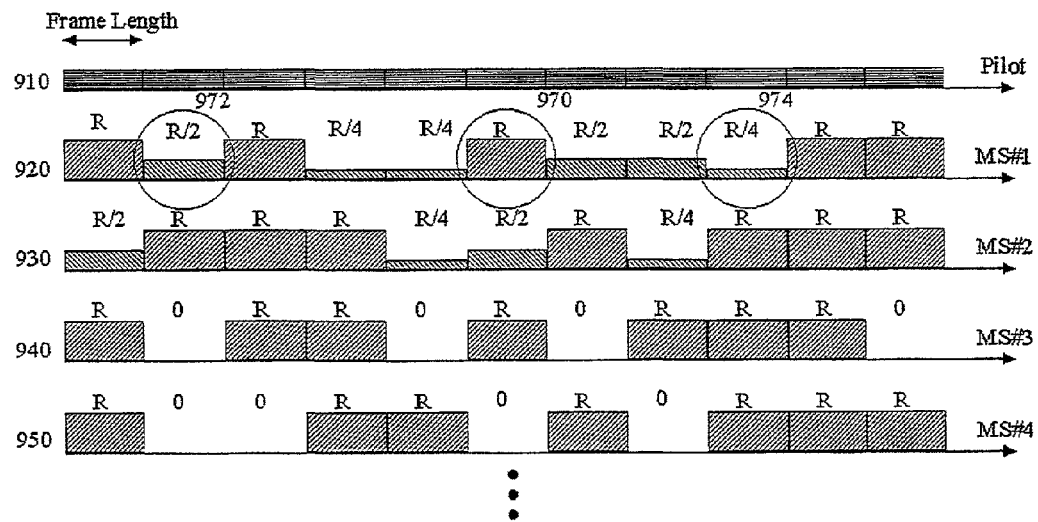
FIG. 14a illustrates a transmission signal diagram from the primary communication station for each frame according to the embodiments of the conventional method.
Figure 14B:
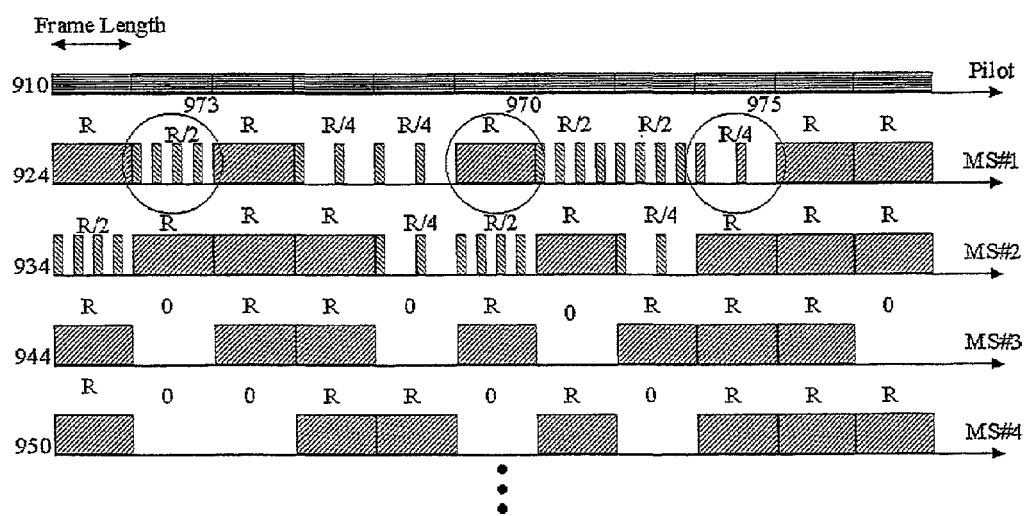
FIG. 14b shows a transmission signal diagram from the primary communication station for each frame according to the embodiments of the present invention.

FIG. 14a is identical to the transmission signal diagram in the primary communication station for each frame according to the embodiment of the conventional method in FIG. 4a. The transmission rate for each frame for the channels from the primary communication station to the second communication varies below the basic transmission rate (R) like 920, 930 according to the service characteristics or repeats transmission (ON) and no transmission (OFF) at the basic transmission rate (R) like 940,950. The channels like 920, 930 can be represented in a channel activity diagram. In the present invention, a transmission time hopping multiplexing is attempted to the channels 920, 930 like 924, 934 in FIG. 14b according to the transmitting data rate for each frame. The transmission time hopping is implemented with the same method in FIG. 12d.

Figure 14C:
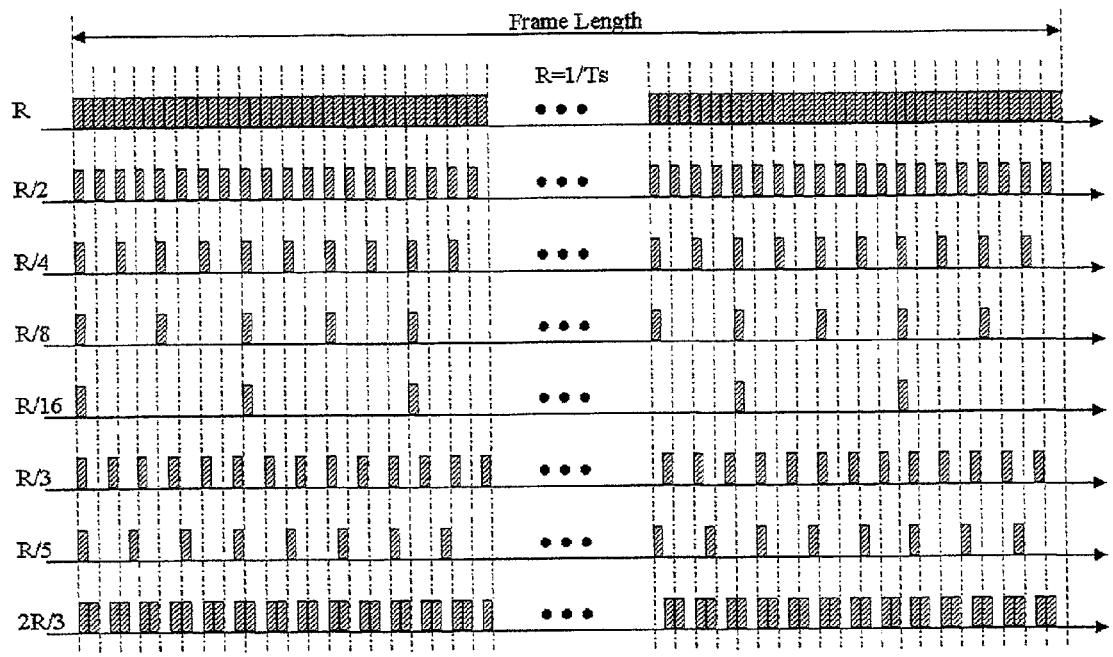
FIG. 14c illustrates a (regularly time-hopped) transmission signal diagram from the primary communication station in a frame (statistically coarse frame) whose transmission rate is below the basic transmission rate (R) according to the embodiments of the present invention.
Figure 14D:
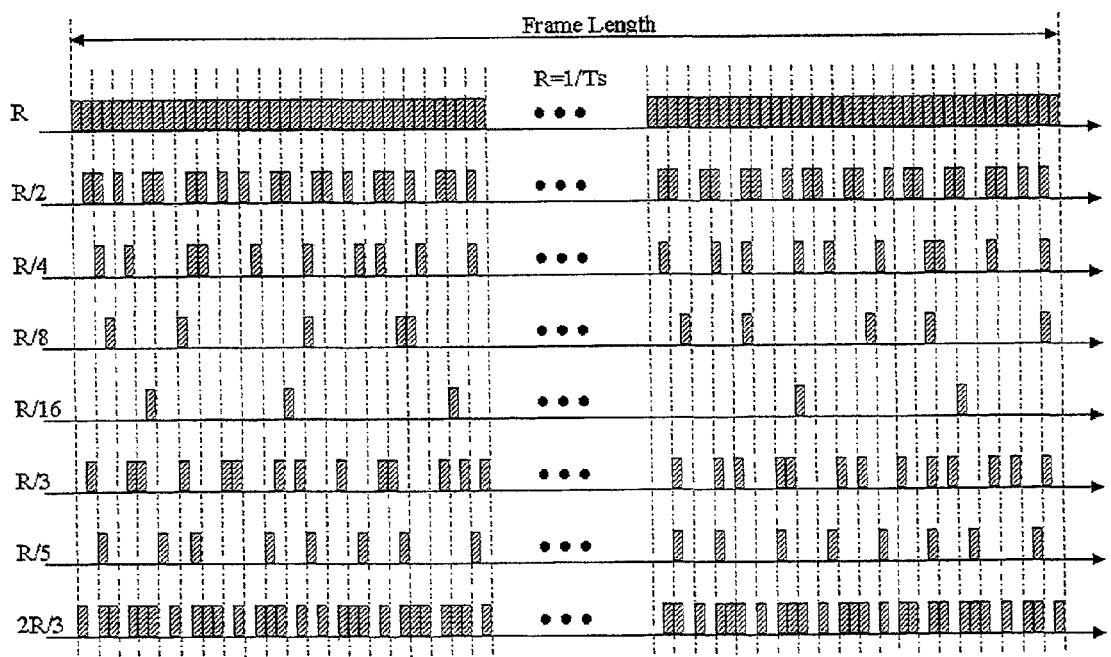
FIG. 14d shows a (irregularly time-hopped) transmission signal diagram from the primary communication station in a statistically coarse frame according to the embodiments of the present invention.

FIGS. 14c and 14d illustrate how the hopping transmission time can be determined in reality with respect to the transmitting data rate for each frame. FIG. 14c shows a regular and periodic hopping. FIG. 14d illustrates an irregular and arbitrary hopping. FIG. 14c is advantageous for time diversity and channel tracking but is inappropriate for statistical multiplexing.

The method in FIG. 14d is useful for statistical multiplexing although a collision might occur if independent multi-dimensional hopping patterns are used for each frame.

Figure 14E:
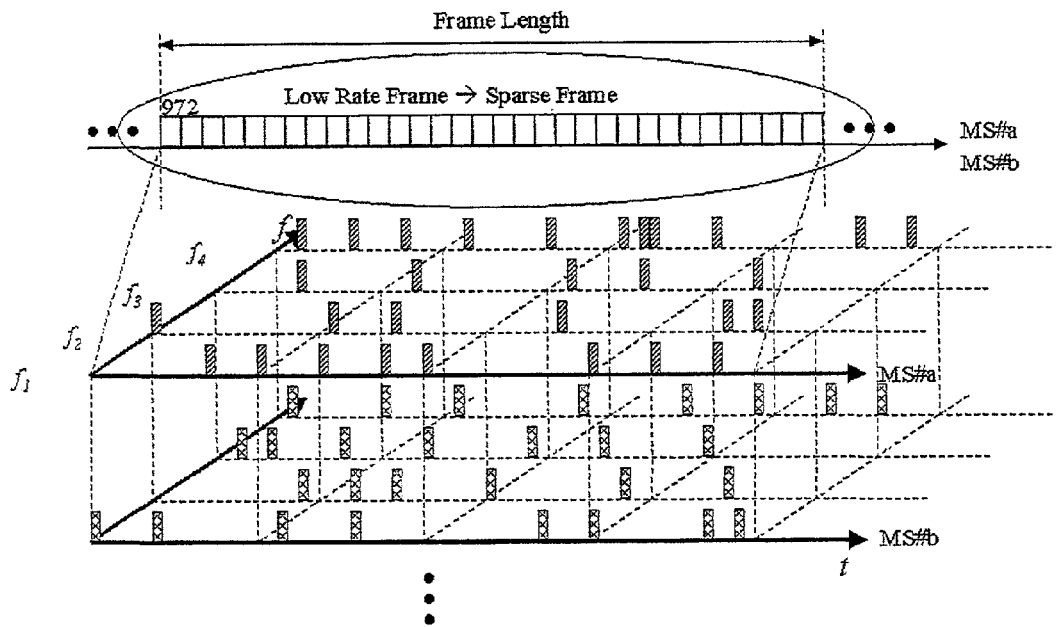
FIG. 14e illustrates a (irregularly time-hopped) transmission signal diagram from the primary communication station by a frequency hopping multiplexing (FHM) in a statistically coarse frame according to the embodiments of the present invention.

FIG. 14e shows a method which takes a Frequency Hopping Multiplexing Method (FHM) and a Time Hopping Multiplexing Method in parallel in a statistically coarse frame according to the embodiment of the present invention. The secondary communication station can be distinguished by the pattern in the square.

Figure 14F:
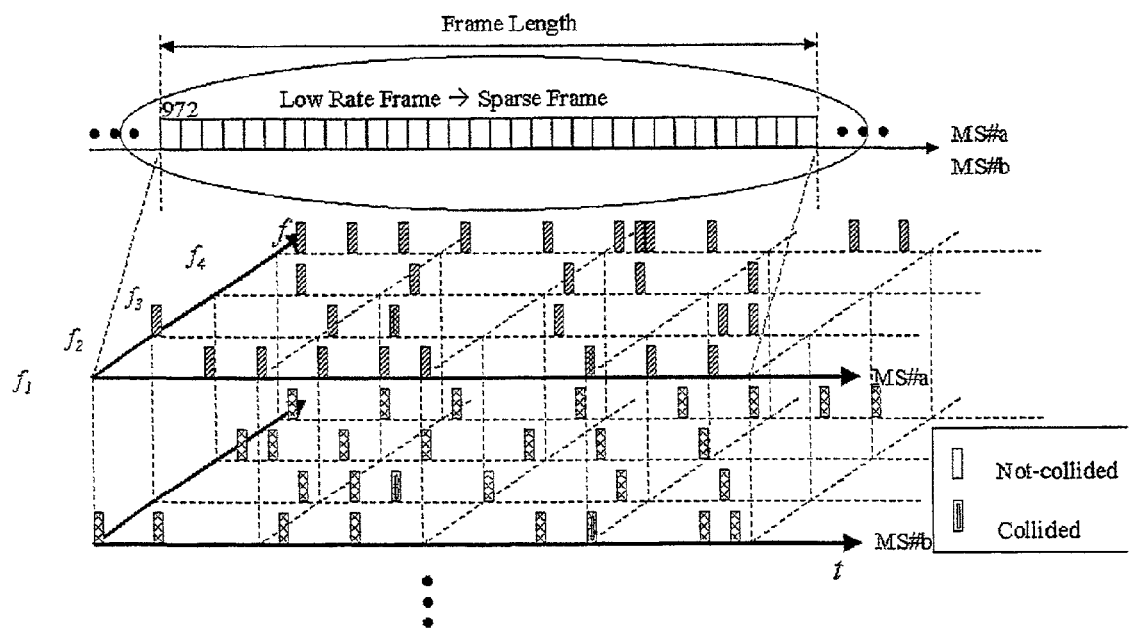
FIG. 14f shows illustrating a collision case (the square surrounded by double-line is a collided data symbol) which occurs due to a simultaneous selection of through multiple channels of the multi-dimensional hopping patterns that are represented in a two-dimensional coordinate in FIG. 14e (transmission time, sub-carrier).

FIG. 14f illustrates a collision case which occurs due to a simultaneous selection through multiple channels of the multi-dimensional hopping patterns that are represented in a two-dimensional coordinate in FIG. 14e (transmission time, sub-carrier). The squares whose boundary are represented by a paired dot line indicate the location of data symbols where multi-dimensional hopping patterns are collided and the squares whose boundary are represented by a single dot line indicate the location of data symbols where no collision occurs.

Figure 14G:
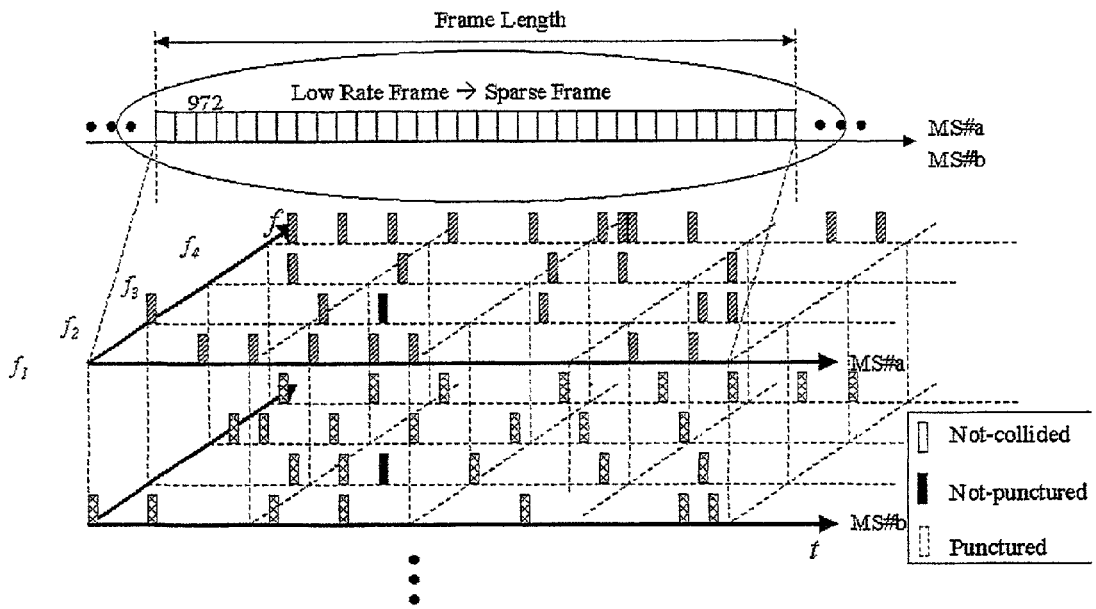
FIG. 14g illustrates illustrating the final process to determine whether to transmit or not by comparing the transmitting data symbols where collisions occurred in FIG. 14f.

FIG. 14g shows the final process to determine whether to transmit or not by comparing the transmitting data symbols where collisions occur in FIG. 14f. The squares filled with black color indicate transmission even though collisions occurred for multi-dimensional hopping patterns. All data symbols of the channels involved in the collisions are identical and the empty squares surrounded by dashed line indicate no transmission since all data symbols of the channels involved in the collisions are not identical.

Figure 4E:
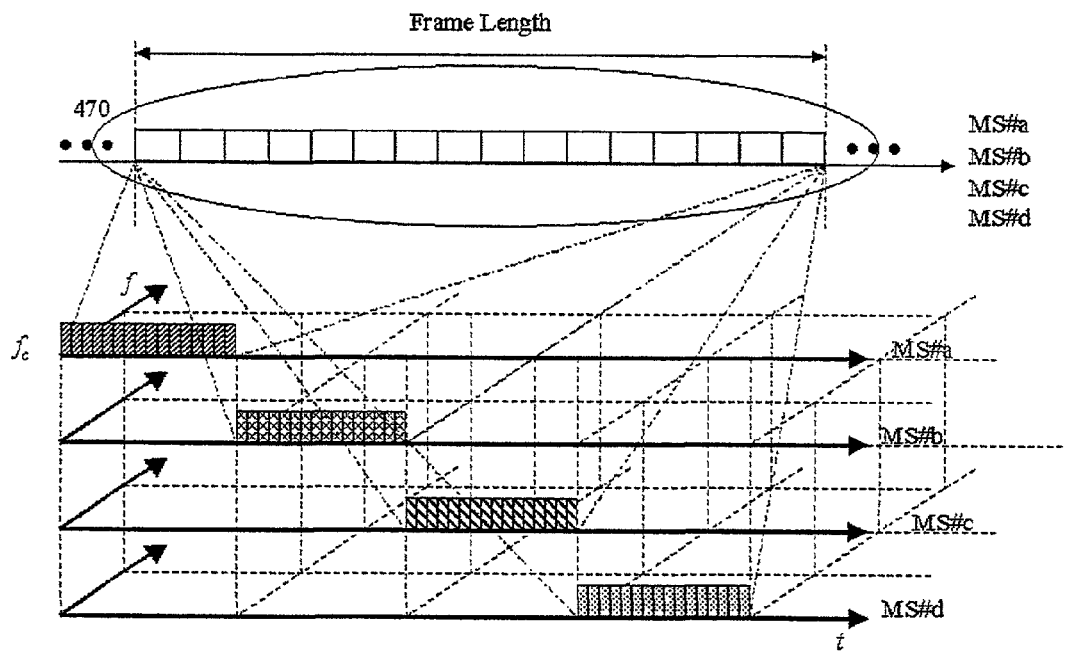
FIG. 4e illustrates a transmission signal diagram based on the time division multiplexing (TDM) according to the prior arts.
Figure 4F:
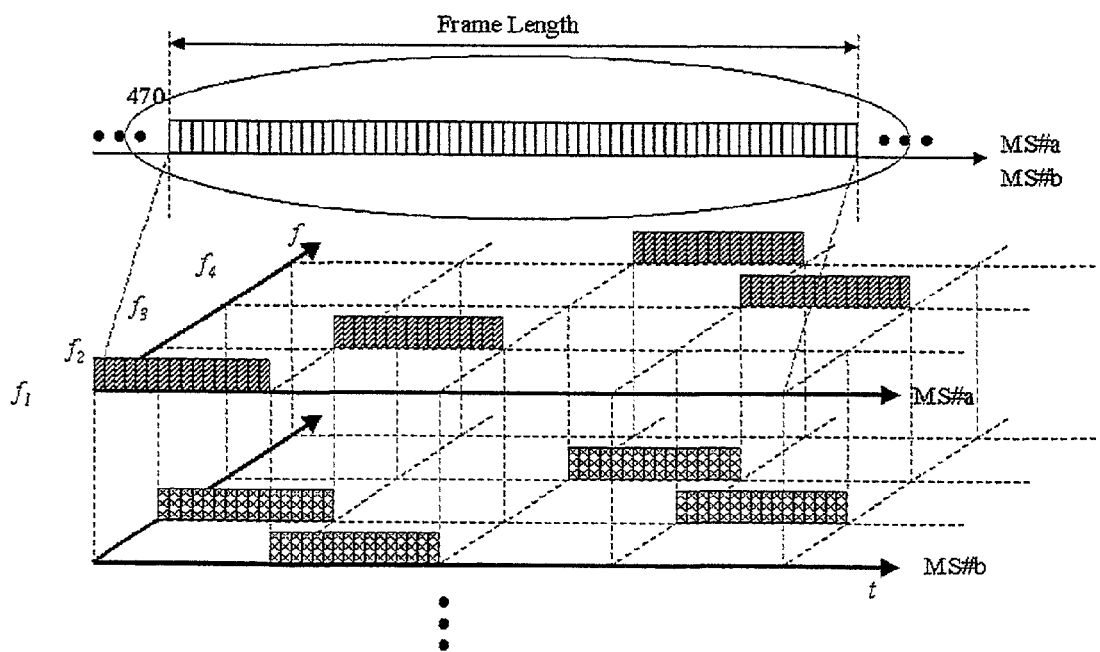
FIG. 4f shows a transmission signal diagram based on the time division multiplexing (TDM) according to the prior arts (implementing a frequency hopping based on slot unit).
Figure 4G:
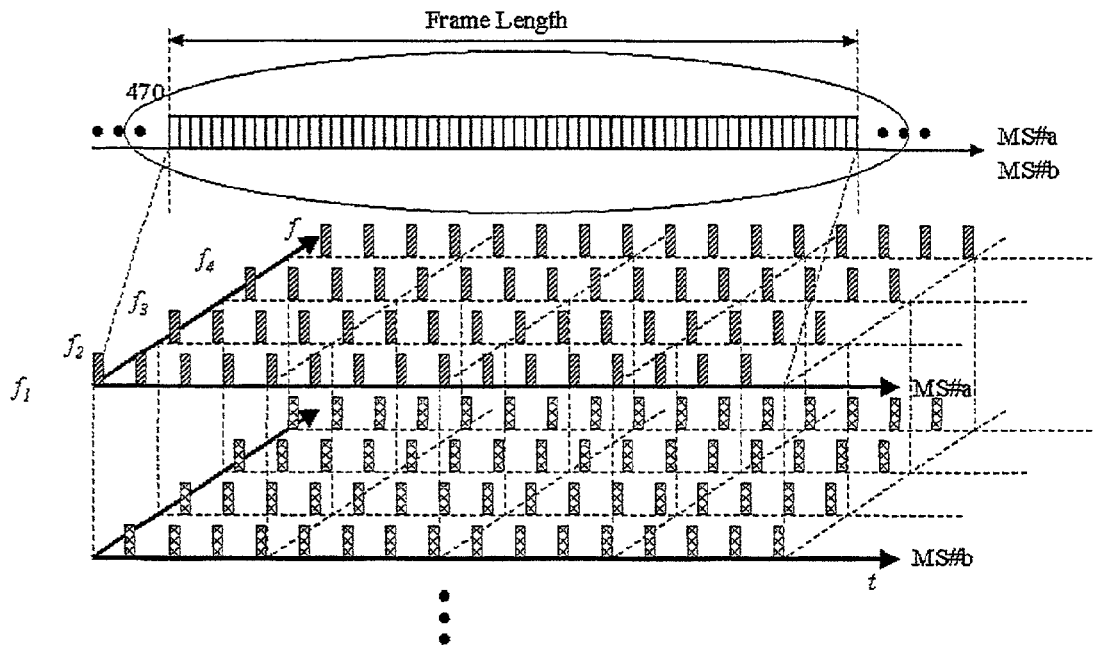
FIG. 4g illustrates a transmission signal diagram based on the frequency division multiplexing (FDM) for frequency diversity according to the prior arts (regular frequency hopping method based on data symbol unit).
Figure 4H:
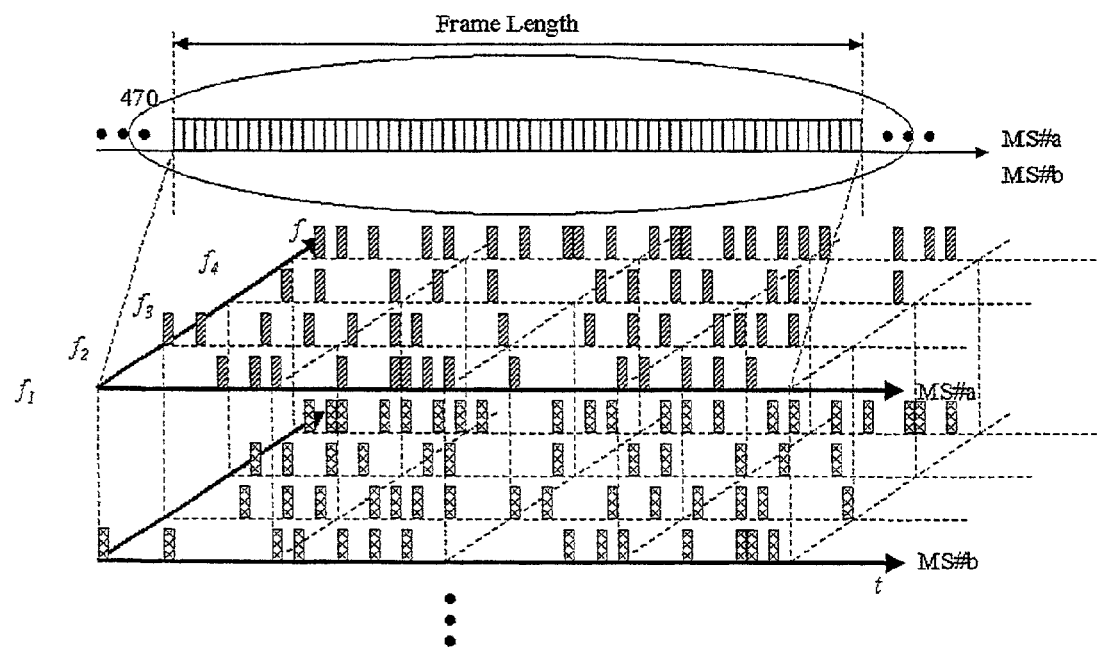
FIG. 4h shows a transmission signal diagram based on the frequency division multiplexing method (FDM) for frequency diversity and protection from eavesdropping according to the prior arts (irregular frequency hopping method based on data symbol unit).
Figure 4I:
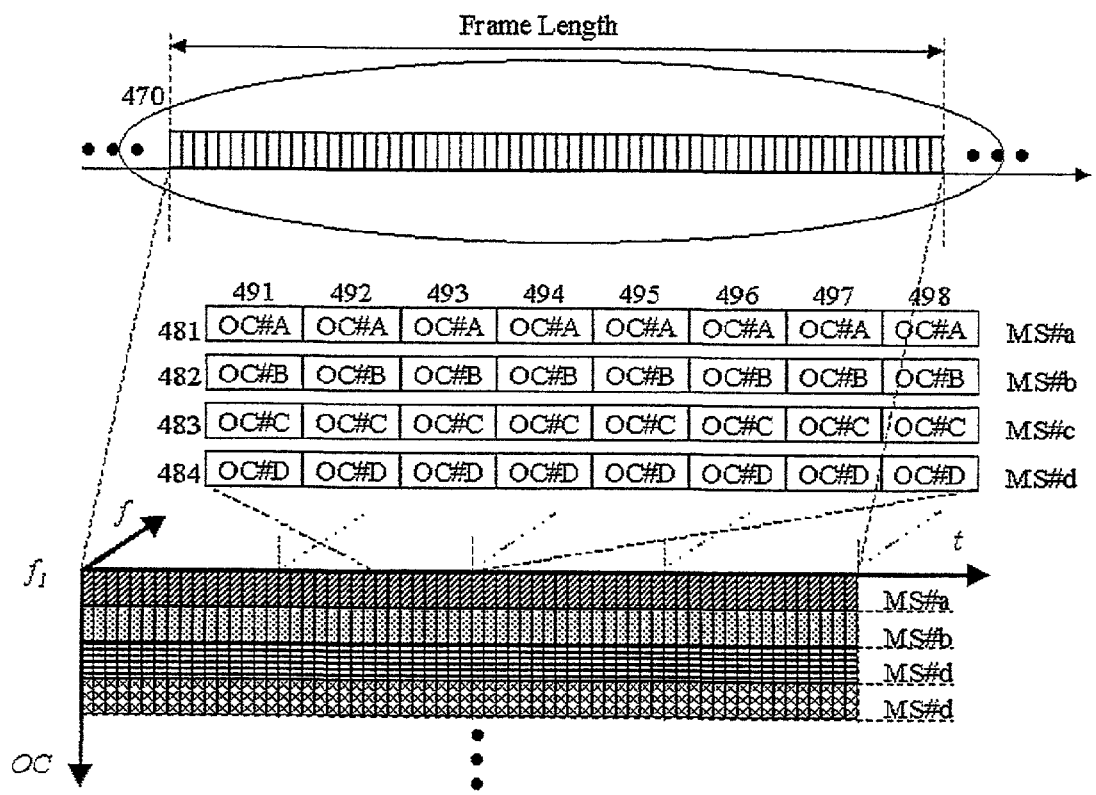
FIG. 4i illustrates a transmission signal diagram based on the orthogonal code division multiplexing (OCDM) method according to the prior arts (Fixed orthogonal code allocation for each channel).
Figure 5:
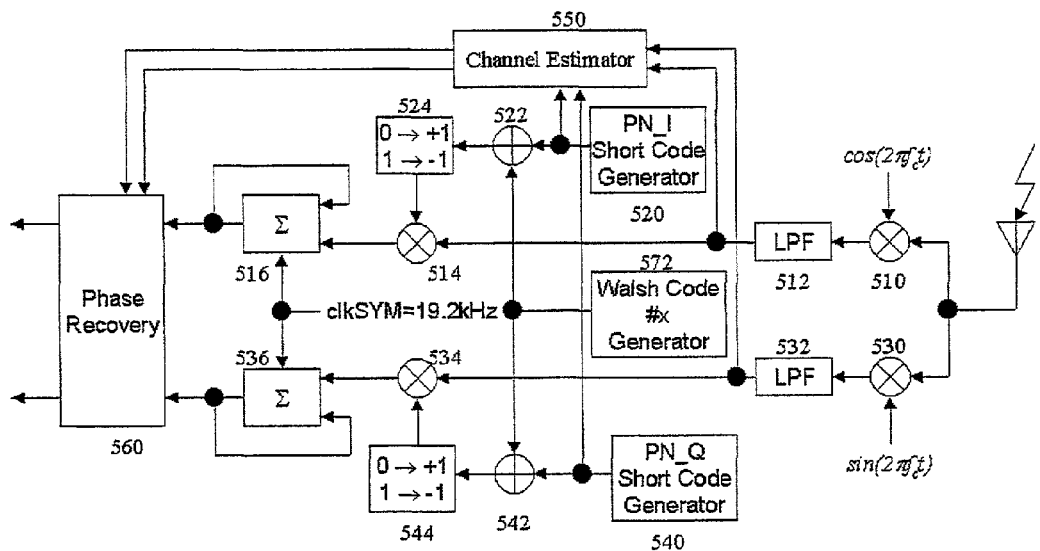
FIG. 5 shows a configuration of a receiver of the secondary communication station based on the orthogonal code division multiplexing corresponding to a configuration of the transmitter in FIG. 4i.
Figure 6:
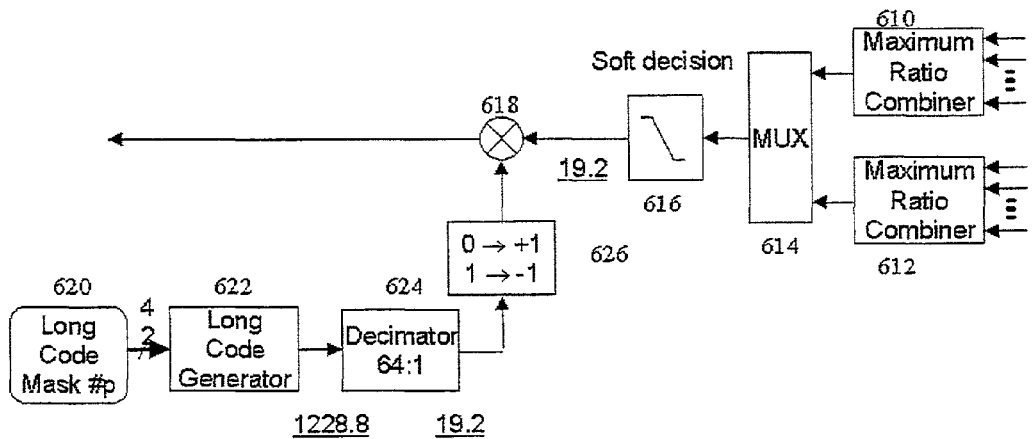
FIG. 6 illustrates a common configuration of a receiver of the secondary communication station according to the embodiments of the prior arts and present invention.
Figure 7:
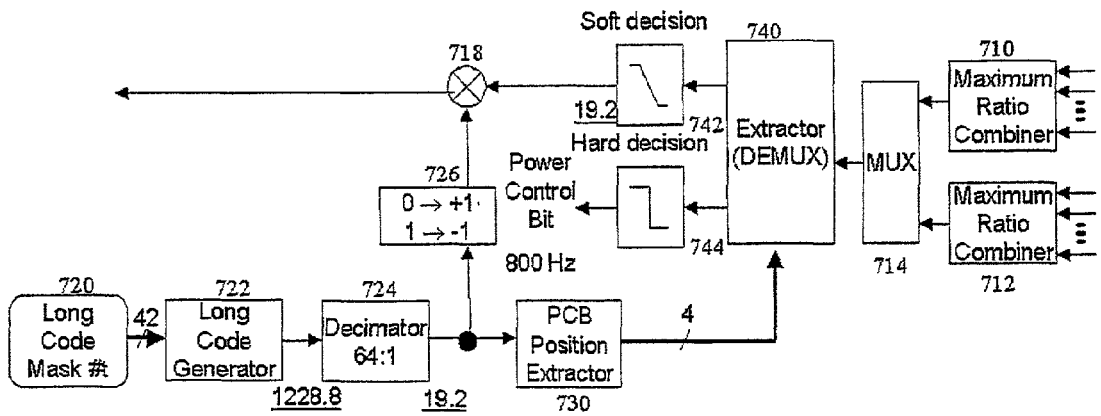
FIG. 7 shows a configuration of a receiver of the secondary communication station according to the embodiments of the prior arts.
Figure 8:
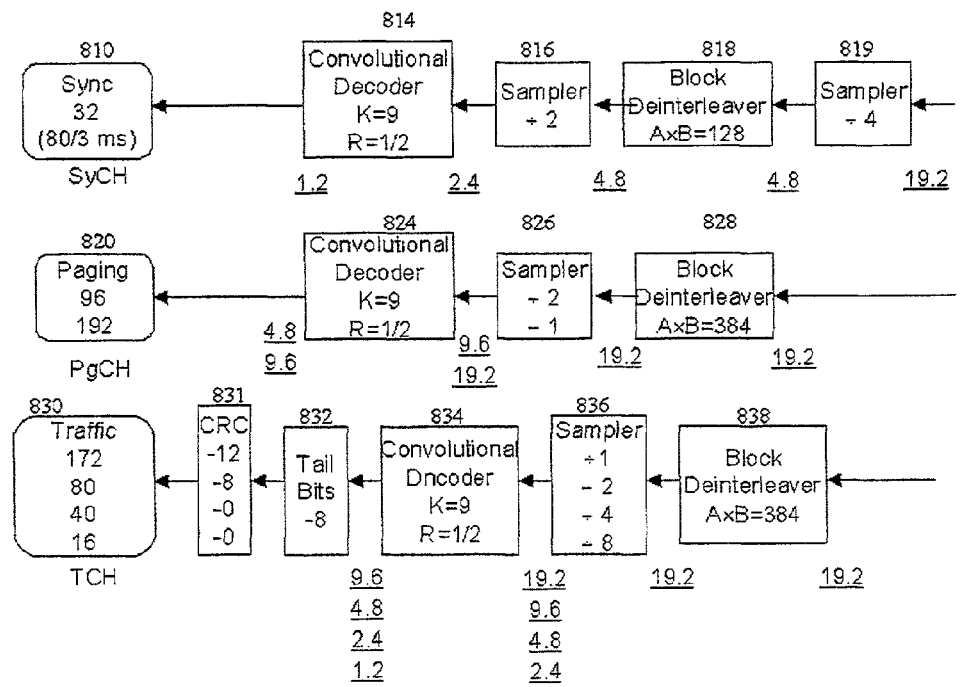
FIG. 8 illustrates a common configuration of a receiver of the secondary communication station according to the embodiments of the prior arts and present invention.
Figure 14H:
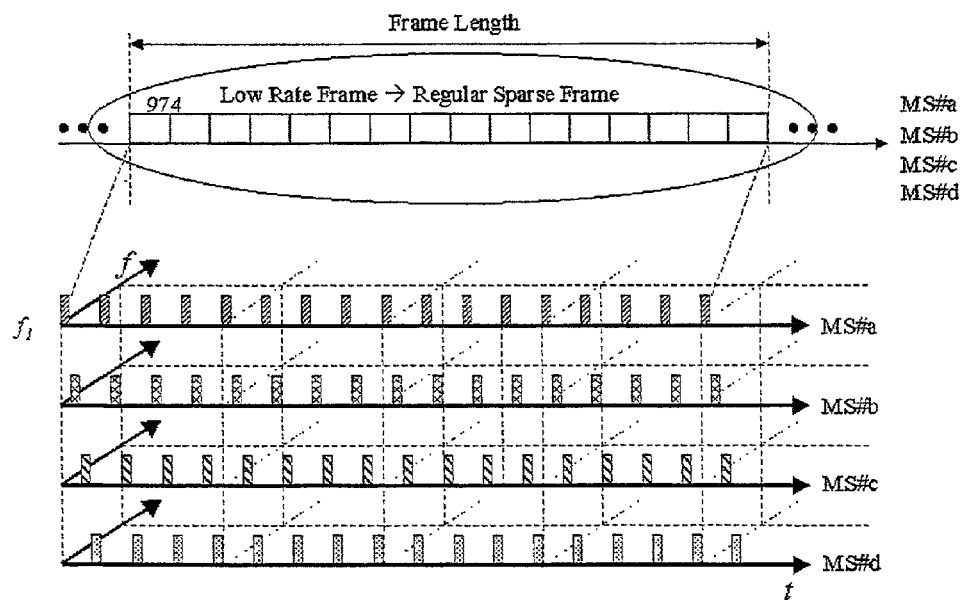
FIG. 14h shows a diagram of regularly time-hopped transmission signal from the primary communication station based on symbol units in a statistically coarse frame according to the embodiment of the present invention.

FIG. 14h shows a diagram of transmission signal from the primary communication station by the time division multiplexing method based on symbol units in a statistically coarse frame according to the embodiment of the present invention. It is a time division multiplexing based on symbol units that are evenly distributed in a frame unlike a time division multiplexing based on slot units that are concentrated between a specific interval, as shown in FIG. 4e. Therefore, time diversity can be attained. When the hopping patterns in an example embodiment of the present invention are periodic and used for diversity rather than statistical multiplexing, there exist no channel independence toward the secondary communication stations, and at the time of a call establishment the result of allocation from the primary communication station to the other secondary communication stations should be referenced. Hence, the time division multiplexing based on symbol units in FIG. 14h is advantageous when the instantaneous transmission rate is fixed.

Figure 14I:
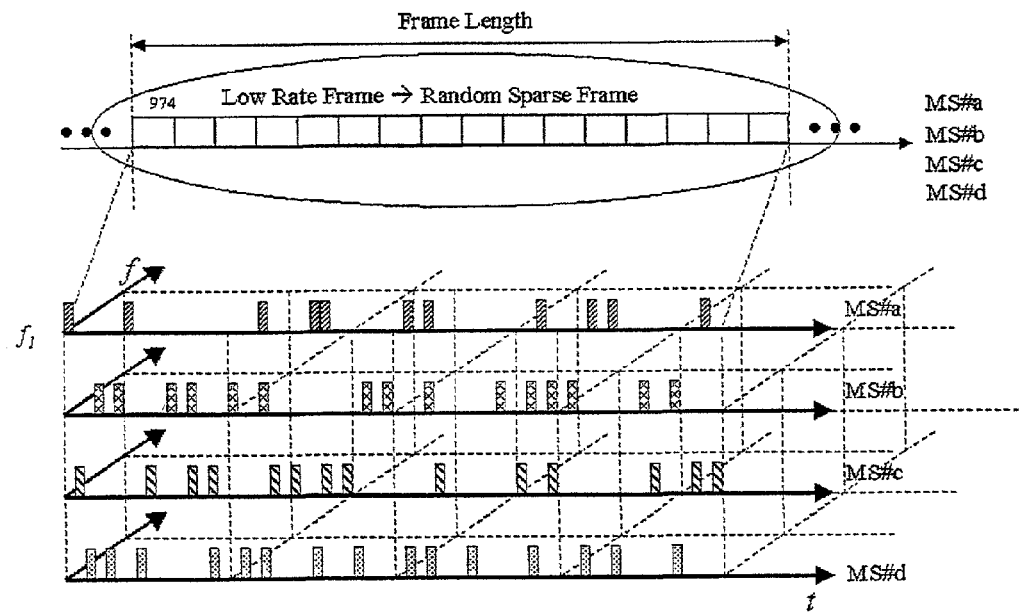
FIG. 14i illustrates a diagram of irregularly time-hopped transmission signal from the primary communication station based on symbol units in a statistically coarse frame according to the embodiment of the present invention.

FIG. 14i unlike FIG. 14h, illustrates a pseudo-random selection of a transmitting data symbol interval of the channel toward the secondary communication station in order to attain statistical multiplexing. The transmission time hopping patterns in the secondary communication station are independent.

Figure 14J:
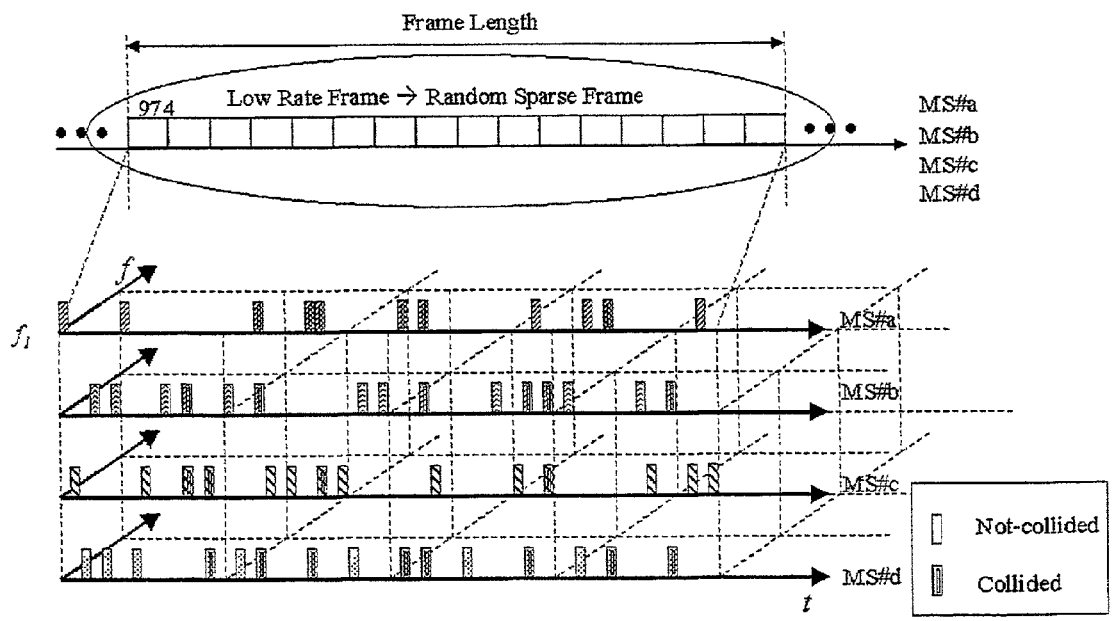
FIG. 14j illustrates a collision case (the square surrounded by double line is a collided data symbol) that occurs due to a simultaneous selection through multiple channels of the multi-dimensional hopping patterns that are represented in a one-dimensional coordinate in FIG. 14i (transmission time (or position of data symbol)).

FIG. 14j shows a collision case which occurs due to a simultaneous selection through multiple channels of the multi-dimensional hopping patterns that are represented in a one-dimensional coordinate in FIG. 14i (transmission time). The squares whose boundary are represented by a paired dot line indicate the location of data symbols where multi-dimensional hopping patterns collide and the squares whose boundary are represented by a single dot line indicate the location of data symbols where no collision occur.

Figure 14K:
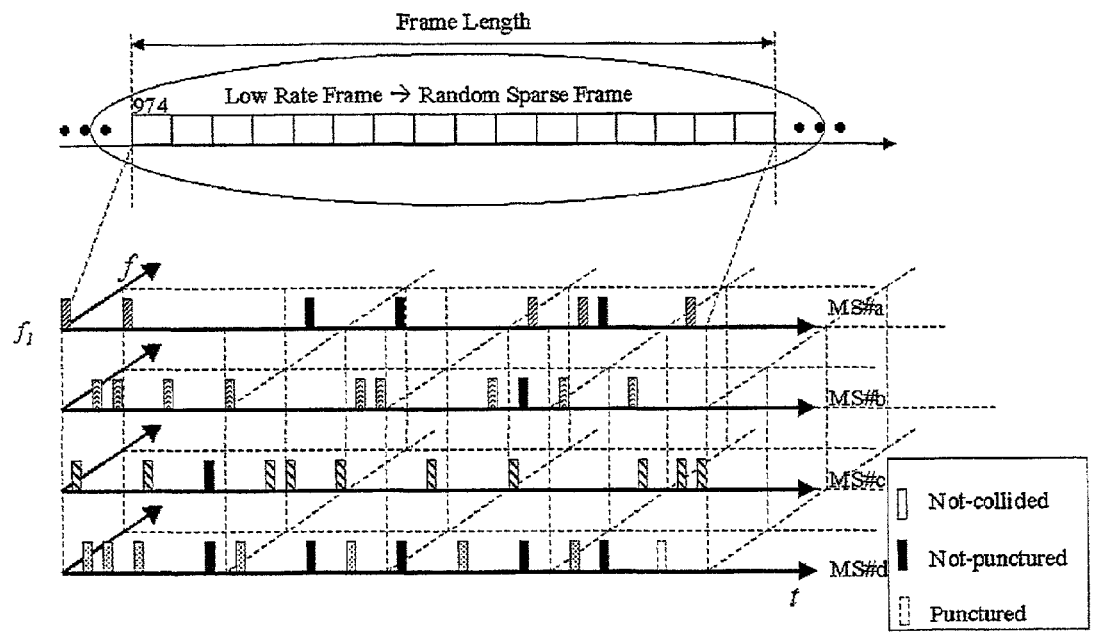
FIG. 14k shows the final process to determine whether to transmit or not (the squares filled with black color indicate a transmission and the empty squares surrounded by dashed line indicates no transmission) by comparing the transmitting data symbols where collisions occurred in FIG. 14j.

FIG. 14k illustrates the final process to determine whether to transmit or not by comparing the transmitting data symbols where collisions occur in FIG. 14j. The squares filled with black color indicate a transmission even though collisions occurred for multi-dimensional hopping patterns, all data symbols of the channels involved in the collisions are identical and the empty squares surrounded by dashed line indicate no transmission since all data symbols of the channels involved in the collisions are not identical.

Figure 14L:
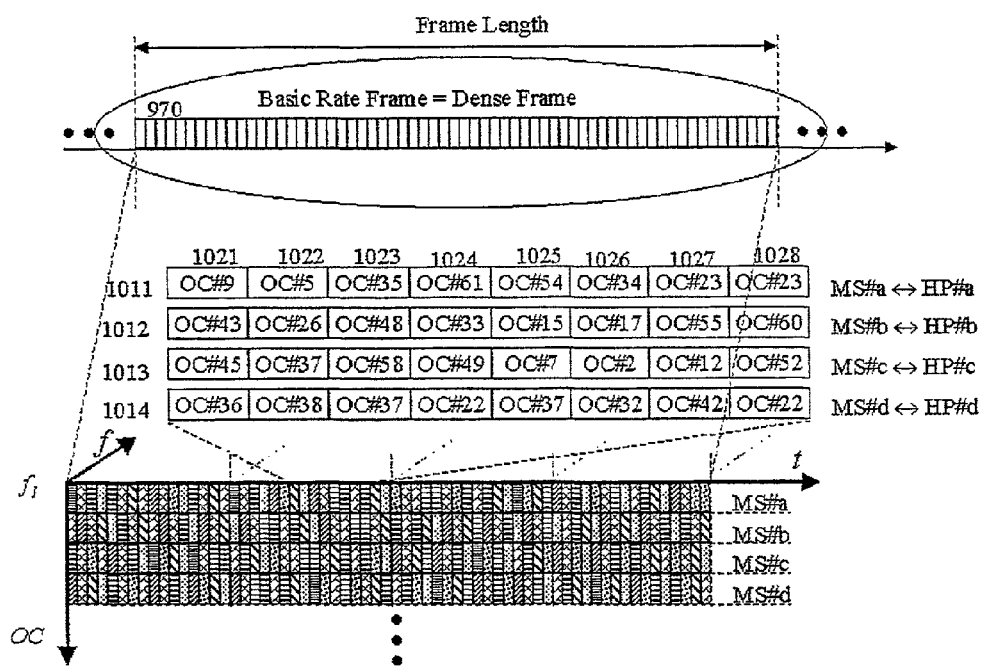
FIG. 14l illustrates a diagram of transmission signal from the primary communication station by the orthogonal code hopping multiplexing method in a basic transmission rate (R) frame (statistically dense frame) according to the embodiment of the present invention.

FIG. 14l illustrates a special case orthogonal code hopping multiplexing where an orthogonal code that spreads the transmitting data symbol band of the channel toward the secondary communication station is pseudo-randomly selected in order to attain statistical multiplexing. The orthogonal code hopping patterns toward the secondary communication station are independent. This method is explained in detail in the previous filed patent application on an orthogonal code hopping multiplexing method and apparatus (Korean patent of application number 10-1999-0032187) by the same inventor.

Figure 14M:
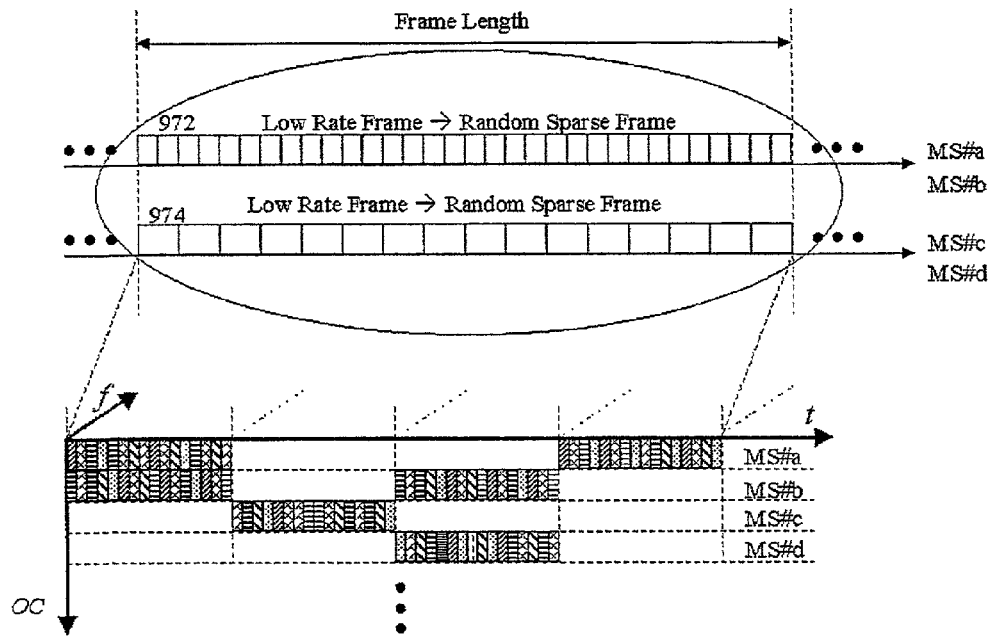
FIG. 14m shows a diagram of transmission signal from the primary communication station by the time division multiplexing based on slot units and orthogonal code hopping multiplexing in a statistically coarse frame according to the present invention.

FIG. 14m shows a diagram of transmission signal tc the secondary communication station where the time division multiplexing based on slot units according to the present invention and the orthogonal code hopping multiplexing coexist. In order to attain statistical multiplexing, the transmission time slots for the channel toward the secondary communication station and the orthogonal code symbols for spreading each transmitting data symbol are pseudo-randomly selected. The two-dimensional hopping patterns (transmission time, orthogonal code) are used for each secondary communication station.

Figure 14N:
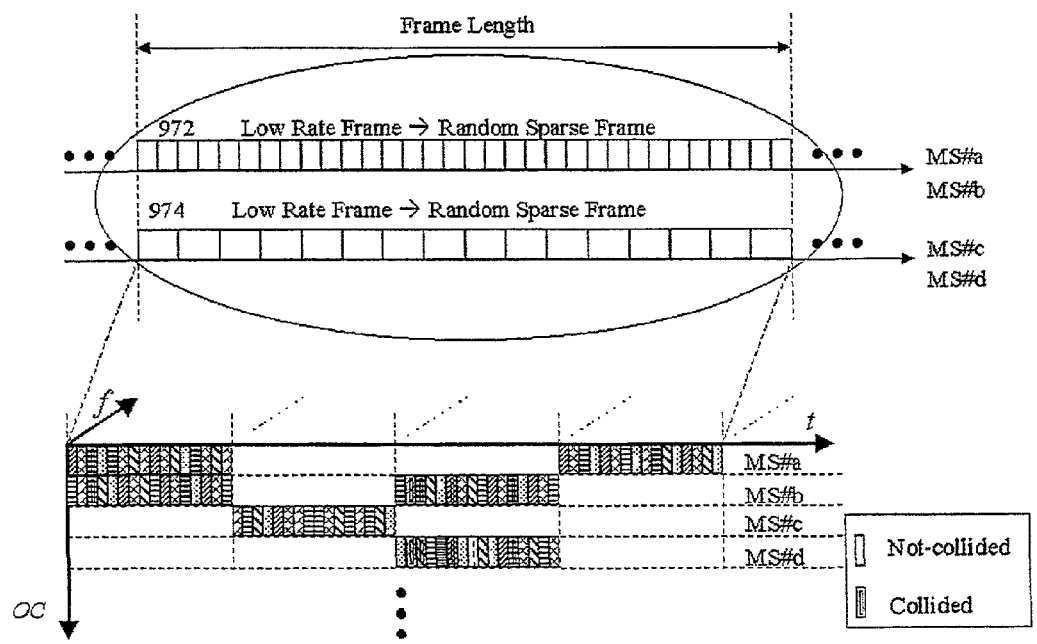
FIG. 14n illustrates illustrating a collision case (the square surrounded by double line is a collided data symbol) that occurs due to a simultaneous selection through multiple channels of the multi-dimensional hopping patterns that are represented in a one-dimensional coordinate in FIG. 14m (transmission time, orthogonal code).

FIG. 14n illustrates a collision case which occurs due to a simultaneous selection through multiple channels of the multi-dimensional hopping patterns that are represented in a one-dimensional coordinate in FIG. 14m (transmission time, orthogonal code). The squares whose boundary are represented by a paired dot line indicate the location of data symbols where multi-dimensional hopping patterns collide and the squares whose boundary are represented by a single dot line indicate the location of data symbols where no collision occurs.

Figure 14O:
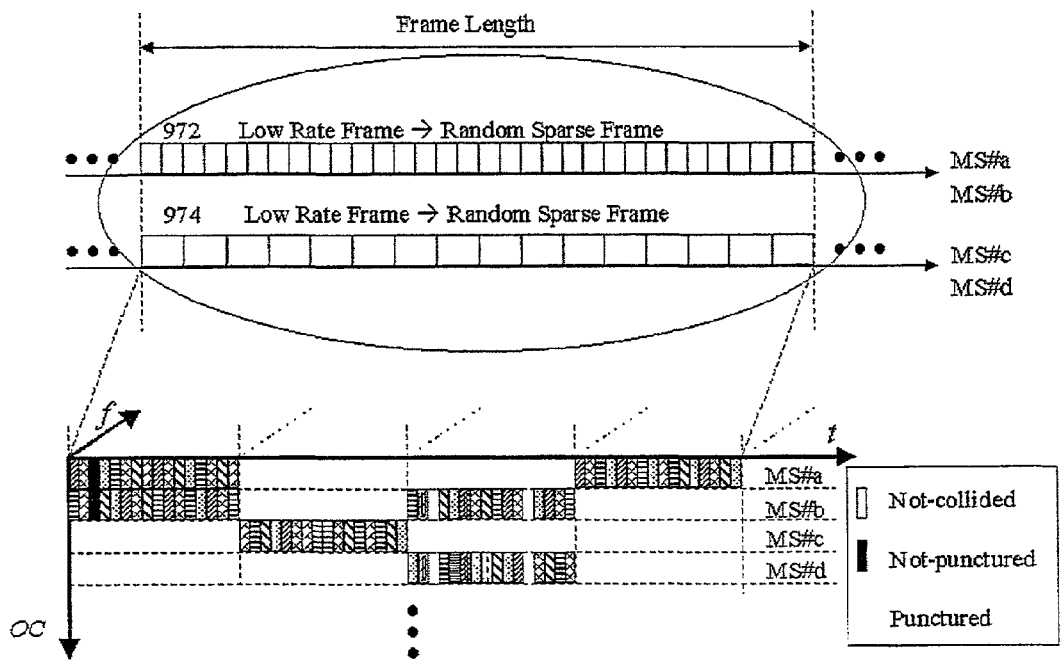
FIG. 14o shows the final process to determine whether to transmit or not by comparing the transmitting data symbols where collisions occurred in FIG. 14n (the squares filled with black color indicate transmission and the empty squares surrounded by dashed line indicate no transmission).

FIG. 14o shows the final process to determine whether to transmit or not by comparing the transmitting data symbols where collisions occur in FIG. 14n. The squares filled with black color indicate transmission even though collisions occur for multi-dimensional hopping patterns, all data symbols of the channels involved in the collisions are identical and the empty squares surrounded by dashed line indicate no transmission since all data symbols of the channels involved in the collisions are not identical.

Figure 14P:
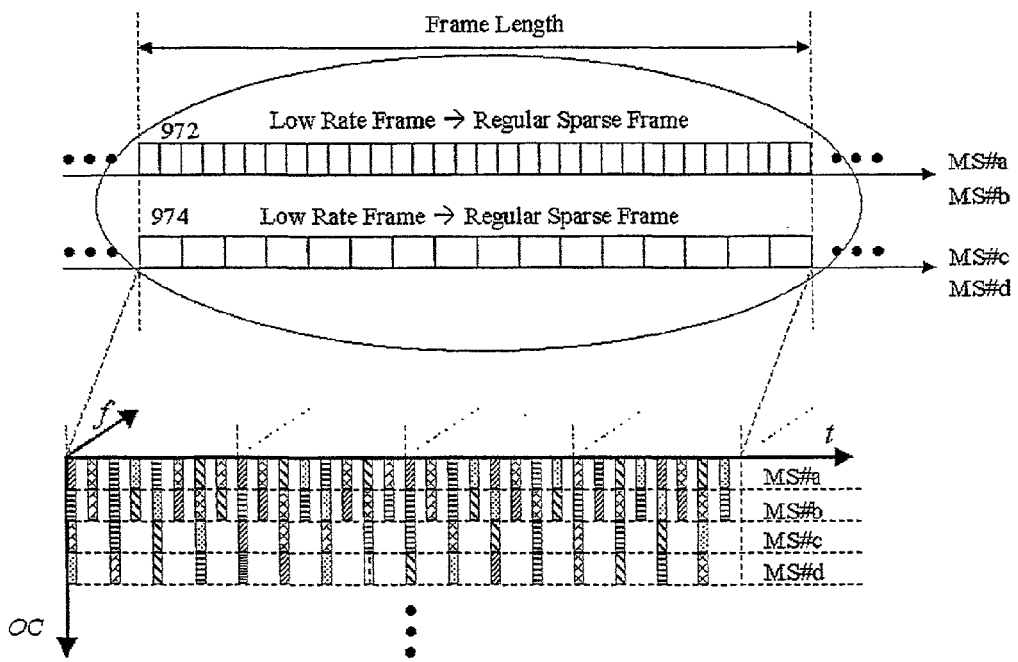
FIG. 14p illustrates a transmission signal diagram (the first data symbol of a frame is located at an identical position) from the primary communication station by a regular and periodic time division multiplexing based on a symbol unit and orthogonal code hopping multiplexing in a statistically coarse frame according to the present invention.

FIG. 14p illustrates a diagram of transmission signal from the primary communication station where the time division multiplexing in FIG. 14h and the orthogonal code hopping multiplexing in FIG. 14l coexist. As mentioned previously, even if FIG. 14h shows a configuration where no statistical multiplexing gain is attained, by implementing the orthogonal code hopping multiplexing method in FIG. 14l, a statistical multiplexing is attained. Irrespective of the transmission rate at each channel, the location of the first transmission symbols toward all secondary communication stations are identical. The orthogonal code symbols for band spreading of each transmitting data symbol toward the secondary communication station are pseudo-randomly selected. The first hopping patterns (orthogonal code) toward the secondary communication station are independent.

Figure 14Q:
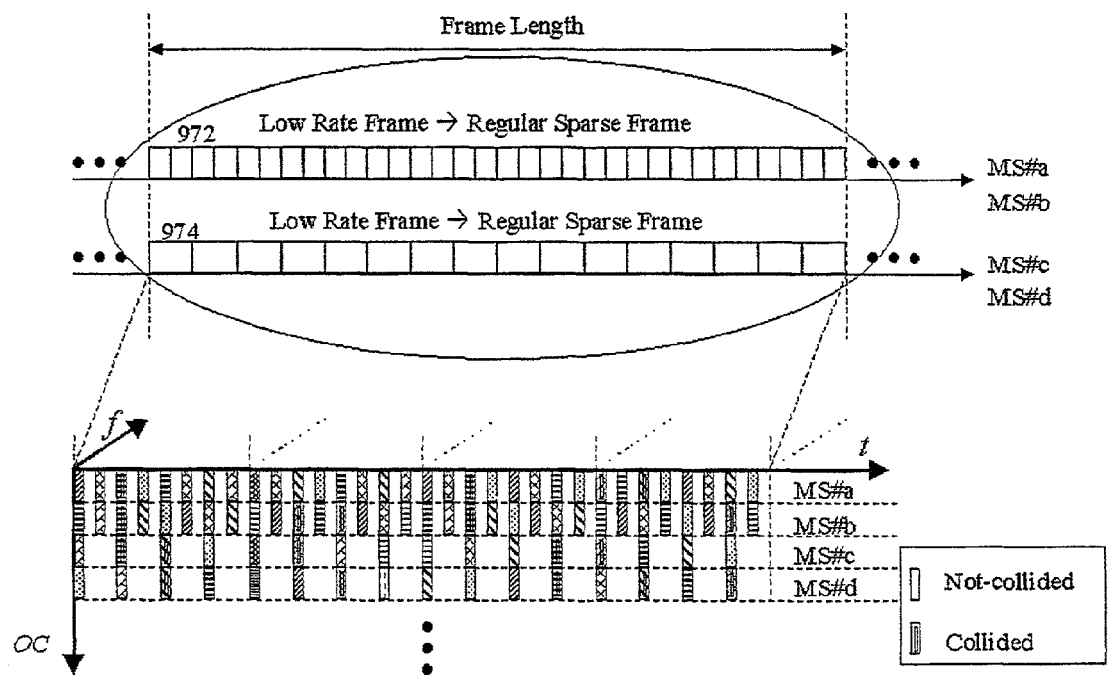
FIG. 14q shows a collision case (the square surrounded by double line is a collided data symbol) that occurs due to a simultaneous selection through multiple channels of the multi-dimensional hopping patterns that are represented in a two-dimensional coordinate in FIG. 14p (transmission time, orthogonal code symbol).

FIG. 14q shows a collision case that occurs due to a simultaneous selection through multiple channels of the multi-dimensional hopping patterns that are represented in a one-dimensional coordinate in FIG. 14p (orthogonal code). The squares whose boundary are represented by a paired dot line indicate the location of data symbols where multi-dimensional hopping patterns collide and the squares whose boundary are represented by a single dot line indicate the location of data symbols where no collision occur.

Figure 14R:
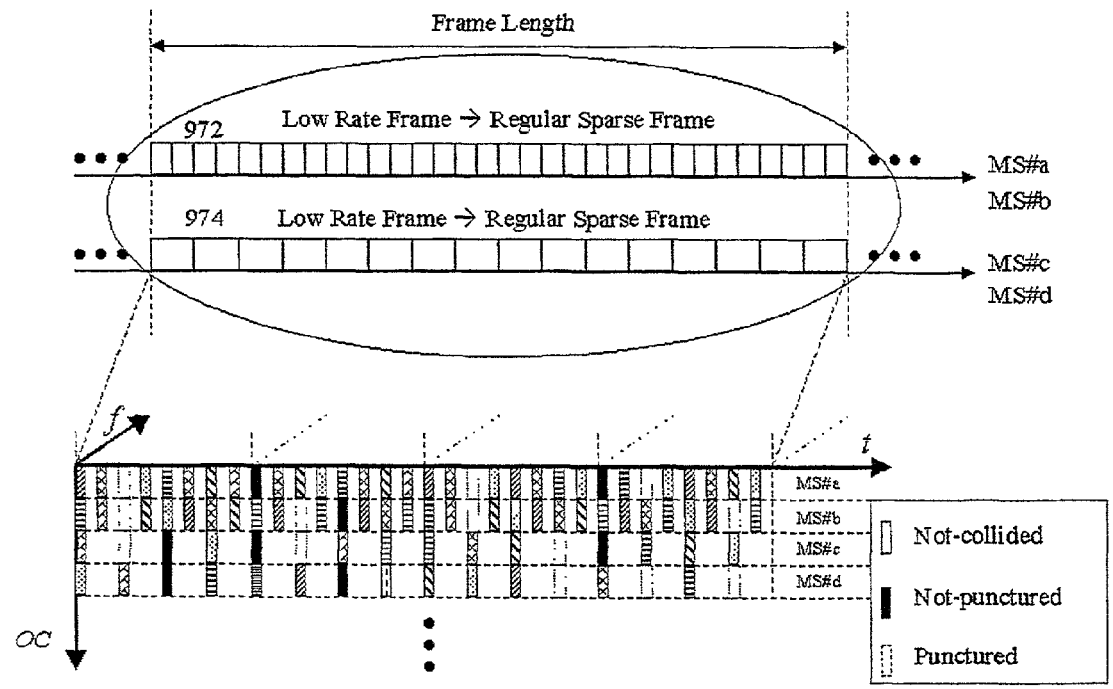
FIG. 14r shows the final process to determine whether to transmit or not (the squares filled with black color indicate a transmission and the empty squares surrounded by dashed line indicate no transmission) by comparing the transmitting data symbols where collisions occurred in FIG. 14q.

FIG. 14r illustrates the final process to determine whether to transmit or not by comparing the transmitting data symbols where collisions occur in FIG. 14q. The squares filled with black color indicate transmission even though collisions occur for multi-dimensional hopping patterns, all data symbols of the channels involved in the collisions are identical and the empty squares surrounded by dashed line indicate no transmission since all data symbols of the channels involved in the collisions are not identical.

Figure 14S:
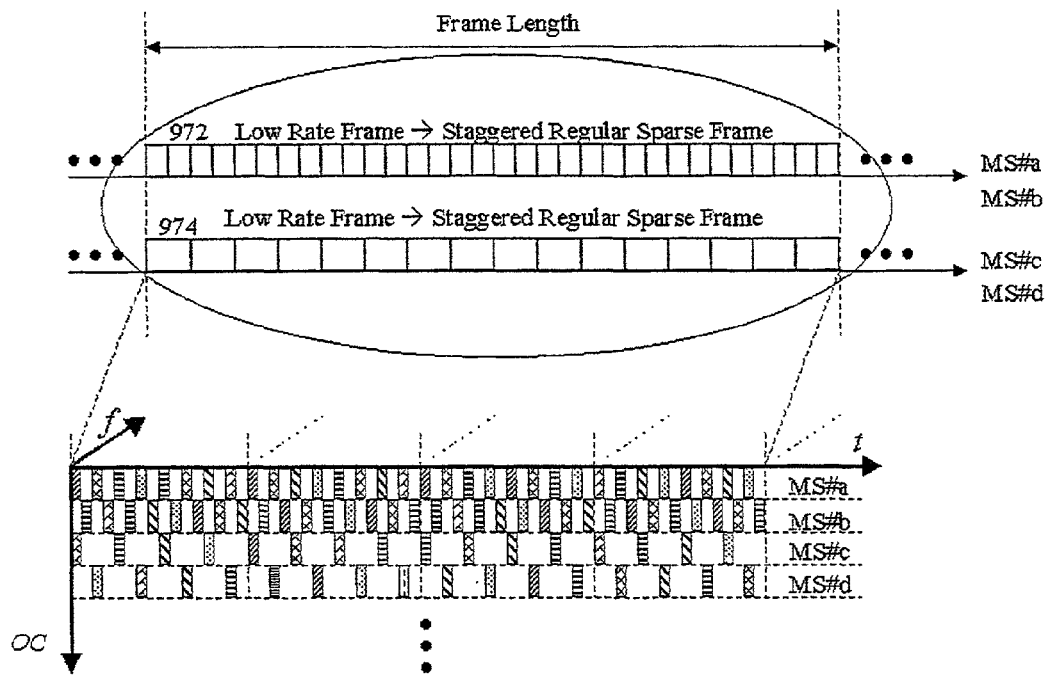
FIG. 14s shows a transmission signal diagram (the first data symbol of a frame is located at a skewed position) of the primary communication station by a regular and periodic time division multiplexing based on a symbol unit and orthogonal code hopping multiplexing in a statistically coarse frame according to the present invention.

FIG. 14s shows a variation on time division and orthogonal code hopping multiplexing in FIG. 14p. The primary communication station allocates the locations of the first data symbol to the secondary communication station skewed in order to maintain the balance of the transmission power. Like FIG. 14p, the orthogonal code symbols for spreading each transmitting data symbol for the channel toward the secondary communication station are pseudo-randomly selected. The one-dimensional hopping patterns for the second communication (orthogonal code) are independent.

Figure 14T:
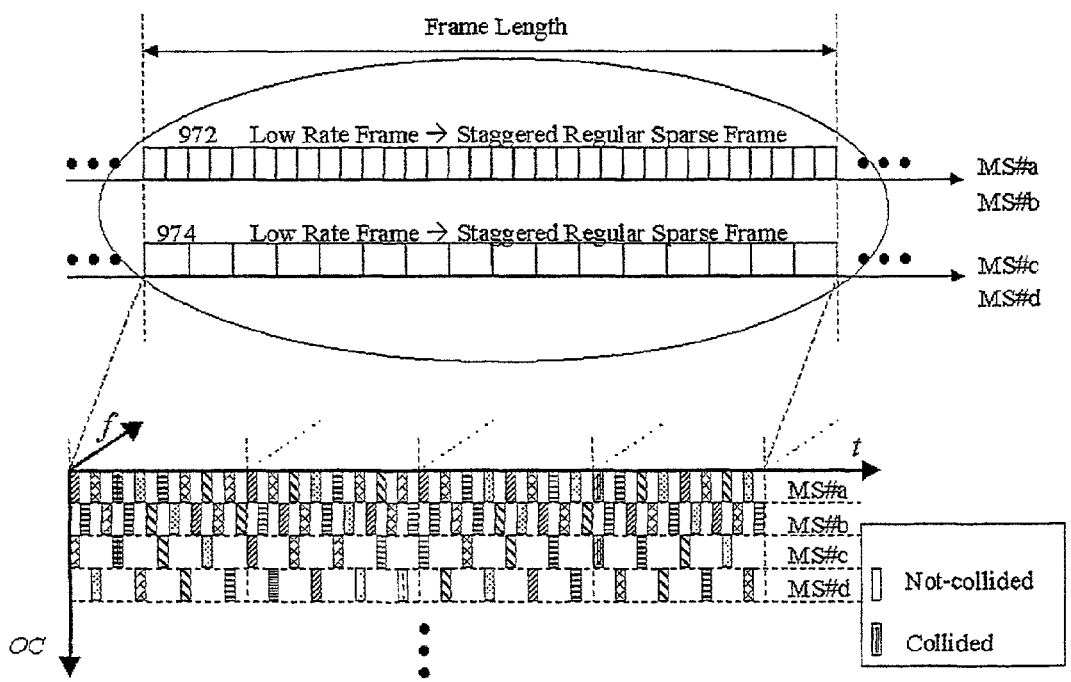
FIG. 14t illustrates a collision case (the square surrounded by double line is a collided data symbol) which occurs due to a simultaneous selection through multiple channels of the multi-dimensional hopping patterns that are represented in a two-dimensional coordinate in FIG. 14s (transmission time, orthogonal code).

FIG. 14t illustrates a collision case that occurs due to a simultaneous selection through multiple channels of the multi-dimensional hopping patterns that are represented in a one-dimensional coordinate in FIG. 14s (orthogonal code). The squares whose boundary are represented by a paired dot line indicate the location of data symbols where multi-dimensional hopping patterns collide and the squares whose boundary are represented by a single dot line indicate the location of data symbols where no collision occur.

Figure 14U:
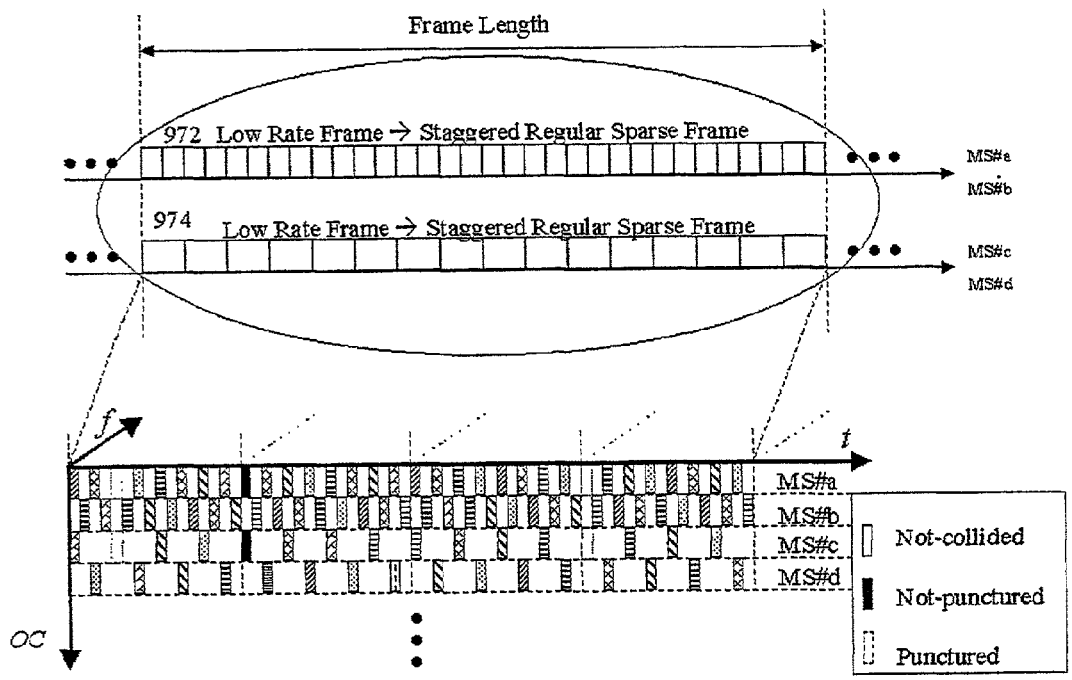
FIG. 14u shows the final process to determine whether to transmit or not (the squares filled with black color indicate a transmission and the empty squares surrounded by dashed line represent no transmission) by comparing the transmitting data symbols where collisions occurred in FIG. 14t.

FIG. 14u shows the final process to determine whether to transmit or not by comparing the transmitting data symbols where collisions occur in FIG. 14t. The squares filled with black color indicate transmission even though collisions occur for multi-dimensional hopping patterns, all data symbols of the channels involved in the collisions are identical and the empty squares surrounded by dashed line indicate no transmission since all data symbols of the channels involved in the collisions are not identical.

Figure 14V:
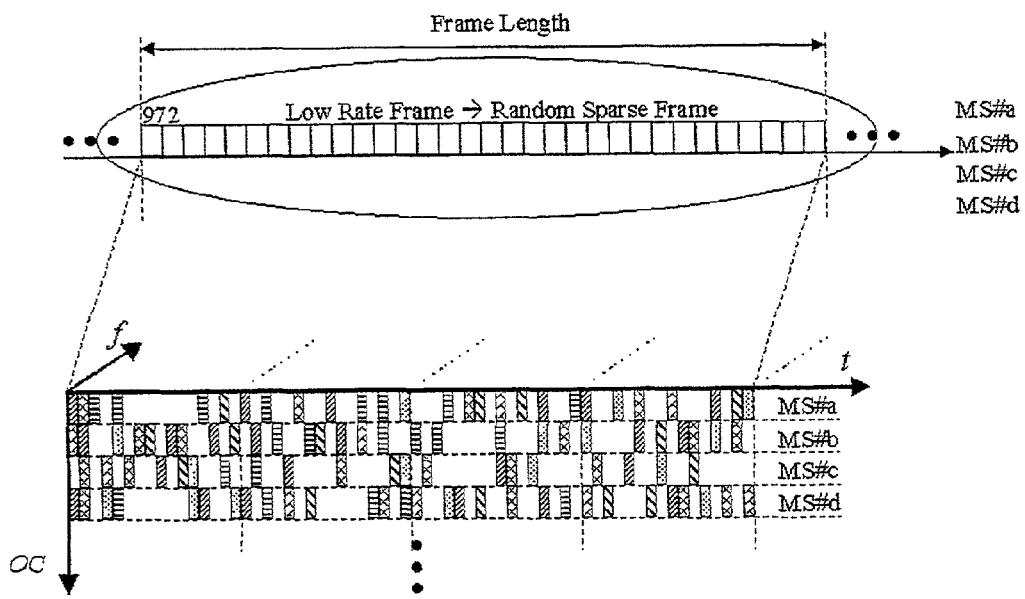
FIG. 14v illustrates a diagram of transmission signal from the primary communication station by a irregular and periodic time division multiplexing based on a symbol unit and orthogonal code hopping multiplexing in a statistically coarse frame according to the present invention.

FIG. 14v illustrates a diagram of transmission signal from the primary communication station where the time division multiplexing in FIG. 14i and the orthogonal code hopping multiplexing in FIG. 14l coexist. It is a composite statistical multiplexing method where it attains a statistical multiplexing gain through the time hopping multiplexing in FIG. 14i and at the same time, by implementing the orthogonal code hopping multiplexing method in FIG. 14l, statistical multiplexing is attained. The orthogonal code symbols for band spreading of each transmitting data symbol toward the secondary communication station are pseudo-randomly selected. The first hopping patterns (orthogonal code) toward the secondary communication station are independent. The transmission time within a frame and the orthogonal code symbols for a band-spreading of each transmitting data symbol for the channel toward the secondary communication station are pseudo-randomly selected. The two-dimensional hopping patterns for the second communication (orthogonal code, orthogonal code) are independent.

Figure 14W:
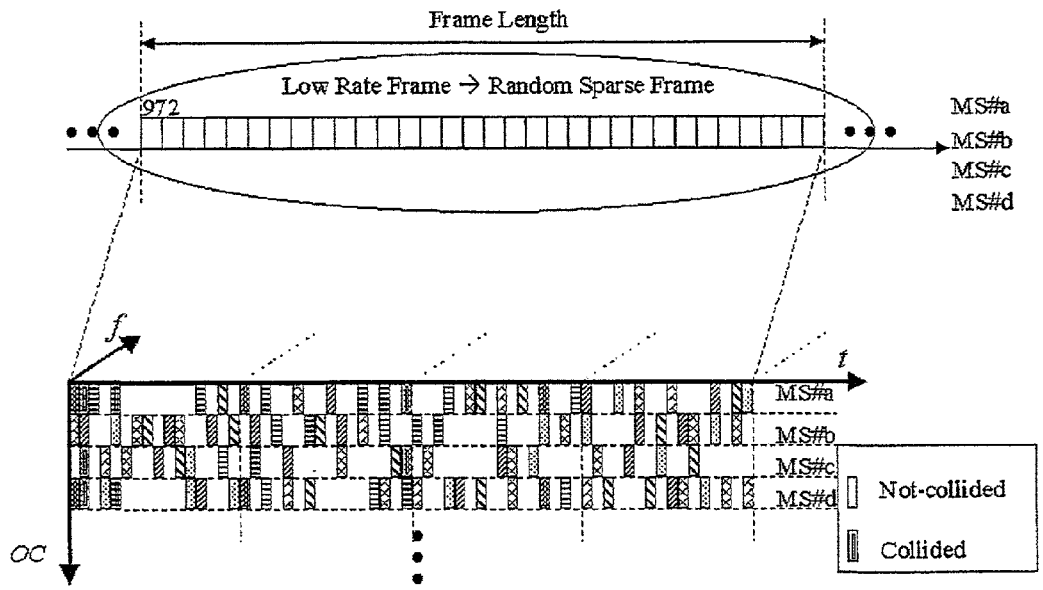
FIG. 14w illustrates a collision case (the square surrounded by double line is a collided data symbol) which occurs due to a simultaneous selection through multiple channels of the multi-dimensional hopping patterns that are represented in a two-dimensional coordinate in FIG. 14v (transmission time, orthogonal code).

FIG. 14w shows a collision case which occurs due to a simultaneous selection through multiple channels of the multi-dimensional hopping patterns that are represented in a one-dimensional coordinate in FIG. 14v (transmission time, orthogonal code). The squares whose boundary are represented by a paired dot line indicate the location of data symbols where multi-dimensional hopping patterns collide and the squares whose boundary are represented by a single dot line indicate the location of data symbols where no collision occur.

Figure 14X:
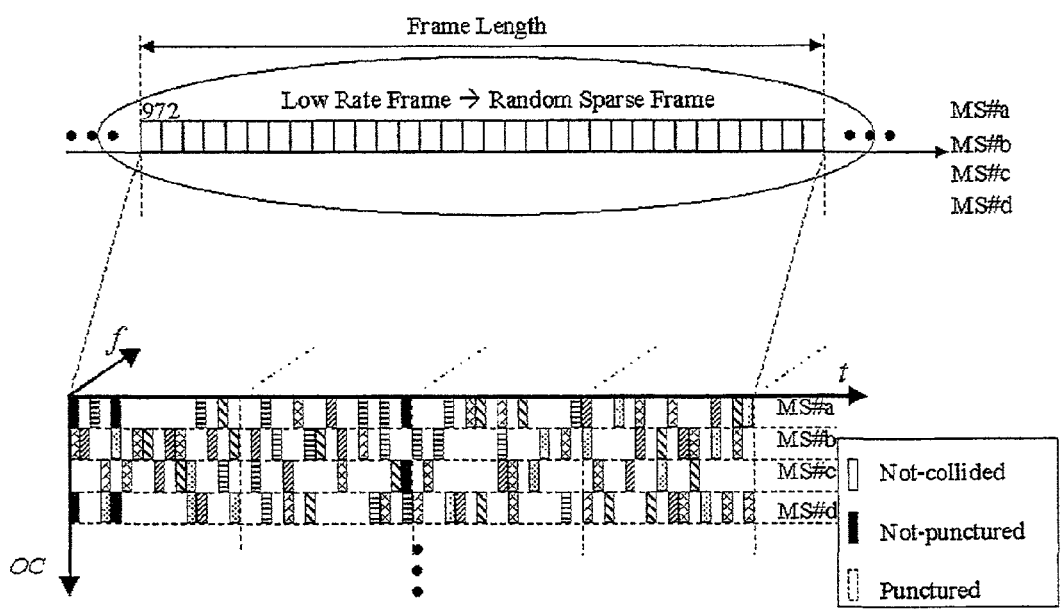
FIG. 14x shows the final process to determine whether to transmit or not (the squares filled with black color indicate a transmission and the empty squares surrounded by dashed line indicate no transmission) by comparing the transmitting data symbols where collisions occurred in FIG. 14w.

FIG. 14x illustrates the final process to determine whether to transmit or not by comparing the transmitting data symbols where collisions occur in FIG. 14w. The squares filled with black color indicate transmission even though collisions occur for multi-dimensional hopping patterns, all data symbols of the channels involved in the collisions are identical and the empty squares surrounded by dashed line indicate no transmission since all data symbols of the channels involved in the collisions are not identical.

Statistical multiplexing using three-dimensional hopping patterns (frequency, transmission time, orthogonal code) by extending the statistical multiplexing using two-dimensional hopping patterns (transmission time, orthogonal code) are shown in FIG. 14v. Statistical multiplexing using an N-dimensional orthogonal resource hopping multiplexing method of (first orthogonal resource, second orthogonal resource, . . . , N-th orthogonal resource) by extending the method proposed in the present invention is a step further. The gain from the statistical multiplexing using the multi-dimensional orthogonal resource hopping multiplexing can be inferred from the probability of a collision for the multi-dimensional hopping patterns and the probability of the corresponding transmitting data being not transmitted. Depending on what channel coding is used, the possibility of recovery of the data symbols that are not transmitted is different.

If the channels toward the secondary communication station that are the main concern of the present analysis contains no information, the analysis becomes meaningless. Hence, the analysis here only focuses on the channels which contain information.

Assumption: M=Total number of channels allocated by the primary communication station
α=Channel Activity (=average transmission rate per frame/basic transmission rate)
$\pi_i$=Probability of data symbol i to be transmitted where i ∈{0, 1, 2, . . . , s−1} and s=Number of data symbols

EXAMPLE

For 8PSK, s=8
For 16QAM, s=16
1) Frequency Hopping Multiplexing

Assumption: $c_1$=Total number of sub-carriers of frequency axis in multi-dimensional hopping patterns
(1) Collision Probability of Hopping Patterns $$\sum_{N=2}^{M}\left\{1-\left(1-\frac{1}{c_1}\right)^{N-1}\right\}\binom{M-1}{N-1}\alpha^{N-1}(1-\alpha)^{M-N} \quad [\text{Equation 1}]$$

(2) Symbol Puncturing Probability $$\sum_{N=2}^{M}\left[\sum_{i=0}^{s-1}\left\{1-\left(1-\frac{1-\pi_i}{c_1}\right)^{N-1}\right\}\cdot\pi_i\right] \quad [\text{Equation 2}]$$
$$\binom{M-1}{N-1}\alpha^{N-1}(1-\alpha)^{M-N}$$

(3) Symbol Puncturing Probability when all $\pi_i$'s are Identical.

$$\sum_{N=2}^{M}\left\{1-\left(1-\frac{1-\frac{1}{s}}{c_1}\right)^{N-1}\right\}\binom{M-1}{N-1}\alpha^{N-1}(1-\alpha)^{M-N} \quad [\text{Equation 3}]$$

(3) Transmission Time (or Symbol Position) Hopping Multiplexing
Assumption: $C_2$=Total number of available symbol positions in multi-dimensional hopping patterns
(1) Collision Probability of Hopping Patterns $$\sum_{N=2}^{M}\left\{1-\left(1-\frac{1}{c_2}\right)^{N-1}\right\}\binom{M-1}{N-1}\alpha^{N-1}(1-\alpha)^{M-N} \quad [\text{Equation 4}]$$

(2) Symbol Puncturing Probability $$\sum_{N=2}^{M}\left[\sum_{i=0}^{s-1}\left\{1-\left(1-\frac{1-\pi_i}{c_2}\right)^{N-1}\right\}\cdot\pi_i\right] \quad [\text{Equation 5}]$$
$$\binom{M-1}{N-1}\alpha^{N-1}(1-\alpha)^{M-N}$$

(3) Symbol Puncturing Probability when all $\pi_i$'s are Identical $$\sum_{N=2}^{M}\left\{1-\left(1-\frac{1-\frac{1}{s}}{c_2}\right)^{N-1}\right\}\binom{M-1}{N-1}\alpha^{N-1}(1-\alpha)^{M-N} \quad [\text{Equation 6}]$$

(4) Orthogonal Code Hopping Multiplexing
Assumption: $c_3$=Total number of orthogonal code symbols in multi-dimensional hopping patterns
(1) Collision Probability of Hopping Patterns $$\sum_{N=2}^{M}\left\{1-\left(1-\frac{1}{c_3}\right)^{N-1}\right\}\binom{M-1}{N-1}\alpha^{N-1}(1-\alpha)^{M-N} \quad [\text{Equation 7}]$$

(2) Symbol Puncturing Probability $$\sum_{N=2}^{M}\left[\sum_{i=0}^{s-1}\left\{1-\left(1-\frac{1-\pi_i}{c_3}\right)^{N-1}\right\}\cdot\pi_i\right] \quad [\text{Equation 8}]$$
$$\binom{M-1}{N-1}\alpha^{N-1}(1-\alpha)^{M-N}$$

(4) Symbol Puncturing Probability when all $\pi_i$'s are identical $$\sum_{N=2}^{M}\left\{1-\left(1-\frac{1-\frac{1}{s}}{c_3}\right)^{N-1}\right\}\binom{M-1}{N-1}\alpha^{N-1}(1-\alpha)^{M-N} \quad [\text{Equation 9}]$$

(5) Frequency, Transmission Time, Orthogonal Code Hopping Multiplexing
Assumption:
$c_1$=Total number of sub-carriers of frequency axis in multi-dimensional hopping patterns
$c_2$=Total number of symbol positions of time axis in multi-dimensional hopping patterns
$c_3$=Total number of orthogonal code symbols of orthogonal code axis in multi-dimensional hopping patterns
(1) Collision Probability of Hopping Patterns $$\sum_{N=2}^{M}\left\{1-\left(1-\frac{1}{c_1+c_2+c_3}\right)^{N-1}\right\}\binom{M-1}{N-1}\alpha^{N-1}(1-\alpha)^{M-N} \quad [\text{Equation 10}]$$

(1) Symbol Puncturing Probability $$\sum_{N=2}^{M}\left[\sum_{i=0}^{s-1}\left\{1-\left(1-\frac{1-\pi i}{c_1+c_2+c_3}\right)^{N-1}\right\}\cdot\pi_i\right] \quad [\text{Equation 11}]$$
$$\binom{M-1}{N-1}\alpha^{N-1}(1-\alpha)^{M-N}$$

(2) Symbol Puncturing Probability when all $\pi_i$'s are Identical $$\sum_{N=2}^{M}\left\{1-\left(1-\frac{1-\frac{1}{s}}{c_1+c_2+c_3}\right)^{N-1}\right\}\binom{M-1}{N-1}\alpha^{N-1}(1-\alpha)^{M-N} \quad \text{[Equation 12]}$$

Figure 15:
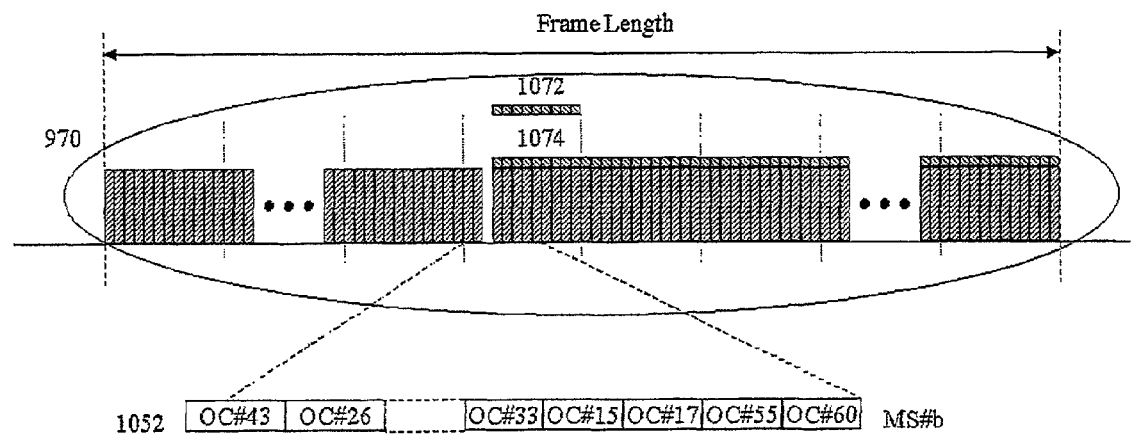
FIG. 15 in case of FIGS. 14g, 14o, 14r, 14u and 14x illustrates an increase in transmission power of the primary communication station for a specific interval after the data symbols which are not transmitted in order to satisfy the required quality and to compensate for the average received energy required by the channel decoder when the transmission is temporarily halted in a collision interval of multi-dimensional hopping patterns.

FIG. 15, like FIGS. 14g, 14o, 14r, 14u, and 14x illustrates an increase of transmission power of the primary communication station for a specific interval after the data symbols which are not transmitted in order to satisfy the required quality and to compensate for the average receiving energy required by the channel decoder when the transmission is halted in a collision interval of multi-dimensional hopping patterns.

Figure 16:
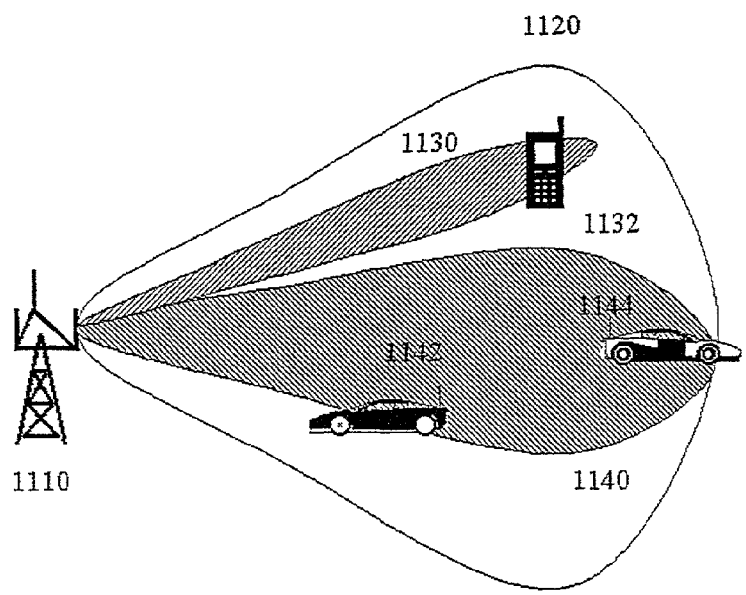
FIG. 16 shows that the puncturing of encoded data symbol due to a collision of multi-dimensional hopping patterns and an inconsistency of data symbols is operated independently for each transmission antenna beam from the primary communication station.

The transmission stoppage due to the collision of multi-dimensional hopping patterns and the inconsistency of transmission data symbols occurs in a channel group that exists in the same transmission antenna beam toward the primary communication station. Whan a smart antenna like in FIG. 16 whose transmission antenna beam 1120, 1130, 1140 toward the primary communication station exists in plurality, even though the hopping patterns collide, the transmission for the channels 1132, 1142, 1144 in the transmission antenna beam 1130, 1140 in a collision interval is not stopped.

As can be seen from the embodiment of the present invention, when the multi-dimensional orthogonal resource hopping multiplexing is carried out by pseudo-random hopping patterns, a channel coding scheme in the transmission side and a channel decoding scheme in the receiver's side are absolutely needed in order to recover the data that exist between a lost interval from the receiver's side because the transmission data can be punctured and not transmitted during the interval where the multi-dimensional hopping patterns collide.

The detailed explanation on the embodiments of the present invention has been focused on wireless mobile communication system. However, the statistical multiplexing proposed by the present invention can equally be implemented to wired communication systems.

As explained previously, the present invention, when the activity of synchronized channels that maintain orthogonalilty is low or the transmitting data rate for the channels varies below a basic transmission rate, can achieve statistical multiplexing gain on channels from the primary communication station to the secondary communication station, an increase in activity of the limited orthogonal resource, a decrease in signaling traffic due to unnecessary channel allocation and de-allocation (or release), a simple transmission scheduling, a decrease in buffer capacity required by the primary communication station, a decrease in transmission time delay, and a seamless handoff in adjacent cells by using a statistical multiplexing method known as multi-dimensional orthogonal resource multiplexing that takes frequency, time and orthogonal code as an orthogonal axis.

Further, the present invention can distinguish almost an infinite number of channels when multi-dimensional resource patterns are selected pseudo randomly in comparison to the method which allocates the orthogonal resources fixedly. Also, in case of a collision that occurs due to a pseudo random selection of the hopping patterns, there is no need to stop the transmission of the colliding data symbols for the secondary communication stations which exist in an area where the transmission antenna beam is not overlapped like a sectorization or smart antenna.

The data symbols that are not transmitted due to collision of the hopping patterns between the channels in an identical transmission antenna beam, can be recovered through a channel decoding process of the secondary communication station without separately notifying the secondary communication station.

Also, using the present invention statistical multiplexing can be realized for all the orthogonal resources that include frequency, time, orthogonal code and polarization by implementing the method in the present invention.

What is claimed is:

1. A apparatus for statistically multiplexing synchronous communication channels from a primary communication station to multiple secondary communication stations based on multi-dimensional orthogonal resource hopping multiplexing system that comprises:
   a multi-dimensional hopping pattern generator which is located in the transmitter of the primary communication station,
   a data symbol modulator that selects the corresponding orthogonal resource patterns in terms of the output from said multi-dimensional hopping pattern generator
   a controller that detects whether or not a collision occurs among the multi-dimensional hopping patterns, compares the consistency of the data symbols toward the secondary communication stations at the instant of said collision, and perforates the data symbols when the result of said comparison indicates that all the corresponding data symbols are not identical.

2. The apparatus for multi-dimensional orthogonal resource hopping multiplexing communication as claimed in claim 1,
   wherein said multi-dimensional orthogonal resource hopping multiplexing system includes;
   a transmission power controller that controls the transmission power of the remaining parts except the part where the multi-dimensional hopping patterns collide and the data symbols are perforated due to transmitting data symbol inconsistency, and compensates for the loss of the average energy received at said secondary communication stations due to the perforation.

3. The apparatus for multi-dimensional orthogonal resource hopping multiplexing communication as claimed in claim 1,
   wherein said channels are configured to be distinguishable through hopping multi-dimensional orthogonal resource coordinates for synchronous communication channels from said primary communication station to a plurality of secondary communication stations.

4. The apparatus for multi-dimensional orthogonal resource hopping multiplexing communication as claimed in claim 3,
   wherein said multi-dimensional orthogonal resource coordinates of dimension N can be represented as (orthogonal resource #1, orthogonal resource #2, orthogonal resource #N).

5. The apparatus for multi-dimensional orthogonal resource hopping multiplexing communication as claimed in claim 4,
   wherein said orthogonal resource #1 is frequency, the orthogonal resource #2 is transmission time or position of data symbol, and the orthogonal resource #3 is orthogonal code.

6. The apparatus for multi-dimensional orthogonal resource hopping multiplexing communication as claimed claim 1, wherein said multi-dimensional orthogonal resource hopping is statistical multiplexing using a one-dimensional orthogonal resource hopping multiplexing method in which only one coordinate of the orthogonal axes hops.

7. The apparatus for multi-dimensional orthogonal resource hopping multiplexing communication as claimed in claim 6,
wherein said one-dimensional orthogonal resource is frequency.

8. The apparatus for multi-dimensional orthogonal resource hopping multiplexing communication as claimed in claim 6,
wherein said one-dimensional orthogonal resource is transmission time or position of data symbol.

9. The apparatus for multi-dimensional orthogonal resource hopping multiplexing communication as claimed in claim 6,
wherein said one-dimensional orthogonal resource is orthogonal code.

10. The apparatus for multi-dimensional orthogonal resource hopping multiplexing communication as claimed in claim 1,
wherein said multi-dimensional orthogonal resource hopping is statistical multiplexing using a two-dimensional orthogonal resource hopping multiplexing method in which two coordinates of the orthogonal axes hops.

11. The apparatus for multi-dimensional orthogonal resource hopping multiplexing communication as claimed in claim 10,
wherein said two-dimensional orthogonal resource consists of (frequency, transmission time or position).

12. The apparatus for multi-dimensional orthogonal resource hopping multiplexing communication as claimed in claim 10,
wherein said two-dimensional orthogonal resource consists of (frequency, orthogonal code).

13. The apparatus for multi-dimensional orthogonal resource hopping multiplexing communication as claimed in claim 10,
wherein said two-dimensional orthogonal resource consists of (transmission time or position, orthogonal code).

14. The apparatus for multi-dimensional orthogonal resource hopping multiplexing communication as claimed in claim 1,
wherein said multi-dimensional orthogonal resource hopping is statistical multiplexing using a three-dimensional orthogonal resource hopping multiplexing method in which three coordinates of the orthogonal axes undergo hopping.

15. The apparatus for multi-dimensional orthogonal resource hopping multiplexing communication as claimed in claim 14,
wherein said three-dimensional orthogonal resource consists of (frequency, transmission time or position, orthogonal code).

16. The apparatus for multi-dimensional orthogonal resource hopping multiplexing communication as claimed in claim 1,
wherein said multi-dimensional orthogonal resource hopping of dimension N is statistical multiplexing using a multi-dimensional orthogonal resource hopping multiplexing method in which multi-dimensional )orthogonal resource #1, orthogonal resource #2 orthogonal resource #N) coordinates of the orthogonal axes undergoes hopping.

17. The apparatus for multi-dimensional orthogonal resource hopping multiplexing communication as claimed in claim 5,
wherein said orthogonal code is Hadamard Code.

18. The apparatus for multi-dimensional orthogonal resource hopping multiplexing communication as claimed in claim 5,
wherein said orthogonal code is Orthogonal Variable Spreading Factor Code.

19. The apparatus for multi-dimensional orthogonal resource hopping multiplexing communication as claimed in claim 5,
wherein said orthogonal code is orthogonal Gold Code.

20. The apparatus for multi-dimensional orthogonal resource hopping multiplexing communication as claimed in claim 1,
wherein said multi-dimensional orthogonal resource hopping patterns between the secondary communication stations, which are allocated by said primary communication station to said secondary communication stations at the beginning of a communication and are released at the end of the communication, are dependent.

21. The apparatus for multi-dimensional orthogonal resource hopping multiplexing communication as claimed in claim 1, wherein said multi-dimensional orthogonal resource hopping patterns is allocated to each secondary communication station uniquely and therefore, become independent between the secondary communication stations.

22. The apparatus for multi-dimensional orthogonal resource hopping multiplexing communication as claimed in claim 1,
wherein said multi-dimensional orthogonal resource hopping multiplexing is carried out for statistically sparse or bursty channels in order to attain statistical multiplexing gain.

23. The apparatus for multi-dimensional orthogonal resource hopping multiplexing communication as claimed in claim 22,
wherein said bursty channels are communication channels toward the secondary communication stations whose transmission rate varies below the allocated basic transmission rate at the time of a call establishment.

24. The apparatus for multi-dimensional orthogonal resource hopping multiplexing communication as claimed in claim 1,
wherein the physical channel control command toward a secondary communication station is transmitted by using a separate physical channel.

25. The apparatus for multi-dimensional orthogonal resource hopping multiplexing communication as claimed in claim 24, wherein said physical channel includes the transmission power control command for the secondary communication station.

26. The apparatus for multi-dimensional orthogonal resource hopping multiplexing communication as claimed in claim 24, wherein said physical channel includes the transmission rate of the primary communication station.

27. The apparatus for multi-dimensional orthogonal resource hopping multiplexing communication as claimed in claim 24, wherein said physical channel contains the physical channel control command for the secondary communication station after time division multiplexed.

28. The apparatus for multi-dimensional orthogonal resource hopping multiplexing communication as claimed in claim 27, wherein said physical channel does not collide with other orthogonal transmission channels from the primary communication station.

29. The apparatus for multi-dimensional orthogonal resource hopping multiplexing communication as claimed in claim 28, wherein multi-dimensional hopping patterns which do not collide, are used in order not to collide said physical channel with other orthogonal transmission channels from the primary communication station.

30. The apparatus for multi-dimensional orthogonal resource hopping multiplexing communication as claimed in claim 28, wherein fixed orthogonal resource allocation like the conventional orthogonal resource division multiplexing method is included so that said physical channel does not collide with other orthogonal transmission channels from the primary communication station.

31. The apparatus for multi-dimensional orthogonal resource hopping multiplexing communication as claimed in claim 1,
wherein said multi-dimensional orthogonal resource hopping patterns for a statistical multiplexing are pseudo-randomly generated.

32. The apparatus for multi-dimensional orthogonal resource hopping multiplexing communication as claimed in claim 31, wherein said pseudo-randomly generated multi-dimensional orthogonal resource hopping patterns are generated by Pseudo Noise (PN) sequence generators.

33. The apparatus for multi-dimensional orthogonal resource hopping multiplexing communication as claimed in claim 31, wherein a plurality of said multi-dimensional orthogonal resource hopping patterns for statistical multiplexing can be allocated to one of the secondary communication stations according to the transmission data rate of the primary communication station.

34. The apparatus for multi-dimensional orthogonal resource hopping multiplexing communication as claimed in claim 33, wherein a plurality of hopping patterns toward one of the secondary communication stations undergo dependent hopping in a communication by said multi-dimensional orthogonal resource hopping patterns in order to avoid collisions.

35. The apparatus for multi-dimensional orthogonal resource hopping multiplexing communication as claimed in claim 33, wherein said communication by said multi-dimensional orthogonal resource hopping patterns allows collisions by undergoing independent hopping.

36. The apparatus for multi-dimensional orthogonal resource hopping multiplexing communication as claimed in claim 1,
wherein said communication by said multi-dimensional orthogonal resource hopping patterns periodically repeat on the basis of a frame unit.

37. The apparatus for multi-dimensional orthogonal resource hopping multiplexing communication as claimed in claim 36, wherein said frame is an independent data unit based on the channel coding.

38. The apparatus for multi-dimensional orthogonal resource hopping multiplexing communication as claimed in claim 1,
wherein said data symbols are transmitted at the time of collision of said multi-dimensional orthogonal resource hopping patterns shows that all the transmitting data symbols of corresponding channels are identical.

39. The apparatus for multi-dimensional orthogonal resource hopping multiplexing communication as claimed in claim 38 wherein the transmission power is increased for the transmitting data symbols after the transmitting data symbols are not transmitted because the transmitting data symbols are not identical at the time of a collision of said multi-dimensional orthogonal resource hopping patterns.

40. The apparatus for multi-dimensional orthogonal resource hopping multiplexing communication as claimed in claim 39, wherein said transmission power increase is allowed in such an amount and at an interval given by the system parameters.

41. The apparatus for multi-dimensional orthogonal resource hopping multiplexing communication as claimed in claim 40, wherein said two system parameters depend on the location of the data symbols which are not transmitted.

42. The apparatus for multi-dimensional orthogonal resource hopping multiplexing communication as claimed in claim 41, wherein said two system parameter values are equal to or greater than zero.

43. The apparatus for multi-dimensional orthogonal resource hopping multiplexing communication as claimed in claim 1,
wherein said hopping pattern collision processing method is only carried out when a serious error occurs during a channel decoding process in the secondary communication stations due to an overlapping of transmission antenna beams of the channels from the primary communication station where the hopping patterns collide.

44. The apparatus for multi-dimensional orthogonal resource hopping multiplexing communication as claimed in claim 1,
wherein said multi-dimensional hopping pattern collision processing method is only carried out in the primary communication station when the performance of channel decoders in the secondary communication stations that are located within the overlapped region of transmission antenna beams for the channels from the primary communication station and do not carry out said multi-dimensional hopping pattern collision processing method, is worse than the performance of channel decoders in the same secondary communication stations that carry out said multi-dimensional hopping pattern collision processing method where the multi-dimensional hopping patterns collide.

45. The apparatus for multi-dimensional orthogonal resource hopping multiplexing communication as claimed in claim 1, wherein a pilot signal is used for coherent demodulation uses a multi-dimensional hopping pattern which do not collide in order to protect the coherent demodulation from a loss of phase distortion compensation capability due to collisions.

46. The apparatus for multi-dimensional orthogonal resource hopping multiplexing communication as claimed in claim 45, wherein said hopping patterns which do not collide include an allocation of fixed orthogonal resource like the multi-dimensional orthogonal resource division multiplexing method.

47. An apparatus for multi-dimensional orthogonal resource hopping multiplexing communication comprising;
a multi-dimensional orthogonal resource hopping pattern generator, a multi-dimensional orthogonal resource generator that generates multi-dimensional orthogonal resource according to said multi-dimensional hopping patterns, and
a controller that comprises a multi-dimensional hopping pattern collision detector which detects the collision of said multi-dimensional hopping patterns, a transmitting data symbol comparator which compares whether or not the data symbols for the corresponding channels are identical at the time of collision of said multi-dimensional hopping patterns, and a perforator which can stop the transmission of the data symbol when said comparator indicates that all the corresponding data symbols are not identical.

48. The apparatus for multi-dimensional orthogonal resource hopping multiplexing communication as claimed in claim 47, wherein said multi-dimensional orthogonal resource generator consists of a frequency synthesizer.

49. The apparatus for multi-dimensional orthogonal resource hopping multiplexing communication as claimed in claim 47, wherein said multi-dimensional orthogonal resource generator consists of buffers for controlling the position of transmission data symbol.

50. The apparatus for multi-dimensional orthogonal resource hopping multiplexing communication as claimed in claim 47, wherein said multi-dimensional orthogonal resource generator consists of an orthogonal code generator.

51. The apparatus for multi-dimensional orthogonal resource hopping multiplexing communication as claimed in claim 47, wherein said multi-dimensional orthogonal resource generator consists of a combination of a frequency synthesizer, buffers, a spreading orthogonal code generator.

52. An apparatus for multi-dimensional orthogonal resource hopping multiplexing communication of a spread spectrum communication comprising a digital communication system that includes a transmission apparatus of the primary communication station and a reception apparatus of the secondary communication station,
wherein said transmission apparatus of the primary communication station comprising;
a channel encoder,
a multi-dimensional orthogonal resource hopping pattern generator,
a multi-dimensional orthogonal resource generator that generates multi-dimensional orthogonal resources according to said multi-dimensional hopping pattern,
a controller that comprises a multi-dimensional hopping pattern collision detector which detects the collision of said multi-dimensional hopping patterns, a transmitting data symbol comparator which compares whether or not the data symbols for the corresponding channels are identical at the time of collision of said multi-dimensional hopping patterns, and a perforator which can stop the transmission of the data symbol when said comparator indicates that all the corresponding data symbols are not identical.

53. An apparatus for multi-dimensional orthogonal resource hopping multiplexing communication allowing collision among multi-dimensional orthogonal resource hopping patterns within some data symbol durations comprising a digital communication system for multi-dimensional orthogonal resource hopping multiplexing which operates with two exclusive orthogonal resource groups comprising;
a first orthogonal resource group comprising orthogonal resources only for a multi-dimensional orthogonal resource division multiplexing by fixed and exclusive allocation of orthogonal resources, and
a second orthogonal resource group comprising orthogonal resources only for a statistical multiplexing through orthogonal resource hopping.

54. An apparatus for multi-dimensional orthogonal resource hopping multiplexing communication of a spread spectrum communication as claimed in claim 53,
wherein a said multi-dimensional orthogonal resource division multiplexing is carried out for a less bursty channels by fixedly and exclusively allocating only the orthogonal resources in said first orthogonal resource group to the transmitting data symbols.

55. An apparatus for multi-dimensional orthogonal resource hopping multiplexing communication of a spread spectrum communication as claimed in claim 53,
wherein said statistical multiplexing through orthogonal resource hopping is carried out using multi-dimensional orthogonal resource hopping patterns for a bursty channels by using only the orthogonal resources in said second orthogonal resource group.

* * * * *

UNITED STATES PATENT AND TRADEMARK OFFICE
CERTIFICATE OF CORRECTION

PATENT NO. : 7,149,199 B2 Page 1 of 1
APPLICATION NO. : 10/089051
DATED : December 12, 2006
INVENTOR(S) : Sung et al.

It is certified that error appears in the above-identified patent and that said Letters Patent is hereby corrected as shown below:

At column 28, line 12 (claim 1, line 1) of the printed patent, "A apparatus" should be --An apparatus--.

At column 28, line 56 (claim 4, line 6) of the printed patent, "resource #2, orthogonal" should be --resource #2, ...., orthogonal--.

At column 29, line 58 (claim 16, line 8) of the printed patent, "resource #2 orthogonal" should be --resource #2, ...., orthogonal--.

At column 32, line 44 (claim 45, line 3) of the printed patent, "signal is used" should be --signal used--.

Signed and Sealed this

Seventeenth Day of June, 2008

JON W. DUDAS
*Director of the United States Patent and Trademark Office*